(12) United States Patent
Kawase

(10) Patent No.: US 12,455,952 B2
(45) Date of Patent: Oct. 28, 2025

(54) SYSTEM, CONTROL METHOD OF USER TERMINAL, AND STORAGE MEDIUM

(71) Applicant: NEC Corporation, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 18/276,202

(22) PCT Filed: Dec. 8, 2021

(86) PCT No.: PCT/JP2021/045196
§ 371 (c)(1),
(2) Date: Aug. 8, 2023

(87) PCT Pub. No.: WO2023/026506
PCT Pub. Date: Mar. 2, 2023

(65) Prior Publication Data
US 2024/0037207 A1    Feb. 1, 2024

(51) Int. Cl.
*G06F 21/33*    (2013.01)
*G06F 21/32*    (2013.01)

(52) U.S. Cl.
CPC .............. *G06F 21/33* (2013.01); *G06F 21/32* (2013.01)

(58) Field of Classification Search
CPC ................................ G06F 21/33; G06F 21/32
USPC ............................................................ 726/5
See application file for complete search history.

(56) References Cited

U.S. PATENT DOCUMENTS

| | | | |
|---|---|---|---|
| 5,892,900 A | 4/1999 | Ginter et al. | |
| 8,818,874 B2* | 8/2014 | Veseli | ................. G06Q 20/203 705/16 |
| 2004/0034601 A1 | 2/2004 | Kreuzer | |
| 2005/0080705 A1 | 4/2005 | Chaganti | |
| 2005/0216360 A1* | 9/2005 | Osterer | ................. G06Q 30/06 705/26.1 |
| 2008/0235043 A1 | 9/2008 | Goulandris et al. | |
| 2009/0089175 A1 | 4/2009 | Platek et al. | |
| 2009/0132813 A1* | 5/2009 | Schibuk | ............. G06Q 20/4014 726/9 |

(Continued)

FOREIGN PATENT DOCUMENTS

CN    112036885 A    12/2020
CN    111814173 B    3/2021

(Continued)

OTHER PUBLICATIONS

US Office Action for U.S. Appl. No. 18/276,399, mailed on Apr. 24, 2025.

(Continued)

*Primary Examiner* — Samson B Lemma

(57) ABSTRACT

A system includes a user terminal and a plurality of ledger nodes. The user terminal acquires an object fingerprint of an item and biometric information of an owner of the item. The plurality of ledger nodes provides an electronic bulletin board. The user terminal writes an ownership right certificate including the object fingerprint of the item and the biometric information of the owner on the electronic bulletin board. The system may further include a server apparatus. The user terminal may transmit an item registration request including at least the object fingerprint of the item and the biometric information of the owner to the server apparatus.

13 Claims, 49 Drawing Sheets

(56) References Cited

U.S. PATENT DOCUMENTS

| | | |
|---|---|---|
| 2010/0223156 A1 | 9/2010 | Shii |
| 2011/0022494 A1 | 1/2011 | Lutnick et al. |
| 2013/0061055 A1* | 3/2013 | Schibuk .................. G06Q 20/40 713/172 |
| 2013/0227653 A1* | 8/2013 | Choi .................. G06Q 30/0185 709/217 |
| 2016/0300234 A1* | 10/2016 | Moss-Pultz ........... H04L 9/3247 |
| 2016/0350861 A1 | 12/2016 | Loughlin-McHugh et al. |
| 2018/0026790 A1 | 1/2018 | Seo et al. |
| 2018/0247399 A1 | 8/2018 | Parikh et al. |
| 2019/0155997 A1 | 5/2019 | Vos et al. |
| 2019/0394026 A1 | 12/2019 | Bookman et al. |
| 2020/0074461 A1 | 3/2020 | Derosa-Grund |
| 2020/0226702 A1 | 7/2020 | Sakaitani et al. |
| 2020/0334431 A1* | 10/2020 | Singal .................. G06K 7/10386 |
| 2020/0401677 A1 | 12/2020 | Childress et al. |
| 2021/0110469 A1 | 4/2021 | Ross et al. |
| 2021/0133713 A1 | 5/2021 | Wang et al. |
| 2021/0152368 A1 | 5/2021 | Sakaitani et al. |
| 2021/0201310 A1 | 7/2021 | Moss-Pultz et al. |
| 2021/0217001 A1 | 7/2021 | Harrison |
| 2021/0382966 A1 | 12/2021 | Shii et al. |
| 2022/0020009 A1* | 1/2022 | Yoon .................. G06Q 20/3821 |
| 2022/0156349 A1* | 5/2022 | Tsukada ................ G06V 40/107 |
| 2022/0358469 A1 | 11/2022 | Biggs |

FOREIGN PATENT DOCUMENTS

| | | | |
|---|---|---|---|
| CN | 113191902 A | 7/2021 | |
| JP | 2007-526583 A | 9/2007 | |
| JP | 2009-048619 A | 3/2009 | |
| JP | WO2009/044826 A1 | 2/2011 | |
| JP | 2016-194943 A | 11/2016 | |
| JP | 2018-055203 A | 4/2018 | |
| JP | 2018-515048 A | 6/2018 | |
| JP | 2018-173692 A | 11/2018 | |
| JP | 2018-173767 A | 11/2018 | |
| JP | 2020-021127 A | 2/2020 | |
| JP | 2020-528592 A | 9/2020 | |
| JP | 2020-201589 A | 12/2020 | |
| JP | 2021-072116 A | 5/2021 | |
| JP | 2021-092827 A | 6/2021 | |
| KR | 10-2021-0059165 A | 5/2021 | |
| WO | WO-2016164496 A1 * | 10/2016 | ......... G06Q 20/3829 |
| WO | WO-2017044554 A1 * | 3/2017 | ........... H04L 9/3033 |
| WO | 2019/065831 A1 | 4/2019 | |
| WO | 2019/186978 A1 | 10/2019 | |
| WO | 2020/080537 A1 | 4/2020 | |
| WO | 2020/209056 A1 | 10/2020 | |

OTHER PUBLICATIONS

Giuseppe, Painting authentication by means of a biometric-like approach, 2015 (Year: 2015).
US Office Action for U.S. Appl. No. 18/276,373, mailed on Apr. 28, 2025.
Wang et al, ArtChain: Blockchain-Enabled Platform for Art Marketplace, 2019 IEEE Int'l Conference on Blockchain (Year: 2020).
US Office Action for U.S. Appl. No. 18/276,399, mailed on Dec. 9, 2024.
Image Photographing Device and Its Control Method (Year: 2002), JP2004023733A.
Method for Publishing Work (Year: 2023), WO2024147772A1.
Biometric authentication device using thermal image (Year: 2021), JP712859781.
System and Method for Supporting Art Gallery Dealer (Year: 2001), JP2003044712A.
Artwork Fidelity Method and Server Based Block Chain Technology (Year: 2013), CN106991573A.
A Block Chain Technology-based Copyright Protection Method and System (Year: 2013), CN106682457A.
International Preliminary Report on Patentability (Chapter I of the Patent Cooperation Treaty) for International Application No. PCT/JP2021/045196, mailed on Feb. 27, 2024, and its English Translation.
International Preliminary Report on Patentability (Chapter I of the Patent Cooperation Treaty) for International Application No. PCT/JP2021/045198, mailed on Feb. 27, 2024, and its English Translation.
International Preliminary Report on Patentability (Chapter I of the Patent Cooperation Treaty) for International Application No. PCT/JP2021/045199, mailed on Feb. 27, 2024, and its English Translation.
International Preliminary Report on Patentability (Chapter I of the Patent Cooperation Treaty) for International Application No. PCT/JP2021/045201, mailed on Feb. 27, 2024, and its English Translation.
JP Office Communication for JP Application No. 2023-543640, mailed on Sep. 17, 2024 with English Translation.
International Search Report for PCT Application No. PCT/JP2021/045196, mailed on Mar. 15, 2022.
International Search Report for PCT Application No. PCT/JP2021/045198, mailed on Mar. 15, 2022.
International Search Report for PCT Application No. PCT/JP2021/045199, mailed on Mar. 8, 2022.
International Search Report for PCT Application No. PCT/JP2021/045201, mailed on Mar. 15, 2022.
JP Office Action for JP Application No. 2023-543638, mailed on May 28, 2024 with English Translation.
US Office Action for U.S. Appl. No. 18/681,924, mailed on Jul. 17, 2025.
US Office Action for U.S. Appl. No. 18/276,399, mailed on Sep. 24, 2025.

* cited by examiner

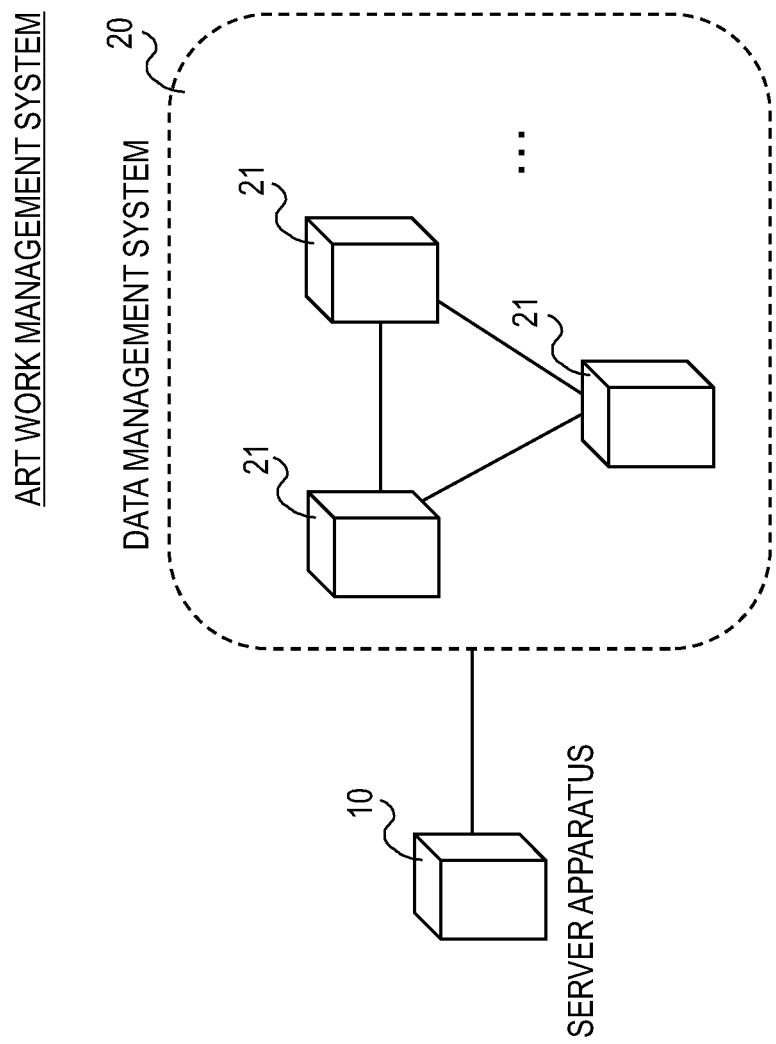
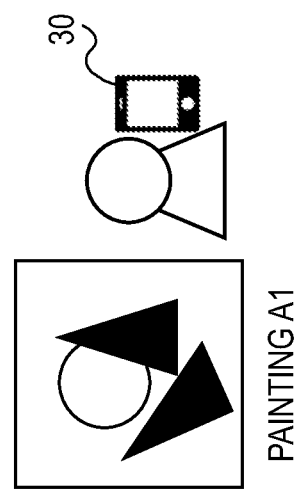
FIG.2

USER REGISTRATION

PLEASE ENTER FOLLOWING INFORMATION.

NAME:

EMAIL ADDRESS:

CRYPTO-ASSETS ACCOUNT:

...

PLEASE SELECT A PHOTO OF YOUR FACE TO BE REGISTERED.

IMAGE FILE 01    BROWSE

PLEASE SELECT A COPY OF YOUR IDENTITY VERIFICATION DOCUMENT.

PASSPORT IMAGE FILE 01    BROWSE

...

ENTER

FIG.9

ART WORK REGISTRATION

PLEASE SELECT A PHOTO OF YOUR FACE TO BE REGISTERED.

[ IMAGE FILE 02 ] [ BROWSE ]

PLEASE ENTER NAME OF ART WORK THAT YOU WISH TO REGISTER.

[ PAINTING A1 ]

PLEASE SELECT OBJECT FINGERPRINT OF ART WORK TO BE REGISTERED.

[ OBJECT FINGERPRINT FILE 02 ] [ BROWSE ]

...

[ ENTER ]

FIG.10

ART WORK MANAGEMENT DATABASE
| NAME OF ART WORK | IMAGE DATA | OBJECT FINGERPRINT | DOCUMENT NAME | TXID |
|---|---|---|---|---|
| PAINTING A1 | 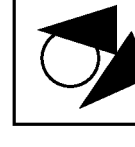 | OF01 | OWNERSHIP RIGHT CERTIFICATE | TXID_01 |
| | | | ... | ... |
| PAINTING A2 | 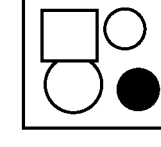 | OF11 | OWNERSHIP RIGHT CERTIFICATE | TXID_11 |
| | | ... | ... | ... |
| ... | ... | ... | ... | ... |
FIG.11

USER INFORMATION DATABASE

| USER ID | BIOMETRIC INFORMATION | NAME | EMAIL ADDRESS | CRYPTO-ASSETS ACCOUNT | ... |
|---|---|---|---|---|---|
| uID01 | FV01 | NM01 | ADD01 | AC01 | ... |
| uID02 | FV02 | NM02 | ADD02 | AC02 | ... |
| uID03 | FV03 | NM03 | ADD03 | AC03 | ... |
| ... | ... | ... | ... | ... | ... |

FIG.13

OWNERSHIP RIGHT CERTIFICATE

| NAME OF ART WORK | PAINTING A1 |
|---|---|
| AUTHOR | PAINTER B1 |
| OBJECT FINGERPRINT OF ART WORK | OF01 |
| BIOMETRIC INFORMATION OF OWNER | FV01 |
| ... | ... |

FIG.14

| PUBLIC APPRAISAL CERTIFICATE | | |
|---|---|---|
| OBJECT FINGERPRINT OF ART WORK | OF01 | |
| BIOMETRIC INFORMATION OF OWNER | FV01 | |
| APPRAISAL RESULT | THE ART WORK WITH OBJECT FINGERPRINT OF01 IS THE WORK OF PAINTER B1 OF THE YEAR Y1 AS A RESULT OF THE APPRAISAL AND IS ASSUMED TO BE VALUED AT 200 MILLION YEN AT THE PRESENT TIME.<br><br>YEAR 2 MONTH 2 DAY 2  APPRAISER C | |
| ... | ... | |

FIG.21

| PUBLIC APPRAISAL CERTIFICATE | |
|---|---|
| OBJECT FINGERPRINT OF ART WORK | OF01 |
| BIOMETRIC INFORMATION OF OWNER | FV01 |
| DETAILS OF RESTORATION | THE ART WORK WITH THE OBJECT FINGERPRINT OF01 WAS RESTORED BY REAPPLYING PROTECTIVE VARNISH.<br><br>YEAR 3 MONTH 3 DAY 3   APPRAISER D |
| ... | ... |

FIG.23

SELLING ART WORK

PLEASE ENTER NAME OF ART WORK THAT YOU WISH TO SELL.

PAINTING A1

PLEASE ENTER USER ID OF COUNTERPARTY.

uID11

PLEASE ENTER AMOUNT OF SALE AGREED WITH COUNTERPARTY.

YEN X1

...

ENTER

FIG.26

PURCHASE AND SALES CONTRACT

| | |
|---|---|
| NAME OF ART WORK | PAINTING A1 |
| OBJECT FINGERPRINT OF ART WORK | OF01 |
| USER ID OF TRANSFEROR | uID01 |
| BIOMETRIC INFORMATION OF TRANSFEROR | FV01 |
| USER ID OF TRANSFEREE | uID11 |
| AMOUNT OF SALE | YEN X1 |
| ... | ... |

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| BIOMETRIC INFORMATION OF OWNER | FV01 |
| ... | ... |

FIG.30B

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| BIOMETRIC INFORMATION OF OWNER | FV11 |
| ... | ... |

CHECKING PURCHASE AND SALES CONTRACT

PLEASE CHECK PURCHASE AND SALES CONTRACT.

PURCHASE AND SALES CONTRACT

NAME OF ART WORK: PAINTING A1

AMOUNT OF PURCHASE: YEN X1

...

TXID

PLEASE ENTER TXID OF ITEM THAT YOU WISH TO BUY AND SELL.

PLEASE SELECT A PHOTO OF YOUR FACE TO BE REGISTERED.

IMAGE FILE 03  BROWSE

ENTER

FIG.31

SELLING ART WORK

PLEASE ENTER NAME OF ART WORK THAT YOU WISH TO SELL.

PAINTING A1

PLEASE ENTER USER ID OF COUNTERPARTY.

uID11

PLEASE ENTER PERCENTAGE TO BE SOLD.

30%

...

ENTER

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| BIOMETRIC INFORMATION OF OWNER | FV01 |
| ... | ... |

FIG.33B

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| OWNER 1 | BIOMETRIC INFORMATION: FV01 |
| | OWNED TOKEN: 70 |
| OWNER 2 | BIOMETRIC INFORMATION: FV11 |
| | OWNED TOKEN: 30 |
| ... | ... |

SELLING ART WORK

PLEASE ENTER NAME OF ART WORK THAT YOU WISH TO SELL.

PAINTING A1

PLEASE ENTER USER ID OF COUNTERPARTY 1 AND RATIO OF OWNERSHIP RIGHT.

uID21 | 70%

PLEASE ENTER USER ID OF COUNTERPARTY 2 AND RATIO OF OWNERSHIP RIGHT.

uID31 | 30%

...

ENTER

FIG.34

CHECKING PURCHASE AND SALES CONTRACT

PLEASE CHECK PURCHASE AND SALES CONTRACT.

PURCHASE AND SALES CONTRACT

NAME OF ART WORK: PAINTING A1

RATIO OF OWNERSHIP RIGHT: 70%

OTHER SHARER: uID31

RATIO OF OWNERSHIP RIGHT OF OTHER SHARER: 30%

...

PLEASE ENTER TXID OF ITEM THAT YOU WISH TO BUY AND SELL.

TXID

...

ENTER

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| BIOMETRIC INFORMATION OF OWNER | FV01 |
| ... | ... |

FIG.36B

| OWNERSHIP RIGHT CERTIFICATE | | |
|---|---|---|
| NAME OF ART WORK | PAINTING A1 | |
| AUTHOR | PAINTER B1 | |
| OBJECT FINGERPRINT OF ART WORK | OF01 | |
| OWNER 1 | BIOMETRIC INFORMATION: FV21 | OWNED TOKEN: 70 |
| OWNER 2 | BIOMETRIC INFORMATION: FV31 | OWNED TOKEN: 30 |
| ... | ... | ... |

ESTABLISHING RESALE ROYALTY RIGHT

PLEASE ENTER RETURN RATE THAT YOU WISH TO ESTABLISH FOR RESALE ROYALTY RIGHT.

2%

ENTER

FIG.37

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| TOTAL AMOUNT OF TOKEN | 100 |
| OWNER | BIOMETRIC INFORMATION: FV01<br>OWNED TOKEN: 98 |
| RESALE ROYALTY RIGHT HOLDER | BIOMETRIC INFORMATION: FV01<br>RESALE ROYALTY TOKEN: 2 |
| ... | ... |

FIG.38

LOAN ART WORK

PLEASE ENTER NAME OF ART WORK THAT YOU WISH TO SELL.

PAINTING A1

PLEASE ENTER LENDING DESTINATION.

MUSEUM E

ENTER LOAN PERIOD.

Y3: M3: D3 – Y3: M4: D3

...

ENTER

LOAN AGREEMENT

| NAME OF ART WORK | PAINTING A1 |
|---|---|
| OBJECT FINGERPRINT OF ART WORK | OF01 |
| LENDING DESTINATION OF ART WORK | MUSEUM E |
| LOAN PERIOD | Y3: M3: D3 – Y3: M4: D3 |
| LOAN FEE | YEN X2 |
| ... | ... |

FIG.44

PUBLIC LOAN DOCUMENT

| | |
|---|---|
| NAME OF ART WORK | PAINTING A1 |
| OBJECT FINGERPRINT OF ART WORK | OF01 |
| BIOMETRIC INFORMATION OF OWNER | FV01 |
| LENDING DESTINATION OF ART WORK | MUSEUM E |
| LOAN PERIOD | Y3: M3: D3 – Y3: M4: D3 |
| ... | ... |

| RETURN DOCUMENT | |
|---|---|
| NAME OF ART WORK | PAINTING A1 |
| OBJECT FINGERPRINT OF ART WORK | OF01 |
| RETURN DESTINATION OF ART WORK | uID01 |
| DATE OF RETURN | Y3: M4: D3 |
| LOAN FEE | YEN X2 |
| ... | ... |

FIG.45

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| OWNER 1 | BIOMETRIC INFORMATION: FV21<br>OBJECT FINGERPRINT: OF21<br>OWNED TOKEN: 70 |
| OWNER 2 | BIOMETRIC INFORMATION: FV31<br>OBJECT FINGERPRINT: OF31<br>OWNED TOKEN: 30 |
| ... | ... |

FIG.47

| OWNERSHIP RIGHT CERTIFICATE | |
|---|---|
| NAME OF ART WORK | PAINTING A1 |
| AUTHOR | PAINTER B1 |
| OBJECT FINGERPRINT OF ART WORK | OF01 |
| OWNER 1 | BIOMETRIC INFORMATION: FV21 |
| | OBJECT FINGERPRINT: OF21 |
| | IMAGE TOKEN: YEN X3 |
| OWNER 2 | BIOMETRIC INFORMATION: FV31 |
| | OBJECT FINGERPRINT: OF31 |
| | IMAGE TOKEN: YEN X4 |
| ... | ... |

FIG.48

SYSTEM, CONTROL METHOD OF USER TERMINAL, AND STORAGE MEDIUM

This application is a National Stage Entry of PCT/JP2021/045196 filed on Dec. 8, 2021, the contents of all of which are incorporated herein by reference, in their entirety.

TECHNICAL FIELD

The present invention is based on the priority claim of Japanese Patent Application: Japanese Patent Application No. 2021-137442 (filed on Aug. 25, 2021), the contents of all of which are incorporated herein by reference, in their entirety.

The present invention relates to a system, a control method of a user terminal, and a program.

BACKGROUND ART

Various technologies are being developed for distribution and management of items.

For example, Patent Literature 1 describes providing a system capable of efficiently managing various types of information related to an object to be transacted. Moreover, Patent Literature 2 describes that an authenticity of an item and an owner of the item is determined without attaching or fixing information to the item itself.

CITATION LIST

Patent Literature

[PTL 1] International Publication WO2020/080537
[PTL 2] Japanese Unexamined Patent Application Publication No. 2018-173692

SUMMARY OF INVENTION

Technical Problem

In transactions of art works and jewelry and so on, it is important to verify whether an owner of the art work and so on is a person worthy of a transaction, or whether the art work itself is an item worthy of a transaction. However, there is no system and so on that can easily perform these verifications. For example, even if the techniques disclosed in Patent Literature 1 and Patent Literature 2 are applied, a legitimacy (an authenticity) of the owner and the item cannot be checked.

It is a main object of the present invention to provide a system, a control method of a user terminal, and a program that contribute to providing a highly transparent distribution market for items such as art works.

Solution to Problem

According to a first aspect of the present invention, there is provided a system, including: a user terminal that acquires an object fingerprint of an item and biometric information of an owner of the item; and a plurality of ledger nodes that provides an electronic bulletin board, wherein the user terminal writes an ownership right certificate including the object fingerprint of the item and the biometric information of the owner on the electronic bulletin board.

According to a second aspect of the present invention, there is provided a control method of a user terminal, the control method including: acquiring an object fingerprint of an item and biometric information of an owner of the item; and writing an ownership right certificate including the object fingerprint of the item and the biometric information of the owner on the electronic bulletin board.

According to a third aspect of the present invention, there is provided a program causing a computer mounted on a user terminal to perform processing for: acquiring an object fingerprint of an item and biometric information of an owner of the item; and writing an ownership right certificate including the object fingerprint of the item and the biometric information of the owner on the electronic bulletin board.

Advantageous Effects of Invention

According to the individual aspects of the present invention, there are provided a system, a control method of a user terminal, and a program that contribute to providing a highly transparent distribution market regarding items such as art works. The advantageous effect of the present invention is not limited to the above advantageous effect. The present invention may provide other advantageous effects, instead of or in addition to the above advantageous effect.

BRIEF DESCRIPTION OF THE DRAWINGS

FIG. 2 shows an example of a schematic configuration of an art work management system according to a first example embodiment.

FIG. 9 is a diagram illustrating an example of a display of the user terminal according to the first example embodiment.

FIG. 10 is a diagram illustrating an example of a display of the user terminal according to the first example embodiment.

FIG. 11 is a diagram illustrating an example of an art work management database according to the first example embodiment.

FIG. 13 is a diagram illustrating an example of a user information database according to the first example embodiment.

FIG. 14 is a diagram illustrating an example of an ownership right certificate according to the first example embodiment.

FIG. 21 is a diagram illustrating an example of a public appraisal certificate according to the second example embodiment.

FIG. 23 is a diagram illustrating an example of a public restoration certificate according to the second example embodiment.

FIG. 26 is a diagram illustrating an example of a display of the user terminal according to the third example embodiment.

FIG. 27 is a diagram illustrating an example of a purchase and sales contract according to the third example embodiment.

FIGS. 30A and 30B illustrate an example diagram of an ownership right certificate according to the third example embodiment.

FIG. 31 is a diagram illustrating an example of a display of the user terminal according to the third example embodiment.

FIG. 32 is a diagram illustrating an example of a display of a user terminal of a variation 1 according to the third example embodiment.

FIGS. 33A and 33B illustrate a diagram illustrating an example of an ownership right certificate of the variation 1 according to the third example embodiment.

FIG. 34 is a diagram illustrating an example of a display of a user terminal of a variation 2 according to the third example embodiment.

FIG. 35 is a diagram illustrating an example of a display of the user terminal of the variation 2 according to the third example embodiment.

FIGS. 36A and 36B illustrate an example diagram illustrating an ownership right certificate of the variation 2 according to the third example embodiment.

FIG. 37 is a diagram illustrating an example of a display of a user terminal according to a fourth example embodiment.

FIG. 38 is a diagram illustrating an example of an ownership right certificate according to the fourth example embodiment.

FIG. 40 is a diagram illustrating an example of a display of the user terminal according to the fifth example embodiment.

FIG. 41 is a diagram illustrating an example of a loan agreement according to the fifth example embodiment.

FIG. 44 is a diagram illustrating an example of a public loan document according to a fifth example embodiment.

FIG. 45 is a diagram illustrating an example of a return document according to the fifth example embodiment.

FIG. 47 is a diagram illustrating an example of an ownership right certificate according to a sixth example embodiment.

FIG. 48 is a diagram illustrating an example of the ownership right certificate according to the sixth example embodiment.

EXAMPLE EMBODIMENT

Figure 1:
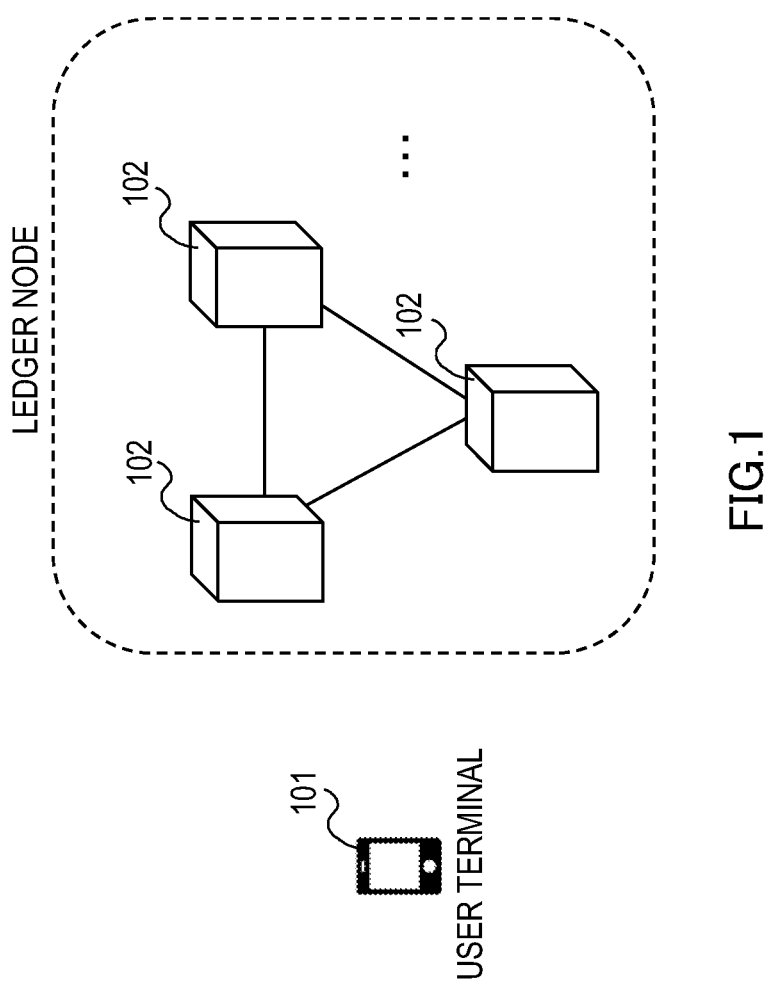
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

A system according to an example embodiment includes a user terminal 101 and a plurality of ledger nodes 102 (see FIG. 1). The user terminal 101 acquires an object fingerprint of an item and biometric information of an owner of the item. The plurality of ledger nodes 102 provides an electronic bulletin board. The user terminal 101 writes an ownership right certificate including the object fingerprint of the item and the biometric information of the owner on the electronic bulletin board.

In the above system, the biometric information of the owner who possesses the art work and the object fingerprint of the art work are written on the electronic bulletin board (for example, the electronic bulletin board that cannot be tampered with and is composed of a blockchain, and so on) and publicly disclosed to all. A user who participates in a transaction of the art work acquires biometric information from a counterparty in front of him or her, and can check a legitimacy (an authenticity) of the counterparty by a biometric authentication using the biometric information that is published by the electronic bulletin board. Similarly, the user can acquire the object fingerprint from the art work in front of him or her and check a legitimacy (an authenticity) regarding the art work to be transacted by an object authentication using the object fingerprint that is published by the electronic bulletin board. Such verification ensures that a correct art work is owned by a correct person and provides a highly transparent secondary market for items such as art works.

Hereinafter, a specific example embodiment will be described in more detail with reference to the drawings.

First Example Embodiment

A first example embodiment will be described in more detail with reference to drawings.

[System Configuration]

FIG. 2 is a diagram illustrating an example of a schematic configuration of an art work management system according to a first example embodiment. As shown in FIG. 2, the art work management system includes a server apparatus 10 and a data management system 20.

The server apparatus 10 is an apparatus that implements main functions of the art work management system. For example, the server apparatus 10 includes a function to publicly reveal rights of an art work. Specifically, the server apparatus 10 discloses an owner of the art work (discloses to all people) or discloses a transfer of an ownership right of the art work.

The server apparatus 10 may be installed in a building, such as a company operating the art work management system, or the server apparatus 10 may be installed on a network (a cloud).

The data management system 20 is a system that is operated by an institution or the like that is independent from an operator of the art work management system or a user of the system. The data management system 20 is a system that provides an electronic bulletin board (a bulletin board based on an electronic distributed ledger) that can be appended to and read out to an outside (a third party).

More specifically, the data management system 20 provides the electronic bulletin board that allows any entity to both append information and read information that is written, and that does not erase or tamper with information once the information is written. The data management system 20 provides the electronic bulletin board that includes the above features by so-called blockchain technology.

The data management system 20 includes at least two or more ledger nodes 21. The above electronic bulletin board is provided by a plurality of ledger nodes 21. Each ledger node 21 maintains a blockchain consisting of a series of blocks on which agreements are formed among the ledger nodes 21. Each block includes a header and a body containing at least one or more transactions. In the electronic bulletin board (the bulletin board based on the electronic distributed ledger) provided by the data management system 20, hash calculations are performed on consecutive blocks, and data (transactions) are virtually impossible to tamper with.

A hash value of the transaction is used as an identifier of the transaction included in each block. The identifier is sometimes referred to as a transaction ID (TXID). The transaction ID is used when referring to a past transaction recorded on the electronic bulletin board.

An owner or the like of an item discloses rights and so on of an art work using the electronic bulletin board provided by the data management system 20. Since existing technology can be applied to realize the electronic bulletin board using the blockchain, a more detailed description is omitted. The electronic bulletin board in the present application may be realized using a technology different from the blockchain. In the present application, any electronic bulletin board can be used, as long as the electronic bulletin board is universally accessible and virtually impossible to tamper with the data.

[Outline of Operation]

Next, outline of operations in the art work management system according to the first example embodiment will be described.

An author who created an art work, or an owner who owns an art work, manages the art work using a user terminal 30. An "art work management application" is installed on the user terminal 30. A user manages the above art work by using the art work management application.

Figure 3:
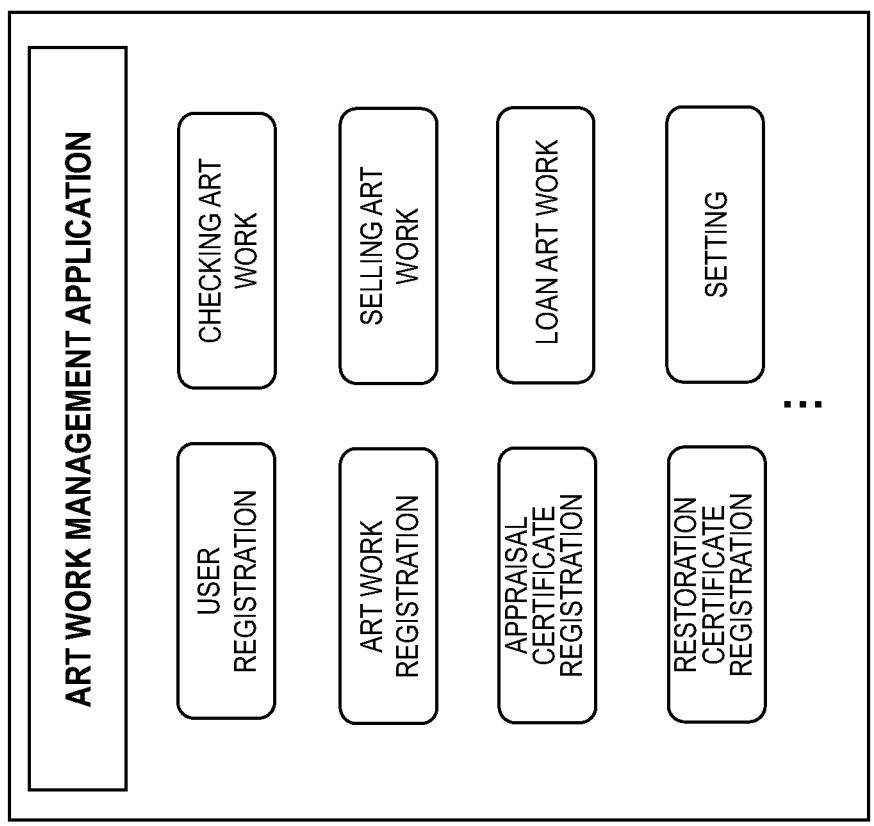
FIG. 3 is a diagram illustrating an example of a display of a user terminal according to the first example embodiment.

When the art work management application is launched, the user terminal 30 displays a menu screen as shown in FIG. 3. The user selects an item displayed on the menu screen to perform a user registration in the art work management system and to manage the art work owned by the user, and so on.

A user who wishes to participate in the art work management system is required to complete a system registration. Specifically, the user presses a "user registration" button shown in FIG. 3 to register information necessary to use the art work management system with the server apparatus 10.

Figure 4:
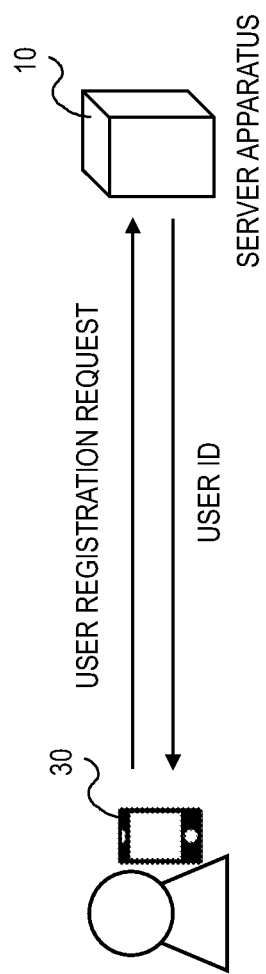
FIG. 4 is a diagram illustrating an operation of the art work management system according to the first example embodiment.

The user operates the user terminal 30 and inputs his or her biometric information, personal information, and an identity verification document, and so on into the server apparatus 10. The user terminal 30 transmits a user registration request to the server apparatus 10 that includes the user's biometric information, the personal information (a name, an address, a date of birth, an e-mail address, crypto-assets account information, and so on) and the identity verification document (for example, passport with biometric information, and so on) (see FIG. 4).

The server apparatus 10 verifies an identity (an identity verification) of a user who wishes to register using the acquired biometric information and the biometric information written on the identity verification document. Specifically, the server apparatus 10 performs a one-to-one authentication using the biometric information and the biometric information written on the identity verification document, and determines that the identity verification is successful when the authentication is successful.

When the identity verification is successful, the server apparatus 10 generates an ID (hereinafter referred to as a "user ID") to identify the user. The server apparatus 10 associates the user ID, the biometric information, the e-mail address, the crypto-assets account, and so on, and registers them in a user information database. Details of the user information database are described below.

The server apparatus 10 issues the generated user ID to the user (the user terminal 30). The user terminal 30 stores the user ID internally.

The user who has completed the user registration registers an art work that he/she owns or created in the system. Specifically, an owner (a creator) of the art work discloses a fact that he/she owns the art work via the electronic bulletin board. In this case, the owner operates the user terminal 30 and selects "art work registration" on the menu screen shown in FIG. 3.

Figure 5:
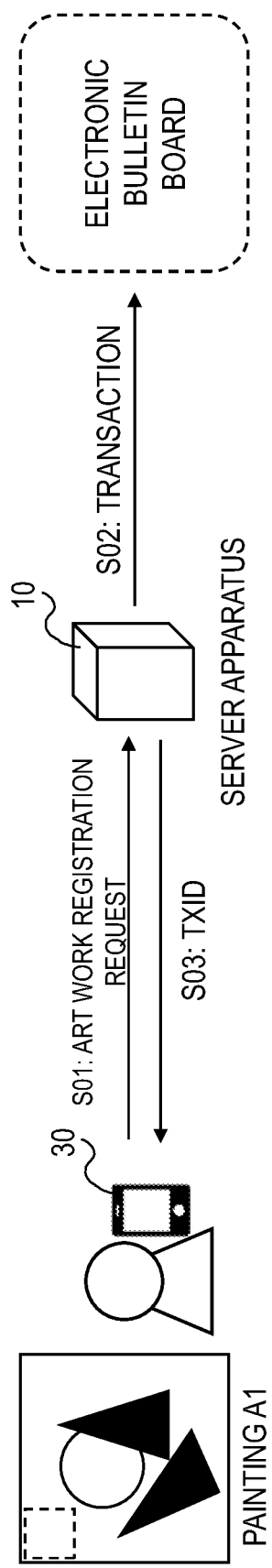
FIG. 5 is a diagram illustrating an operation of the art work management system according to the first example embodiment.

When registering the art work, the user terminal 30 transmits an "art work registration request" to the server apparatus 10 (step S01 in FIG. 5).

Here, at the time of the art work registration, the user terminal 30 acquires biometric information of the user and an object fingerprint of the art work.

For example, the biometric information about a user is data (feature values) calculated from physical features unique to this individual user. The physical features are about the face, a fingerprint, a voiceprint, a vein, a retina, or an iris pattern of an eye of the user. Alternatively, the biometric information of a user may be image data of a face image or a fingerprint image of the user, for example. The biometric information of a user may be any information including physical features of the user.

The present application describes a case in which biometric information (a face image or a feature value generated from the face image) regarding a "face" of a person is used. The user terminal 30 photographs the user and acquires a face image. The user terminal 30 generates a feature value from the acquired face image.

Biometric information is information that is unique to each individual and is immutable throughout life. Therefore, the biometric information functions as an ID (an owner ID) that uniquely identifies an owner of an art work, and so on.

The user terminal 30 acquires an object fingerprint of an art work. For example, the user terminal 30 photographs a predetermined location on the art work and acquires the object fingerprint. For example, in an example shown in FIG. 5, the user terminal 30 captures an image of an upper left area of a painting A1 (an area surrounded by a dotted line; an object fingerprint acquisition area) and generates an object fingerprint from the acquired image data.

An object fingerprint is a pattern (a graphic pattern, a design pattern) that is unique to each art work. More specifically, the object fingerprint is not a design and so on of the art work, but rather a color unevenness, bumps, or minute scratches that are unique to each individual art work. As described above, since the object fingerprint is unique information for each art work, the object fingerprint acquired from the same art work is matched (substantially matched). That is, the object fingerprint functions as an art work ID that can uniquely identify the art work.

In addition, since the object fingerprint functions as an ID that uniquely identifies the art work, it is desirable that it remains unchanged for a long period of time (ideally, forever). Therefore, it is desirable for a user to acquire the object fingerprint from a location where the object fingerprint does not easily change. For example, it is preferable that the object fingerprint is acquired from a back or a bottom of a sculpture work, or from a metal plate and so on attached to a painting.

An object fingerprint is acquired by photographing a magnified image under suitable lighting conditions. For example, the user connects the user terminal 30 and a microscope with a camera (not shown) to acquire the object fingerprint. An existing technique can be used to acquire the object fingerprint, and therefore, detailed description thereof will be omitted.

Thus, the user terminal 30 acquires the object fingerprint of the item and the biometric information of the owner of the item. After that, the user terminal 30 directly or indirectly writes an "ownership right certificate" that includes the object fingerprint of the item and the biometric information of the owner on the electronic bulletin board. The first example embodiment describes that the user terminal 30 writes the ownership right certificate on the electronic bulletin board via the server apparatus 10.

More specifically, at first, the user terminal 30 transmits an "art work registration request" to the server apparatus 10, that includes the biometric information of the user (the owner of the art work) and the object fingerprint of the art work.

In accordance with the request, the server apparatus 10 generates an ownership right certificate that publicly indicates that the user owns the art work. Specifically, the server apparatus 10 generates the ownership right certificate using the biometric information and the object fingerprint included in the art work registration request.

The server apparatus 10 generates a transaction that includes the generated ownership right certificate and writes the generated transaction on the electronic bulletin board (step S02 in FIG. 5). When the transaction is normally processed, the server apparatus 10 issues a transaction ID of the transaction (including the ownership right certificate) to the user terminal 30 of the user (step S03).

The user terminal 30 stores the acquired transaction ID. The user terminal 30 manages the issued transaction ID as the transaction ID corresponding to the ownership right certificate.

In this way, the server apparatus 10 generates an ownership right certificate based on information included in an art registration request and writes on the electronic bulletin board a transaction including the generated ownership right certificate. Furthermore, the server apparatus 10 transmits a transaction ID corresponding to the transaction to the user terminal 30.

The user terminal 30 manages the art work registered in the art work management system and the transaction ID acquired from the server apparatus 10 using an art work management database. Details of the art management database are described below.

The user can check the transaction ID and so on issued from the above server apparatus 10 by pressing a "checking art work" button on the menu screen shown in FIG. 3. For example, the user terminal 30 displays a list of a photograph of an art work, a transaction ID corresponding to an ownership right certificate of the art work, and so on, in response to the pressing of the button (see FIG. 6).

As described above, information written on the electronic bulletin board can be viewed by everyone. In the following description, a person who views information (for example, an ownership right certificate) posted on the electronic bulletin board is referred to as a "viewer". In addition, a terminal used by the viewer is described as a viewer terminal 31. The viewer terminal 31 can read the ownership right certificate from the electronic bulletin board using the transaction ID.

Figure 7:
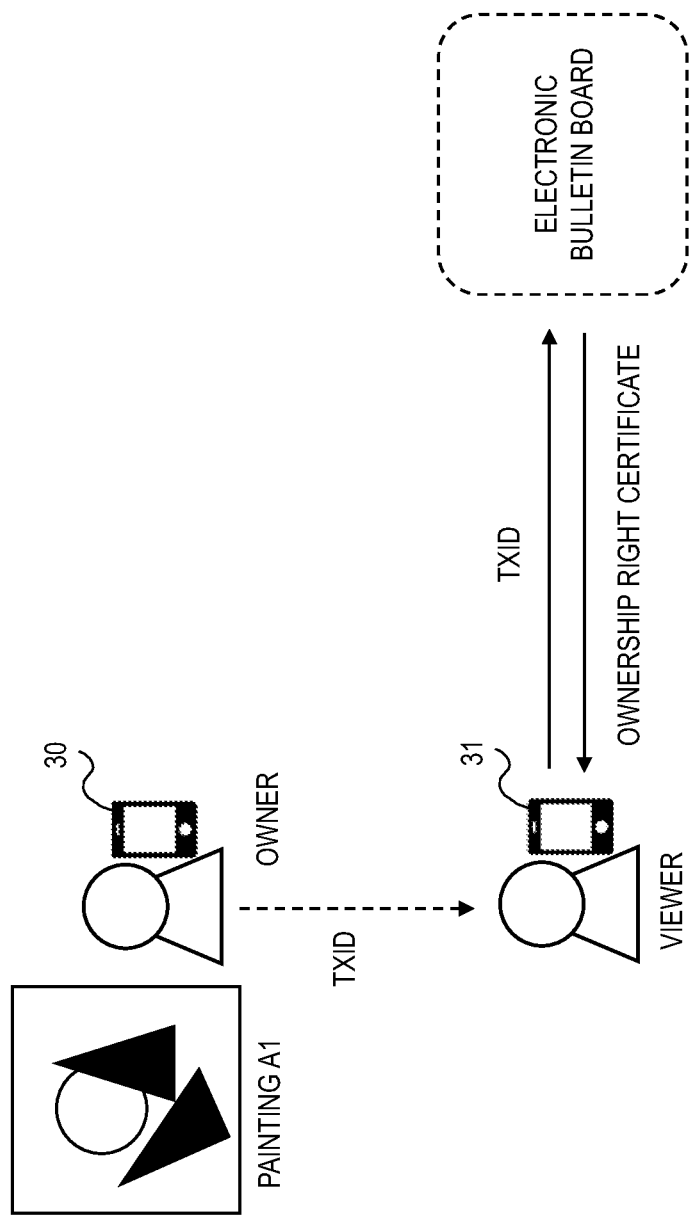
FIG. 7 is a diagram illustrating an operation of the art work management system according to the first example embodiment.

Here, with respect to a transaction of an art work, it is usual for a party to the transaction (a user who is considering purchasing an art work) to verify whether or not the art work in the possession of the counterparty and the counterparty are legitimate. In other words, the prospective purchaser of the art work verifies legitimacy (authenticity) of the counterparty and the art work of the counterparty. In this case, the prospective purchaser is notified by the counterparty of the transaction ID corresponding to the ownership right certificate of the art work that is subject to the transaction (see FIG. 7).

The prospective purchaser (the viewer) operates the viewer terminal 31 and transmits the notified transaction ID to the electronic bulletin board. The viewer terminal 31 acquires the ownership right certificate corresponding to the transaction ID.

The prospective purchaser operates the viewer terminal 31 to verify the legitimacy of the counterparty and the legitimacy of the art work.

Specifically, the prospective purchaser acquires biometric information of the counterparty by operating the viewer terminal 31 and photographing the counterparty and so on. The viewer terminal 31 performs a biometric authentication (a one-to-one authentication) using the acquired biometric information and the biometric information included in the ownership right certificate.

When the authentication is successful, the prospective purchaser determines that the counterparty in front of him or her is a legitimate owner of the art work. In other words, when the authentication fails, the prospective purchaser may determine that the counterparty may be a thief, or the like, who stole the art work, and can reject the transaction.

The prospective purchaser also operates the viewer terminal 31 to acquire an object fingerprint of the art work to be transacted. The viewer terminal 31 performs an object authentication using the acquired object fingerprint and the object fingerprint included in the ownership right certificate.

When the object authentication is successful, the prospective purchaser determines that the art work to be transacted is the same art work as the art work for which the ownership right is registered. On the other hand, when the object authentication fails, the prospective purchaser can determine that the art work to be transacted is a different art work from the art work for which the ownership right is registered, and reject to transact.

In this way, the viewer terminal 31 performs an object authentication using an object fingerprint acquired from an item to be verified and an object fingerprint described in an ownership right certificate. In addition, the viewer terminal 31 performs a biometric authentication using biometric information acquired from a person to be verified and biometric information described in the ownership right certificate. The viewer (the viewer terminal 31) determines that the item and the person to be verified are legitimate when the object authentication and the biometric authentication are successful.

The prospective purchaser begins full-scale price negotiations, and so on, when the biometric authentication and the object authentication are successful. Note that a registration of a transfer of the ownership right when the transaction (buying and selling) is concluded and the ownership right is transferred is described below.

Next, details of the individual apparatuses included in the art work management system according to the first example embodiment will be described.

[User Terminal]

Examples of the user terminal 30 include a portable terminal device such as a smartphone, a portable phone, a game console, or a tablet and a computer (a personal computer or a laptop computer).

Figure 8:
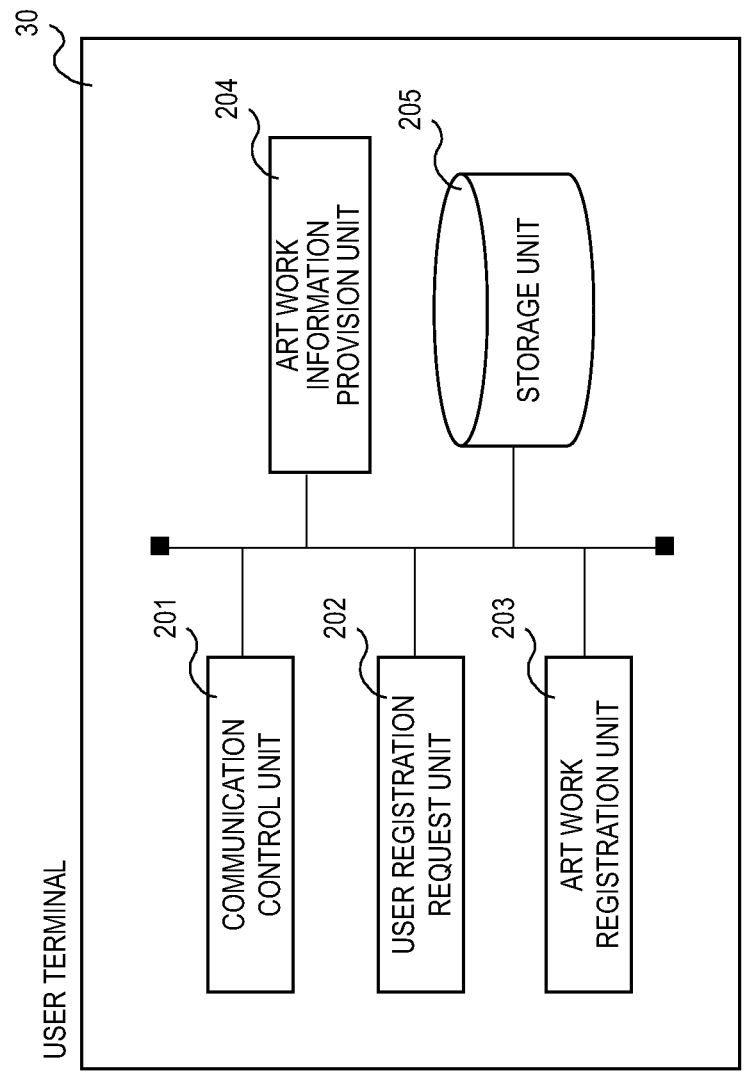
FIG. 8 is a diagram illustrating an example of a processing configuration of the user terminal according to the first example embodiment.

FIG. 8 is a diagram illustrating an example of a processing configuration (processing modules) of the user terminal 30 according to the first example embodiment. As illustrated in FIG. 8, the user terminal 30 includes a communication control unit 201, a user registration request unit 202, an art work registration unit 203, an art work information provision unit 204, and a storage unit 205.

The communication control unit 201 is means (communication unit) for controlling communication with other apparatuses. For example, the communication control unit 201 receives data (packets) from the server apparatus 10. In addition, the communication control unit 201 transmits data to the server apparatus 10. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201. The communication control unit 201 includes a function as a receiving unit that receives data from other apparatuses and a function as a transmitting unit that transmits data toward other apparatuses.

The user registration request unit 202 is means for requesting the above-mentioned user registration (system registration, membership registration) to the server apparatus 10. For example, when a "user registration" button on a menu screen shown in FIG. 3 is pressed, the user registration request unit 202 acquires biometric information, personal information (for example, a name, a date of birth, an address, contact information, account information, and so on), an identity verification document, and so on of the user.

For example, the user registration request unit 202 acquires the above biometric information and so on using a GUI (graphical user interface) as shown in FIG. 9. The user information registration request unit 202 transmits to the server apparatus 10 a user registration request including biometric information, personal information, and the identity verification document, and so on, acquired by using the GUI.

The user registration request unit 202 acquires a response (positive response or negative response) to the user registration request from the server apparatus 10. When a negative response is received, the user registration request unit 202 notifies the user that the user registration failed. When a positive response is received, the user registration request unit 202 notifies the user that user registration is successful, and stores the user ID notified from the server apparatus 10 in the storage unit 205.

The art work registration unit 203 is means for initial registration of an art work. For example, when an "art work registration" button on the menu screen shown in FIG. 3 is pressed, the art work registration unit 203 acquires at least biometric information of the user (for example, a face image) and an object fingerprint of the art work to be registered.

For example, the art work registration unit 203 acquires image data including the face image of the user and image data including the object fingerprint of the art work by using a GUI (graphical user interface) as shown in FIG. 10.

Alternatively, the art work registration unit 203 may photograph the user (so-called "selfie") and acquire the biometric information of the user. Similarly, the art work registration unit 203 may acquire the object fingerprint by photographing a predefined area of the art work (object fingerprint acquisition area) with a camera for acquiring object fingerprints.

Note that the biometric information (for example, a face image) at the time of the art work registration may be the same as or different from the biometric information at the time of the user registration. However, it is preferable that latest biometric information is used when registering the art work, for example, when a long time has passed since the user registration.

After acquiring the biometric information and the object fingerprint, the art work registration unit 203 transmits an art work registration request including at least the biometric information and the object fingerprint to the server apparatus 10.

Note that the art work registration unit 203 may transmit to the server apparatus 10 the art work registration request that includes other information regarding the owner and the art work in addition to the biometric information and object fingerprint described above. For example, the art work registration unit 203 may transmit to the server apparatus 10 the art work registration request including a name of the owner, a general address (for example, a name of city, town or village of his/her residence), contact information (an e-mail address), a name of an art work, a name of an artist and year of production, and so on.

The art work registration unit 203 receives a response to the art work registration request from the server apparatus 10. When a negative response indicating that the art work registration failed is received, the art work registration unit 203 notifies the user to that effect. When a positive response is received indicating that the art work is successfully registered, the art work registration unit 203 registers a transaction ID included in the response in the art work management database.

More specifically, the art work registration unit 203 registers the transaction ID acquired in the response to the art work registration request as the transaction ID corresponding to the ownership right certificate in the art work management database.

FIG. 11 is a diagram illustrating an example of the art work management database. As shown in FIG. 11, an art work name field, an image data field, an object fingerprint field, a document name field, and a transaction ID (TXID) field are included in the art work management database. Note that the art work management database shown in FIG. 11 is an example and is not intended to limit the items to be stored. For example, an appraisal value, and so on of each art work may be registered in the art work management database. Alternatively, object fingerprint may not be registered in the art work management database.

The art work registration unit 203 sets "ownership right certificate" in the document name field of the registered art work and sets the transaction ID acquired from the server apparatus 10 in the transaction ID field.

Note that a description of a generation of entries and so on to be added to the art work management database is omitted. When the user terminal 30 acquires a name of the art work or image data of the art work to be managed, the user terminal 30 may add a new entry to the art work management database. Alternatively, the art work registration unit 203 may acquire the name, image data and object fingerprint of the art work and may add a new entry to the art work management database, when the art work is registered in the system.

The art work information provision unit 204 is means for providing a user with information on an art work managed by the art work management system. The art work information provision unit 204, for example, displays information registered in the art work management database when an "checking art work" button on a menu screen shown in FIG. 3 is pressed.

Figure 6:
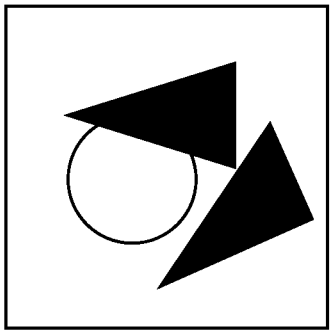
FIG. 6 is a diagram illustrating an example of a display of the user terminal according to the first example embodiment.

For example, the art work information provision unit 204 displays a screen shown in FIG. 6 in response to the user's operation. As shown in FIG. 6, the user terminal 30 displays information about the art work (for example, the name of the art work, the author, and so on) and the transaction ID that corresponds to the ownership right certificate.

By seeing the display, the user is able to know the transaction ID corresponding to the various documents of the art work owned by the user.

The storage unit 205 is means for storing information necessary for an operation of the user terminal 30. The art work management database is established in the storage unit 205.

[Server Apparatus]

Figure 12:
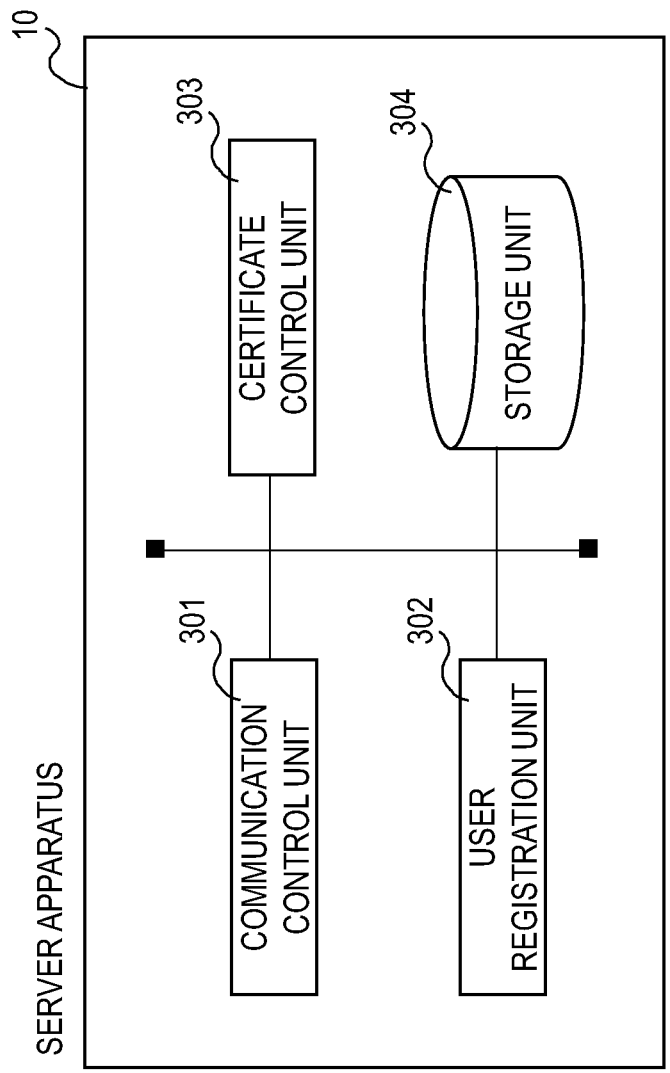
FIG. 12 is a diagram illustrating an example of a processing configuration of a server apparatus according to the first example embodiment.

FIG. 12 is a diagram for illustrating an example of a processing configuration (processing modules) of the server apparatus 10 according to the first example embodiment. As illustrated in FIG. 12, the server apparatus 10 includes a communication control unit 301, a user registration unit 302, a certificate control unit 303, and a storage unit 304.

The communication control unit 301 is means (communication unit) for controlling communication with other apparatuses. For example, the communication control unit 301 receives data (packets) from the user terminal 30. In addition, the communication control unit 301 transmits data to the user terminal 30. The communication control unit 301 gives data received from other apparatuses to other processing modules. The communication control unit 301 transmits data acquired from other processing modules to other apparatuses. In this way, other processing modules transmit and receive data to and from other apparatuses via the communication control unit 301. The communication control unit 301 includes a function as a receiving unit that receives data from other apparatuses and a function as a transmitting unit that transmits data to other apparatuses.

The user registration unit 302 is means for realizing a user registration. The user registration unit 302 receives a user registration request from the user terminal 30. The user registration unit 302 verifies an identity of a user by using biometric information and an identity verification document included in the user registration request.

The user registration unit 302 extracts a feature value from the biometric information (a face image) included in the user registration request. An existing technique can be used to generation process of the feature value, and therefore, detailed description thereof will be omitted. For example, the user registration unit 302 extracts the eyes, nose, mouth, or the like from the face image as the feature points. Next, the user registration unit 302 calculates the location of an individual feature point and the distance between feature points as feature values and generates a feature vector formed by the plurality of feature values (vector information that characterizes the face image).

Similarly, the user registration unit 302 generates a feature value from the face image described in the identity verification document. After that, the user information registration unit 302 performs a biometric authentication (a one-to-one authentication) using the above two biometric information (feature values).

The user registration unit 302 calculates a similarity between each of the two feature values. For the individual similarity, the chi-squared distance, the Euclidean distance, or the like may be used. A large distance represents a lower similarity, and a smaller distance represents a higher similarity.

The user registration unit 302 determines that the biometric authentication is successful when the calculated similarity is greater than or equal to a predetermined threshold value. On the other hand, the user registration unit 302 determines that the biometric authentication fails when the calculated similarity is smaller than the predetermined threshold value. The user registration unit 302 determines that the identity verification is successful when the biometric authentication is successful.

When the identity verification fails, the user registration unit 302 transmits a negative response to the user terminal 30 indicating that the user registration failed.

When the identity verification is successful, the user registration unit 302 generates a user ID to identify the user. Also, the user registration unit 302 transmits a positive response to the user terminal 30 indicating that the user registration is successful. At that time, the user registration unit 302 transmits the positive response including the generated user ID to the user terminal 30.

The user registration unit 302 associates the generated user ID, biometric information of the user, and personal information (for example, name, e-mail address, crypto-assets account, and so on) and stores them in a user information database (see FIG. 13). Thus, the user information database is a database that stores the user ID, biometric information, personal information, and so on of each of a plurality of users whose identity verification is completed.

Note that the user information database shown in FIG. 13 is an example and is not intended to limit the items to be stored. For example, information identifying the address and an identity verification document of the user (for example, passport number, and so on) may be stored in the user information database.

A certificate control unit 303 is means for controlling various certificates, deeds, and so on, that are published by the art work management system. For example, the certificate control unit 303 processes an art work registration request received from the user terminal 30.

When receiving the art work registration request, the certificate control unit 303 performs an authentication of a user who makes the request. Specifically, the certificate control unit 303 checks that the art work registration request is from the user whose user registration is completed. The certificate control unit 303 verifies that an applicant for the art work registration is registered as a user, thereby preventing the art work registration by impersonating another person or a thief from registering the art work.

The certificate control unit 303 performs a biometric authentication (one-to-N authentication; N is a positive integer, the same below) using a feature value generated from a face image included in the art work registration request and a feature value registered in the user information database. Alternatively, the authentication control unit 303 may perform a one-to-one authentication using the registered biometric information associated with a login ID when the authentication is supported using the login ID. That is, the certificate control unit 303 may support a multi-factor authentication.

When the biometric authentication fails, the certificate control unit 303 aborts the processing of the art work registration request and transmits a negative response to the user terminal 30 indicating that the request is not processed normally. When the biometric authentication is successful, the certificate control unit 303 proceeds to process the art work registration request. In this way, the certificate control unit 303 generates an ownership right certificate (starts generating the ownership right certificate) when an authentication using biometric information included in an art work registration request and biometric information stored in the user information database is successful.

The certificate control unit 303 generates the ownership right certificate using the information included in the art work registration request.

The certificate control unit 303 generates the ownership right certificate, for example, as shown in FIG. 14. As shown in FIG. 14, the certificate control unit 303 generates the ownership right certificate that includes the object fingerprint of the art work and the biometric information (the feature value) of the owner. Note that the ownership right certificate shown in FIG. 14 is an example and is not intended to limit the ownership right certificate generated by the certificate control unit 303. The ownership right certificate may include at least the object fingerprint of the art work that is the subject of a certification of the ownership right and the biometric information of the owner.

The certificate control unit 303 calculates a hash value of the generated ownership right certificate and generates a transaction (a transaction including an ownership right certificate) with the calculated hash value as the transaction ID.

The certificate control unit 303 transmits the generated transaction to the data management system 20. When the transaction is approved by each ledger node 21 of the data management system 20 and is written on the electronic bulletin board, the certificate control unit 303 transmits the above generated transaction ID to the user terminal 30.

More specifically, the certificate control unit 303 transmits a positive response including the transaction ID to the user terminal 30. Note that when the certificate control unit 303 cannot normally process the art work registration request, such as when the transaction is not successfully written on the electronic bulletin board, the certificate control unit 303 transmits a negative response to that effect to the user terminal 30.

The storage unit 304 is means for storing information necessary for the operation of the server apparatus 10. The user information database is established in the storage unit 304.

[Viewer Terminal]

Examples of the viewer terminal 31 include a portable terminal device such as a smartphone, a portable phone, a game console, or a tablet and a computer (a personal computer or a laptop computer).

Figure 15:
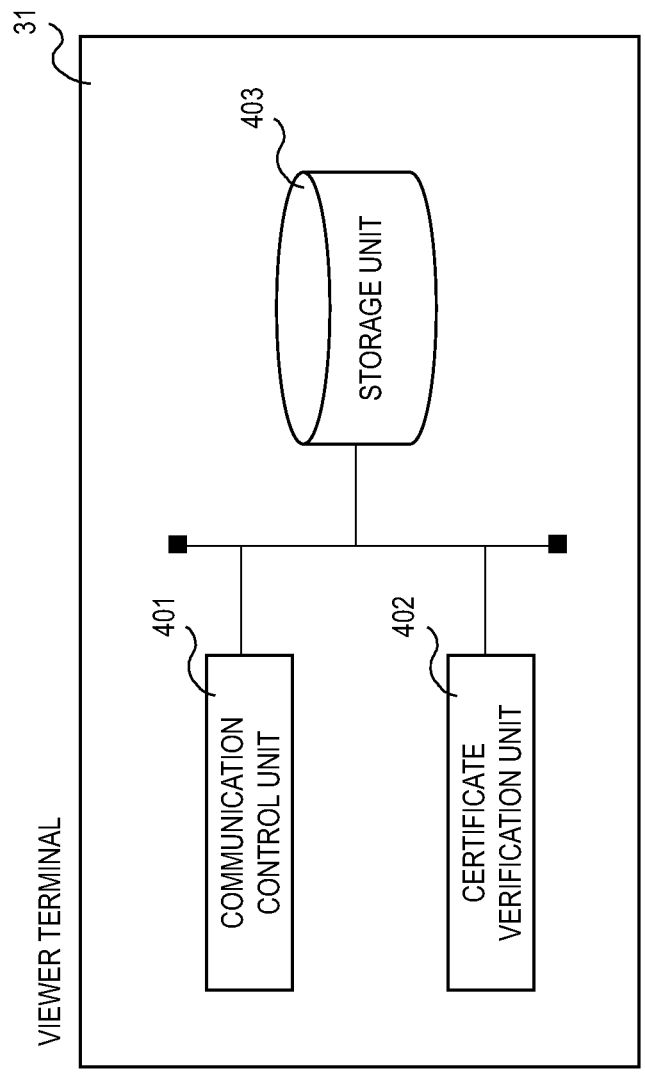
FIG. 15 is a diagram illustrating an example of a display of a viewer terminal according to the first example embodiment.

FIG. 15 is a diagram illustrating an example of a processing configuration (processing modules) of the viewer terminal 31 according to the first example embodiment. As illustrated in FIG. 15, the viewer terminal 31 includes a communication control unit 401, a certificate verification unit 402, and a storage unit 403.

The communication control unit 401 is means (communication unit) for controlling communication with other apparatuses. For example, the communication control unit 401 receives data (packets) from the data management system 20. In addition, the communication control unit 401 transmits data toward the data management system 20. The communication control unit 401 gives data received from other apparatuses to other processing modules. The communication control unit 401 transmits data acquired from other processing modules to other apparatuses. In this way, other processing modules transmit and receive data to and from other apparatuses via the communication control unit 401. The communication control unit 401 includes a function as a receiving unit that receives data from other apparatuses and a function as a transmitting unit that transmits data to other apparatuses.

The certificate verification unit 402 is means for verifying various certificates related to art works. For example, the certificate verification unit 402 performs a verification operation regarding an ownership right certificate in accordance with a predetermined action by a viewer (for example, an operation on a menu screen, and so on).

Figure 16:
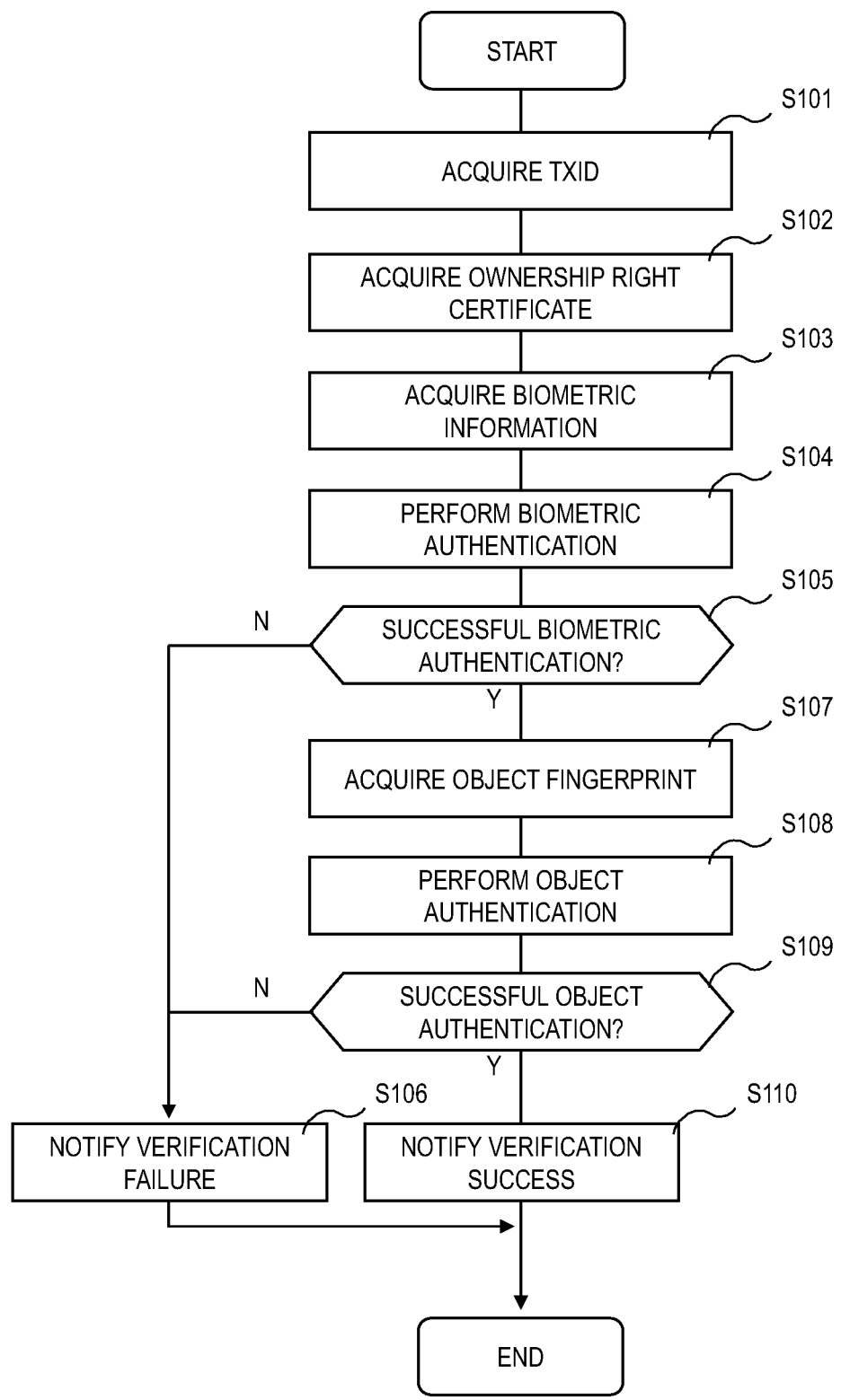
FIG. 16 is a flowchart illustrating an example of an operation of a certificate verification unit according to the first example embodiment.

Referring to FIG. 16, the operation of the certificate verification unit 402 is described. FIG. 16 is a flowchart illustrating an example of the operation of the certificate verification unit 402 according to the first example embodiment.

The certificate verification unit 402 acquires a transaction ID corresponding to an ownership right certificate to be verified by an arbitrary means (step S101). For example, the certificate verification unit 402 may acquire the transaction ID by the viewer inputting the transaction ID presented by an owner of an art work into the viewer terminal 31.

Alternatively, the certificate verification unit 402 may acquire the transaction ID via an e-mail transmitted from the user terminal 30 or from a USB (Universal Serial Bus) memory in which the transaction ID is stored.

After acquiring the transaction ID, the certificate verification unit 402 transmits the transaction ID to the data management system 20 (electronic bulletin board) and acquires the corresponding ownership right certificate (step S102).

When the ownership right certificate is acquired, the certificate verification unit 402 verifies the ownership right certificate. Specifically, the certificate verification unit 402 acquires biometric information (face image) of an owner of the art work to be verified (step S103). For example, the certificate verification unit 402 photographs the owner and acquires the face image in accordance with an operation of the viewer.

The certificate verification unit 402 performs a biometric authentication using the acquired biometric information and biometric information included in the ownership right certificate (step S104).

When the biometric authentication fails (step S105, No branch), the certificate verification unit 402 notifies the viewer that the verification of the ownership right certificate fails (step S106).

When the biometric authentication is successful (step S105, Yes branch), the certificate verification unit 402 acquires an object fingerprint from the art work to be verified (step S107). For example, the certificate verification unit 402 acquires the object fingerprint by photographing a predetermined area of the art work in accordance with an operation of the viewer.

The certificate verification unit 402 performs an object authentication using the object fingerprint acquired from the art work in front of the viewer and an object fingerprint included in the ownership right certificate (step S108). Note that a detailed description of the object authentication by the certificate verification unit 402 is omitted because existing technologies can be applied to object authentication. However, the certificate verification unit 402 performs the object authentication by the following process, in outline.

The certificate verification unit 402 performs a matching of the object fingerprint (an image photographed of an art work) using an image matching method using a local feature value and an algorithm that verifies a consistency in a geometric arrangement of feature points. At first, the certificate verification unit 402 extracts a location as a feature point where a change in luminance is steep and a position can be stably located from the object fingerprint image. After that, the certificate verification unit 402 converts a local luminance pattern around the feature point into data as a feature value. Further, the certificate verification unit 402 calculates a pair of the feature points that minimize the difference in the feature values from the images of both parties to be matched. Finally, the certificate verification unit 402 verifies a geometric consistency of an overall arrangement of the feature points. The certificate verification unit 402 extracts a group of pairs whose relative positional relationship to other feature points is consistent from the obtained groups of pairs. The matching unit 402 calculates the matching score for both images using a total of the number of the feature points extracted from the two images to be matched and the number of pairs of the feature points with a correct geometric arrangement. The certificate verification unit 402 determines that the object authentication is successful when the matching score is equal to or greater than a predetermined threshold value. The certificate verification unit 402 determines that the object authentication fails when the matching score is smaller than the predetermined threshold value.

When the object authentication fails (step S109, No branch), the certificate verification unit 402 notifies the viewer that the verification of the ownership right certificate fails (step S106).

When the object authentication is successful (step S109, Yes branch), the certificate verification unit 402 notifies the viewer that the verification of the ownership right certificate is successful (step S110).

The storage unit 403 is means for storing information necessary for the operation of the viewer terminal 31.

[Data Management System and Ledger Node]

A detailed description of the data management system 20 and the ledger node 21 is omitted. This is because the ledger node 21 can be realized with existing technology that realizes crypto-assets such as bitcoin and is obvious to those skilled in the art.

[System Operation]

Figure 17:
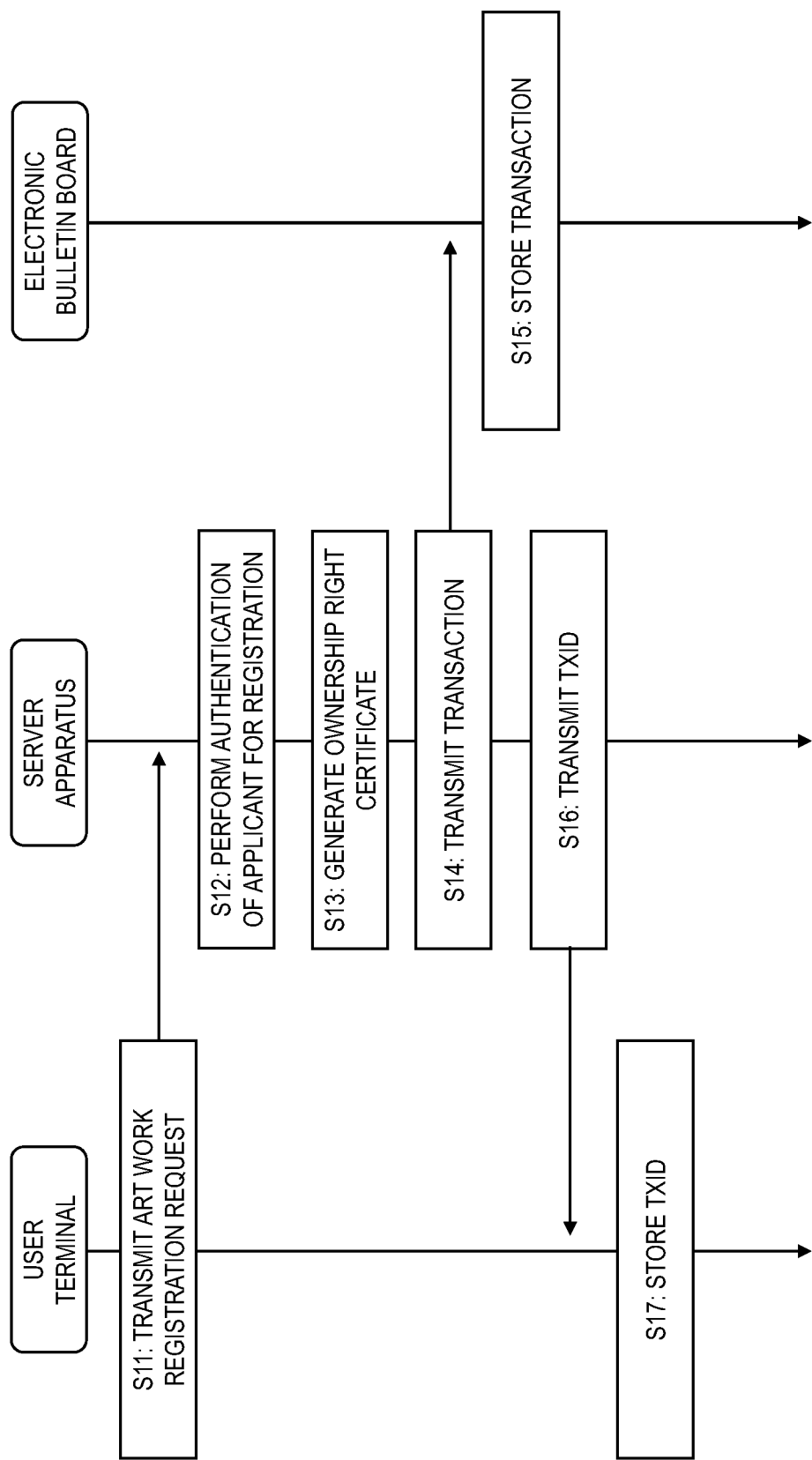
FIG. 17 is a sequence diagram illustrating an example of an operation of the art work management system according to the first example embodiment.

Next, operations in the art work management system according to the first example embodiment will be described. FIG. 17 is a sequence diagram illustrating an example of the operation of the art work management system according to the first example embodiment. Referring to FIG. 17, the system operation regarding a registration of an ownership right certificate is described.

The user terminal 30 transmits an art work registration request that includes an object fingerprint of an art work to be registered in the system and biometric information of an owner to the server apparatus 10 (step S11).

The server apparatus 10 performs an authentication of an applicant who applies for the registration of the art work (step S12).

When the authentication is successful, the server apparatus 10 generates an ownership right certificate using the biometric information and the object fingerprint included in the art work registration request (step S13).

The server apparatus 10 generates a transaction including the generated ownership right certificate and transmits the generated transaction to the electronic bulletin board (the data management server system 20) (step S14).

The electronic bulletin board stores the received transaction (step S15).

When the transaction is normally processed, the server apparatus 10 transmits a transaction ID of the transaction corresponding to the ownership right certificate to the user terminal 30 (step S16).

The user terminal 30 stores the acquired transaction ID as a transaction ID corresponding to the ownership right certificate (step S17).

Figure 18:
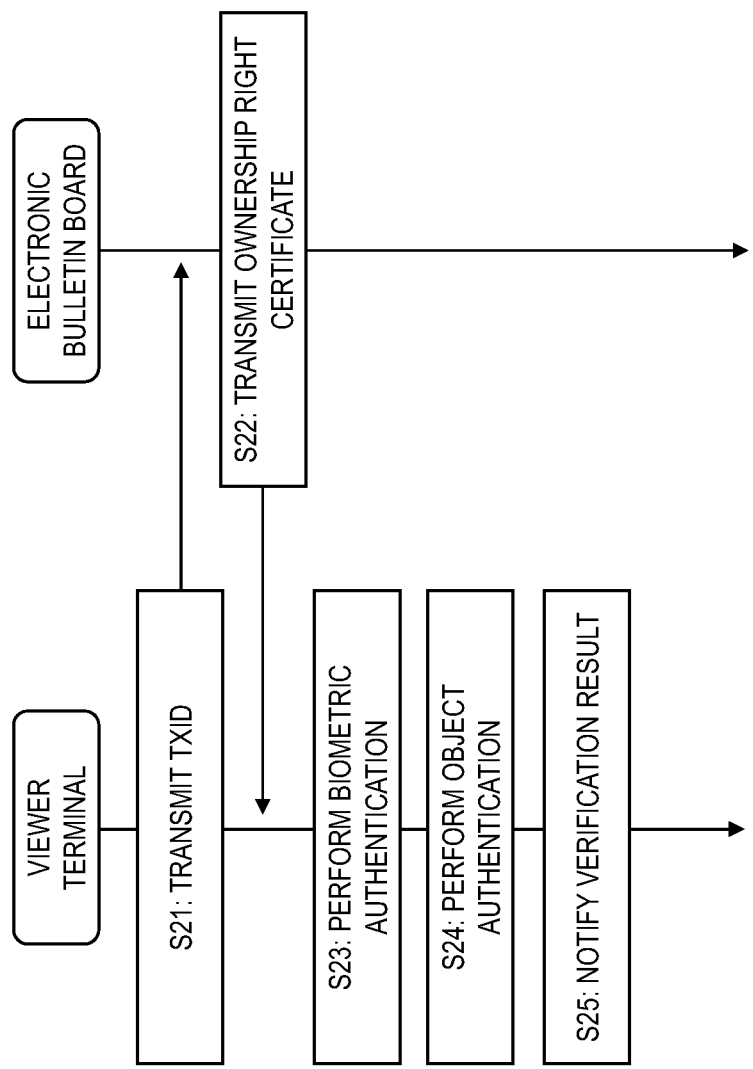
FIG. 18 is a sequence diagram illustrating an example of an operation of the art work management system according to the first example embodiment.

Next, referring to FIG. 18, the system operation regarding viewing an ownership right certificate will be described. FIG. 18 is a sequence diagram illustrating an example of an operation in the art work management system according to the first example embodiment.

The viewer terminal 31 transmits a transaction ID corresponding to an ownership right certificate to be viewed to the electronic bulletin board (step S21).

The electronic bulletin board (the data management system 20) identifies a transaction corresponding to the transaction ID and transmits the ownership right certificate to the viewer terminal 31 (step S22).

The viewer terminal 31 performs a biometric authentication using biometric information of an owner of an art work and biometric information included in the ownership right certificate (step S23).

The viewer terminal 31 performs an object authentication using an object fingerprint of the art work and an object fingerprint included in the ownership right certificate (step S24).

The viewer terminal 31 notifies the viewer of a verification result (step S25). When the two authentications are successful, the viewer terminal 31 notifies the user that the verification of the ownership right certificate is successful. When at least one of the two authentications fails, the viewer terminal 31 notifies the user that the verification of the ownership right certificate fails.

As described above, in the art work management system according to the first example embodiment, an ownership right certificate consisting of an object fingerprint of an art work (an art work ID) and biometric information of an owner (an owner ID) is written on the electronic bulletin board. Since the electronic bulletin board is accessible to all, the owner of the art work can disclose the fact that he or she owns the art work. In addition, a third party, such as a prospective purchaser of the art work can easily identify an object to be transacted using the object fingerprint or biometric information and verify a legitimacy of the object to be transacted. That is, the ownership right of the art work is registered on the electronic bulletin board (a blockchain), and the registered ownership right (the ownership right certificate) cannot be tampered with, so that the prospective purchaser of the art work can know a correct transition and an identity of the art work.

Second Example Embodiment

Next, a second example embodiment will be described in detail with reference to drawings.

In the second example embodiment, it is described that a worksheet is written on the electronic bulletin board including details of a work performed on an art work by a person other than an owner of the art work.

A user terminal 30 according to the second example embodiment acquires the worksheet from a person other than the owner of an item. The user terminal 30 writes directly or indirectly on the electronic bulletin board "work certificate" including at least biometric information of the owner of the art work, an object fingerprint of the art work, and the above-mentioned worksheet.

More specifically, in the second example embodiment, it describes that a certificate of appraisal and restoration of the art work is registered on the electronic bulletin board. When an appraisal is performed on an art work, a result (details) of an appraisal work is certified by the work certificate. Similarly, when a restoration is performed on the art work, a result (details) of a restoration work is certified by the work certificate.

The following description will be made with a focus on the difference between the first example embodiment and the second example embodiment.

Figure 19:
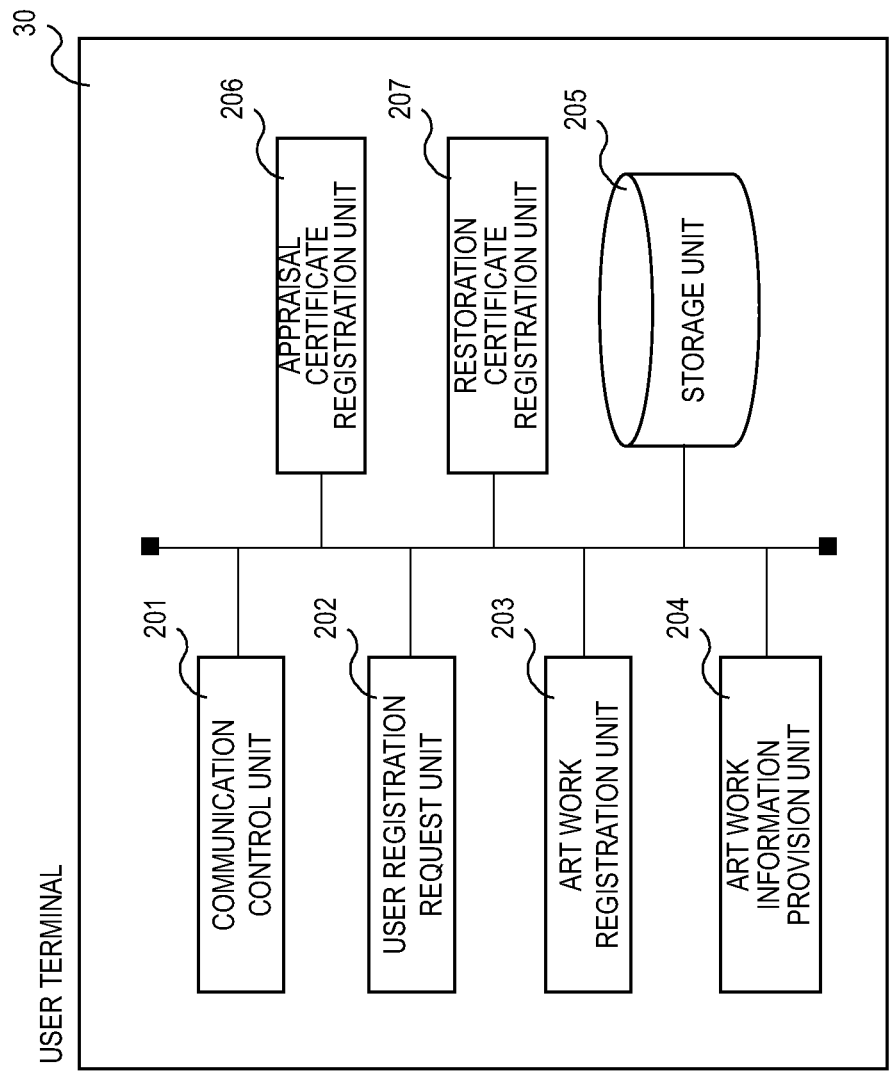
FIG. 19 is a diagram illustrating an example of a processing configuration of a user terminal according to a second example embodiment.

FIG. 19 is a diagram illustrating an example of a processing configuration (processing modules) of the user terminal 30 according to the second example embodiment. Referring to FIG. 19, an appraisal certificate registration unit 206 and a restoration certificate registration unit 207 are added to the configuration of the user terminal 30 according to the first example embodiment.

[Appraisal of Art Work]

Figure 20:
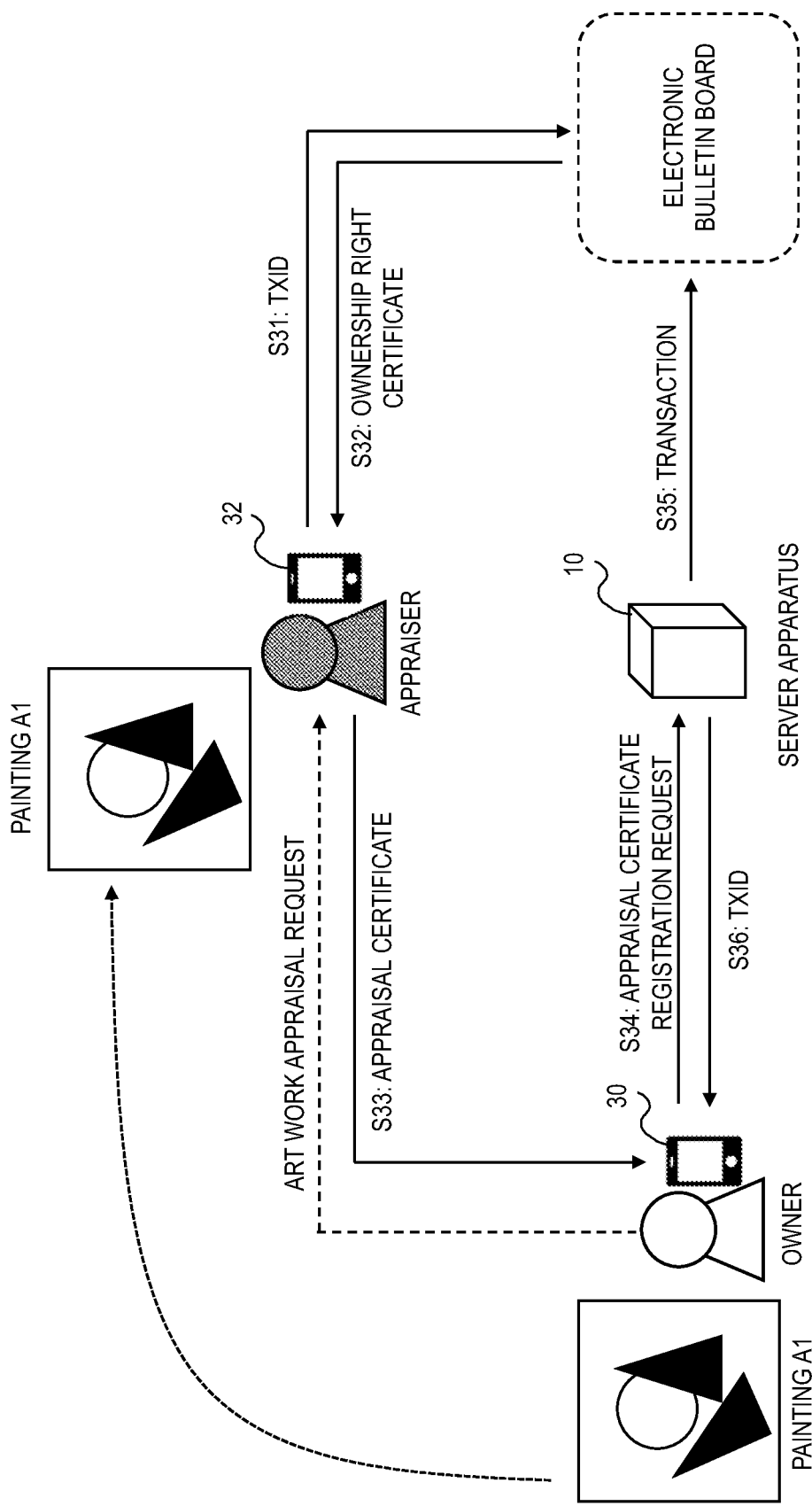
FIG. 20 is a diagram illustrating an operation of an art work management system according to the second example embodiment.

A user requests an appraiser (assessor) to appraise an art work in order to determine of an authenticity and value of the art work owned by a user (see FIG. 20). Note the appraiser uses an appraiser terminal 32 as shown in FIG. 20. Since a basic operation of the appraiser terminal 32 can be the same as an operation of the viewer terminal 31 described in the first example embodiment, a detailed description is omitted.

A user who wishes to have an appraisal brings an art work to an appraiser or appraisal institution and request an appraisal. By performing the appraisal of the art work, the user certifies that the art work is a genuine art work, thereby enhancing or checking the value of the art work.

Note that the appraisal of the art work is performed at an arbitrary timing. In other words, the appraisal may be performed when the art work is registered in the system, or it may be performed after the art work is registered in the system. In other words, the "authenticity" of the art work does not matter at the time of an initial registration of the art work. When a creator (an author) of the art work registers the art work, there is no doubt that the genuine work is registered in the system. In addition, when an existing art work is registered in the system, an appraisal may be performed as necessary at the time of a transaction.

The user submits to the appraiser an ownership right certificate for the art work to be appraised. Specifically, the user informs the appraiser of a transaction ID corresponding to the art work. The user may verbally inform the appraiser of the transaction ID or may submit a document on which the transaction ID is printed to the appraiser. Alternatively, the user may operate the user terminal 30 and transmit the transaction ID to the appraiser via e-mail, or submit a USB (Universal Serial Bus) memory, and so on containing the transaction ID to the appraiser.

The appraiser operates the appraiser terminal 32 to transmit the acquired transaction ID to the electronic bulletin board (the data management system 20) (step S31 in FIG. 20). The appraiser acquires an ownership right certificate corresponding to the transaction ID from the electronic bulletin board (Step S32).

The appraiser operates the appraiser terminal 32 to verify a legitimacy of a client and a legitimacy of the art work requested to be appraised.

Specifically, the appraiser operates the appraiser terminal 32 to acquire biometric information (for example, a face image) of the client. The appraiser terminal 32 performs a biometric authentication using the acquired biometric information and biometric information included in the ownership right certificate. When the authentication is successful, the appraiser determines that the appraisal is requested by a legitimate owner. In other words, when the authentication fails, the appraiser can reject the appraisal request.

Moreover, the appraiser operates the appraiser terminal 32 to acquire an object fingerprint of the requested art work. The appraiser terminal 32 performs an object authentication using the acquired object fingerprint and object fingerprint included in the ownership right certificate.

When the object authentication is successful, the appraiser determines that the art work requested for appraisal is the same art work whose ownership right is registered. On the other hand, when the object authentication fails, the appraiser determines that the art work requested for appraisal is a different art work than the art work whose ownership right is registered. In this way, the appraiser performs an object authentication of an art work requested to be appraised, thereby enabling the appraiser to appraise the art work whose ownership right is correctly disclosed. In other words, by performing the object authentication, the appraiser can reject a request to appraise the art work whose ownership right is not duly registered (for example, a stolen art work).

The appraiser accepts a request for appraisal from the client when the biometric authentication and the object authentication are successful. When either the biometric authentication or the object authentication fails, the appraisal request from the client is rejected.

In this way, the appraiser terminal 32 acquires an ownership right certificate that includes an object fingerprint of an art work and biometric information of an owner. The appraiser terminal 32 performs an object authentication using an object fingerprint acquired from the item to be appraised and an object fingerprint described in the ownership right certificate. In addition, the appraiser terminal 32 performs a biometric authentication using biometric information acquired from the client of the appraisal and biometric information described in the ownership right certificate. When the authentication is successful for the object authentication and the biometric authentication, the appraiser (the appraiser terminal 32) determines that the art work to be verified and the client are legitimate.

When the appraiser accepts the request for appraisal from the client, the appraiser determines an authenticity of the art work by scientific analysis of materials on the art work, characteristics of the art work, and paints used in the work, and so on. When the appraiser determines that the art work to be appraised is genuine, the appraiser issues an appraisal certificate (an electronic appraisal certificate; a digital appraisal certificate) certifying that the art work is genuine.

The appraisal certificate includes a result of the appraisal. Specifically, the result includes a name of the art work, a creator (an author), a size (dimensions), an age, an authenticity of an object to be appraised, characteristics, a date of the appraisal, and information to identify the appraiser (for example, a name (a signature or a seal), biometric information), and so on. Alternatively, the appraisal certificate may be a sentence including the appraisal value, such as "The art work with object fingerprint OF01 is the work of painter B1 of the year Y1 as a result of the appraisal and is assumed to be valued at 200 million yen at the present time." In addition to or instead of the above information for identifying the appraiser, information identifying an institution to which the appraiser belongs (for example, a name of an association) and so on may also be described in the appraisal certificate.

The appraiser applies an electronic signature to an electronic file containing the above information and generates an appraisal certificate. Note that a public key certificate (an electronic certificate) corresponding to a private key used to generate the electronic signature is issued by an institution or organization that guarantees an identity of the appraiser.

The appraiser transmits the generated appraisal certificate (with the electronic signature) to the client. Specifically, the appraiser operates the appraiser terminal 32 to transmit the appraisal certificate to the user terminal 30 of the client (step S33 in FIG. 20).

The client (the owner of the art work) registers the appraisal certificate on the electronic bulletin board using the art work management application. Specifically, the user presses an "appraisal certificate registration" button shown in FIG. 3, and requests the server apparatus 10 to register the appraisal certificate.

When the appraisal certificate registration button is pressed, the appraisal certificate registration unit 206 transmits an appraisal certificate registration request that includes the transaction ID of the ownership right certificate, the appraisal certificate acquired from the appraiser, the biometric information of the owner, and the object fingerprint of the art work to the server apparatus 10 (step S34). In this way, the user terminal 30 acquires an appraisal certificate with a signature of the appraiser who performs an appraisal of an art work, and transmits an appraisal certificate registration request including the appraisal certificate with the signature of the appraiser to the server apparatus 10.

Note that the appraisal certificate registration unit 206 may reuse the biometric information and object fingerprint acquired at the time of registration of the art work, or it may acquire biometric information and object fingerprint anew at the time of registration of the appraisal certificate.

A certificate control unit 303 of the server apparatus 10 verifies an electronic signature attached to an appraisal certificate included in the appraisal certificate registration request. By verifying the electronic signature, the certificate verification unit 303 checks a legitimacy of the appraiser who has been generated the appraisal certificate. The server apparatus 10 can generate the appraisal certificate to be disclosed to the public (initiate a generation of the appraisal certificate) when the signature of the appraiser is successfully verified.

When the verification of the electronic signature is successful, the server apparatus 10 checks that the art work to be appraised exists in the world. In other words, the server apparatus 10 checks that the request is not a request to register an appraisal certificate for a fictitious art work. More specifically, the certificate control unit 303 checks that the ownership right certificate regarding the art work to be appraised is registered on the electronic bulletin board. The certificate control unit 303 transmits the transaction ID included in the appraisal certificate registration request to the electronic bulletin board and acquires the corresponding ownership right certificate.

The certificate control unit 303 verifies whether or not biometric information of the acquired ownership right certificate matches (substantially matches) biometric information included in the art work registration request. Similarly, the certificate control unit 303 verifies whether or not an object fingerprint of the acquired ownership right certificate matches (substantially matches) an object fingerprint included in the art work registration request.

When either verification fails, the certificate control unit 303 rejects the art work registration request (transmits a negative response to the user terminal 30). When the two verifications are successful, the certificate control unit 303 determines that the art work to be appraised is a real art work supported by the ownership right certificate.

When the two verifications regarding the ownership right certificate are successful, the certificate control unit 303 generates an appraisal certificate to be registered on the electronic bulletin board. Note that in the following description, the appraisal certificate registered on the electronic bulletin board is referred to as a "public appraisal certificate".

For example, the certificate control unit 303 generates a public appraisal certificate as shown in FIG. 21. As shown in FIG. 21, the certificate control unit 303 generates the public appraisal certificate including the object fingerprint of the art work to be appraised, the biometric information of the client (the owner of the art work) who requested the appraisal, and the appraisal certificate (the appraisal result) generated by the appraiser. The certificate control unit 303 generates a transaction that includes the public appraisal certificate. The certificate control unit 303 writes the generated transaction on the electronic bulletin board (step S35 in FIG. 20).

The certificate control unit 303 issues a transaction ID for the generated transaction to the user terminal 30 (step S36). The appraisal certificate registration unit 206 of the user terminal 30 manages the acquired transaction ID as a transaction ID of the registered appraisal certificate.

In this way, the user terminal 30 acquires an appraisal certificate that includes a result of an appraisal for an art work. The user terminal 30 transmits an appraisal certificate registration request that includes at least biometric information of an owner, an object fingerprint of the item, and the appraisal certificate to the server apparatus 10. The server apparatus 10 generates a public appraisal certificate that includes at least the biometric information of the owner, the object fingerprint of the item, and the result of the appraisal. The server apparatus 10 writes a transaction that includes the generated public appraisal certificate on the electronic bulletin board and transmits a transaction ID corresponding to the transaction to the user terminal 30.

[Restoration of Art Work]

Figure 22:
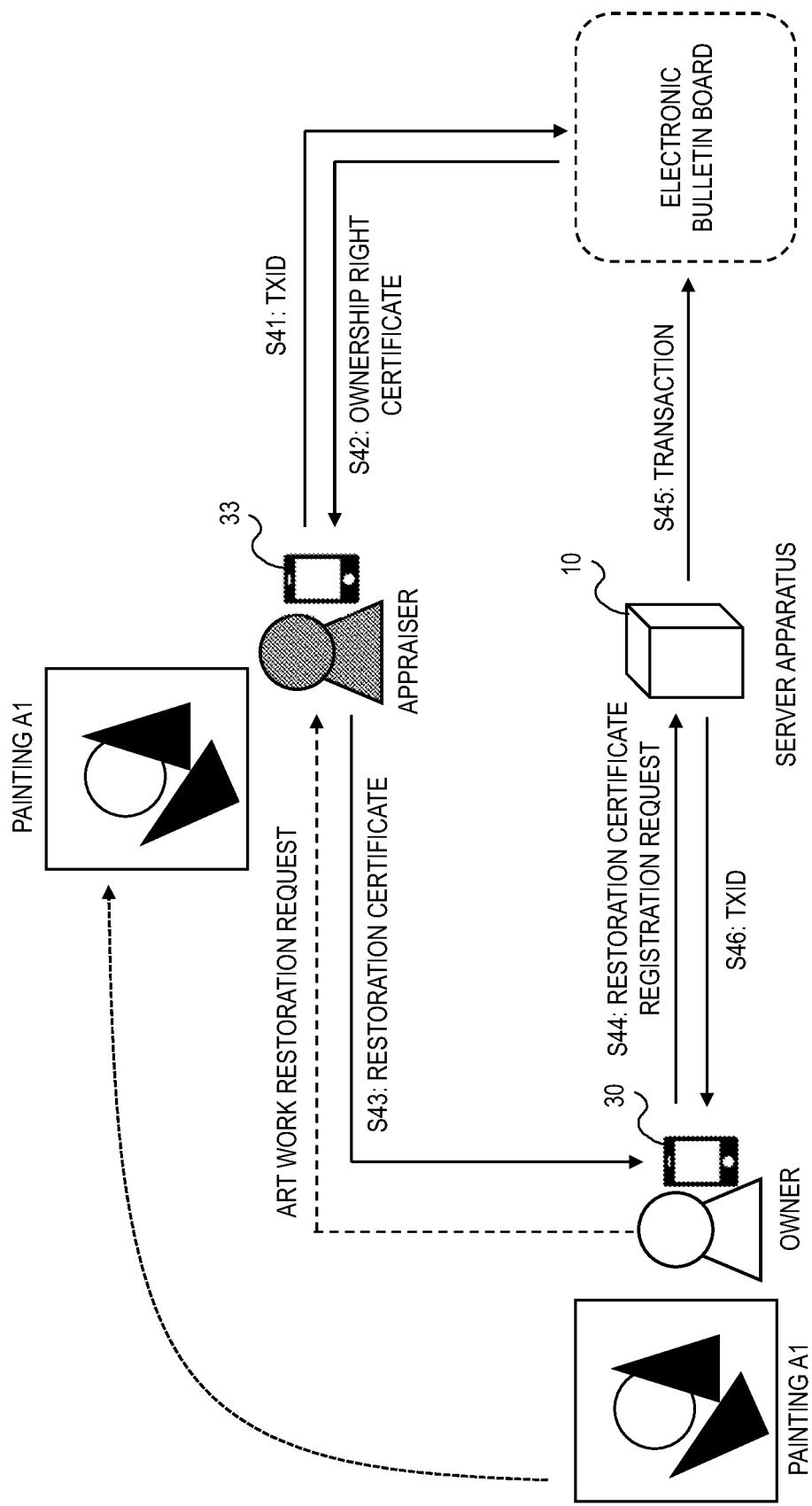
FIG. 22 is a diagram illustrating an operation of the art work management system according to the second example embodiment.

An operation of the art work management system with respect to a restoration of an art work is basically identical to an operation of the appraisal. Specifically, as shown in FIG. 22, an owner of the art work entrusts the art work to a restorer. The restorer transmits a transaction ID to the electronic bulletin board using a restorer terminal 33 and acquires an ownership right certificate (steps S41 and S42). The restorer verifies legitimacy of the client and the art work using biometric information and an object fingerprint included in the ownership right certificate.

When the biometric authentication and the object authentication are successful, the restorer restores the art work. The restorer generates a restoration certificate (a restoration certificate with an electronic signature) certifying details of the restoration and transmits the restoration certificate to the client (step S43). Thus, the restorer (the restorer terminal 33) determines that the item to be verified and the client are legitimate when the object authentication and the biometric authentication are successful. Note that the restoration certificate generated by the restorer includes information (for example, name and biometric information) for identifying the restorer.

The client operates the user terminal 30 and requests the server apparatus 10 to register the restoration certificate. Specifically, the restoration certificate registration unit 207 transmits to the server apparatus 10 a restoration certificate registration request that includes the transaction ID of the ownership right certificate, the restoration certificate acquired from the restorer, the biometric information of the user, and the object fingerprint of the art work (step S44). In this way, the user terminal 30 acquires the restoration certificate with the signature of the restorer who restored the art work, and transmits to the server apparatus 10 the restoration certificate registration request including the restoration certificate with the signature of the restorer.

The certificate control unit 303 of the server apparatus 10 verifies an electronic signature of the restoration certificate included in the restoration certificate registration request. The server apparatus 10 can generate the restoration certificate to be disclosed to the public (initiate a generation of the restoration certificate) when the signature of the restorer is successfully verified.

More specifically, when the verification of the electronic signature is successful, the certificate verification control unit 303 performs verifications (two verifications using biometric information and object fingerprints) with regard to the ownership right certificate of the art work to be restored.

When the verification of the ownership right certificate is successful, the certificate control unit 303 generates a public restoration certificate as shown in FIG. 23. The certificate control unit 303 generates a transaction that includes the public restoration certificate and appends the transaction on the electronic bulletin board (step S45 in FIG. 22).

The server apparatus 10 issues a transaction ID of the generated transaction to the user terminal 30 (step S46). The restoration certificate registration unit 207 of the user terminal 30 manages the acquired transaction ID as the transaction ID of the restoration certificate.

In this way, the user terminal 30 acquires a restoration certificate that includes the details of a restoration to an art work. The user terminal 30 transmits to the server apparatus 10 a restoration certificate registration request that includes biometric information of an owner, an object fingerprint of the art work, and the restoration certificate. The server apparatus 10 generates a public restoration certificate that includes the biometric information of the owner, the object fingerprint of the art work, and the details of the restoration. The server apparatus 10 writes a transaction that includes the generated public restoration certificate on the electronic bulletin board and transmits a transaction ID corresponding to the transaction to the user terminal 30.

[Overwriting of Object Fingerprint]

Here, as a result of a restoration of an art work by a restorer, an object fingerprint of an art work may change from its original object fingerprint. When such a change occurs, the object fingerprint described in an ownership right certificate does not match the object fingerprint acquired from an actual art work, which hinders the verification of the legitimacy of the art work. Therefore, the server apparatus 10 may generate a public restoration certificate that includes the object fingerprint acquired from the art work after the restoration.

Specifically, the restorer terminal 33 acquires the object fingerprint from the restored art work and transmits to the user terminal 30 the restoration certificate that includes the object fingerprint acquired from the restored art work. The user terminal 30 transmits to the server apparatus 10 a restoration certificate registration request that includes the restoration certificate (the restoration certificate that includes the object fingerprint acquired from the item after restoration). The server apparatus 10 generates the public restoration certificate including the object fingerprint acquired from the item after restoration.

In addition, with respect to an art work whose object fingerprint has been changed, the server apparatus 10 regenerates an ownership right certificate that existed prior to the restoration of the art work. Specifically, the server apparatus 10 generates a new ownership right certificate by reading the already registered ownership right certificate from the electronic bulletin board and replacing the object fingerprint of the read ownership right certificate with the object fingerprint described in the public restoration certificate. The server apparatus 10 writes the new ownership right certificate on the electronic bulletin board and discloses the ownership right certificate regarding the art work of the new object fingerprint.

Note that the owner of the art work may request that the art work to be appraised or restored when the appraiser or restorer is successfully authenticated. For example, the user operates the user terminal 30 to acquire biometric information of the appraiser or the like. The user terminal 30 may transmit the acquired biometric information to a server managed by an organization (such as an appraisal association) to which the appraiser or the like belong and may request for a biometric authentication. When the biometric authentication is successful, the user trusts the appraiser or the like in front of him/her and requests for the appraisal or the like.

As described above, in the art work management system according to the second example embodiment, an appraisal certificate and a restoration certificate of an art work are disclosed on the electronic bulletin board. The appraisal certificate or the restoration certificate written on the electronic bulletin board can objectively prove that a legitimate appraiser or the like has performed an appraisal or the like on an authentic item by a legitimate client. Specifically, a legitimacy of the client and the art work can be verified depending on whether or not biometric information and an object fingerprint described in the ownership right certificate of the art work and biometric information and an object fingerprint disclosed in the public appraisal certificate match, respectively. Alternatively, a legitimacy of the client and the art work can be verified depending on whether or not biometric information of the owner in front of the appraiser matches biometric information disclosed on the public appraisal certificate, and whether or not an object fingerprint of the art work in front of the appraiser matches an object fingerprint described on the public appraisal certificate. In addition, since an electronic signature of the appraiser is verified when the public appraisal certificate is generated, an identity of the appraiser is assured.

Third Example Embodiment

Next, a third example embodiment will be described in detail with reference to drawings.

In the third example embodiment, a transfer of an ownership right of an art work will be described. In the third example embodiment, a transfer of an art work will be described mainly.

The following description will be made with a focus on the difference from the first example embodiment to the third example embodiment.

A registration regarding a transfer of an ownership right resulting from a buying and selling of an art work is performed jointly by a transferor and a transferee. In other words, the transferor and the transferee jointly perform the transfer of the ownership right.

Note that since the transferee will become an owner of the art work in the future, it is assumed that the transferee is also registered as a user in the art work management system. In other words, the buying and selling of the art work is carried out among the users registered in the art work management system.

In addition, the transferor and transferee use user terminals 30 that include the same functions. The user terminal 30 according to the third example embodiment includes functions of the viewer terminal 31 described in the first example embodiment. More specifically, the user terminal 30 includes the same functions as a certificate verification unit 402 described in the first example embodiment. In other words, the transferor (a first user) uses a "first user terminal" and the transferee (a second user) uses a "second user terminal".

The transferee negotiates with the owner of the art work as the counterparty to the transaction regarding a purchase of the art work. At that time, the transferee verifies a legitimacy of the art work to be purchased and a legitimacy of the owner. As described above, the transferee operates the user terminal 30 and transmits a transaction ID corresponding to the ownership right certificate to the electronic bulletin board and acquires the corresponding ownership right certificate. The transferee performs the above verification by performing a biometric authentication of the transferor and an object authentication of the art work.

When there is an appraisal certificate (a registered appraisal certificate) or a restoration certificate (a registered restoration certificate) for the art work to be bought and sold, the transferor notifies the transferee of a transaction ID that corresponds to these documents. The transferee shall acquire these documents from the electronic bulletin board in the same manner as the ownership right certificates, check the details, and use them as a basis for making a decision on the transaction.

In addition, the transferee may verify a legitimacy of an art work to be transacted or a counterparty by using an object fingerprint of an art work or biometric information included in an appraisal certificate or a restoration certificate, as well as an ownership right certificate. Note that the verification of the object fingerprints and the biometric information included in the registration appraisal certificate and the registration restoration certificate can be the same as the verification of the object fingerprints and the biometric information included in the ownership right certificate, so a detailed description is omitted.

After confirming the legitimacy of the art work and transferor, the transferee negotiates the terms and conditions of the purchase of the art work (price, method of delivery, and so on) with the transferor. When the transferor and transferee agree on the buying and selling of the art work, the transferor generates a purchase and sales contract. More specifically, the transferor operates the user terminal 30 and generates the purchase and sales contract with an electronic signature.

Figure 24:
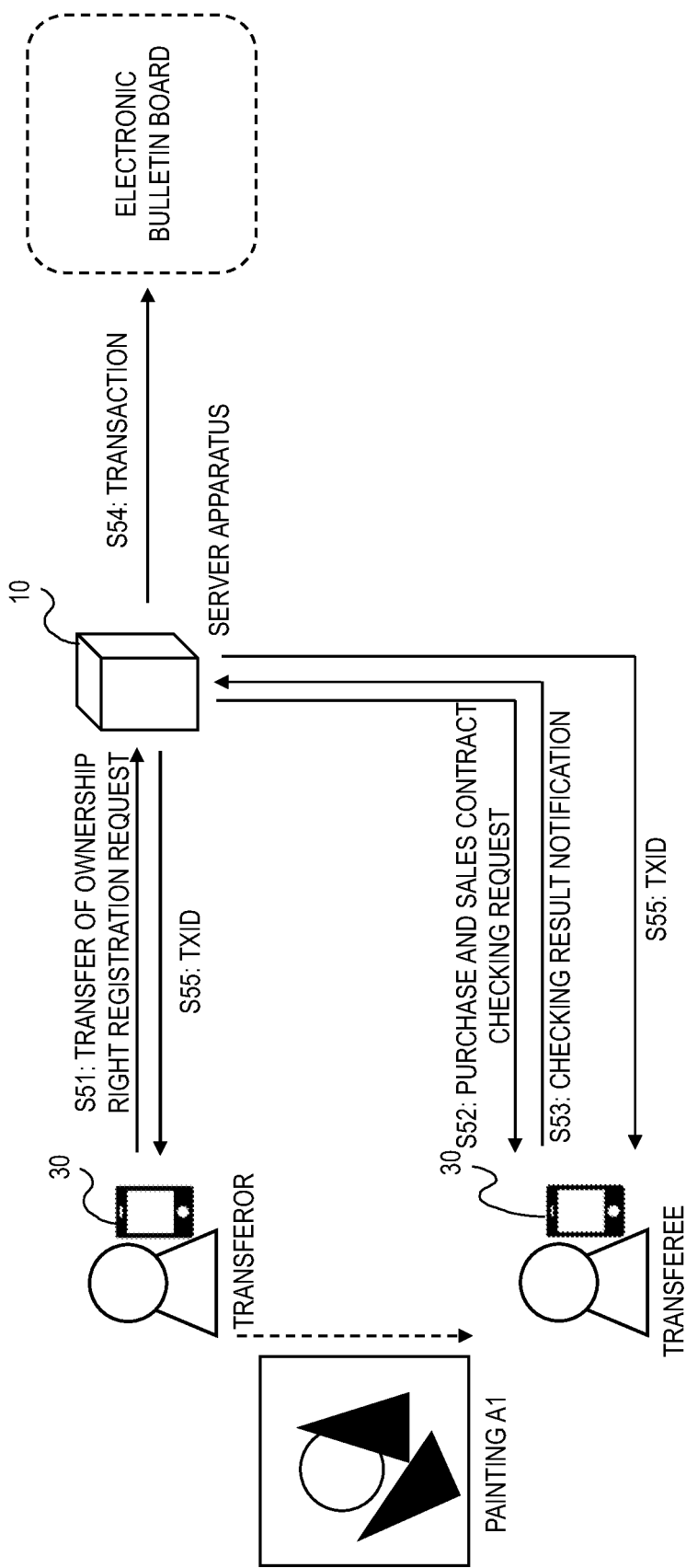
FIG. 24 is a diagram illustrating an operation of an art work management system according to a third example embodiment.

The transferor transmits the generated the purchase and sales contract to the server apparatus 10 and requests the server apparatus 10 to process a transaction related to the registration of the transfer of the ownership right. Specifically, the user terminal 30 transmits to the server apparatus 10 a transfer of ownership right registration request that includes a transaction ID of an ownership right certificate regarding the art work to be bought and sold and a purchase and sales contract (step S51 in FIG. 24).

The server apparatus 10 requests the transferee to check the purchase and selling contract. Specifically, the server apparatus 10 transmits a "purchase and sales contract checking request" including the purchase and sales contract with an electronic signature by the transferor to the user terminal 30 of the transferee (step S52).

The transferee checks details of the purchase and sales contract. When the details of the purchase and sales contract do not differ from the details agreed with the transferor, the user terminal 30 assigns an electronic signature of the transferee to the purchase and sales contract and transmits the purchase and sales contract to the server apparatus 10. More specifically, the user terminal 30 transmits a "checking result notification" to the server apparatus 10 (step S53).

The server apparatus 10 verifies the electronic signatures of the transferor and the transferee, respectively, and determines that the buying and selling has been completed when the verifications are successful. The server apparatus 10 also verifies a validity of the purchase and sales contract using an ownership right certificate of the art work. The server apparatus 10 checks that the art work to be bought and sold actually exists through the verification. In other words, the server apparatus 10 determines that a purchase and sales contract regarding a fictitious art work that does not actually exist is invalid, and refuses to process the contract.

When the buying and selling is completed and the verification of the purchase and sales contract is completed, the server apparatus 10 generates a new ownership right certificate for the art work and appends a transaction including the generated ownership right certificate on the electronic bulletin board (step S54).

The server apparatus 10 transmits a transaction ID of the appended transaction to the user terminals 30 of the transferor and the transferee (step S55). Each user terminal 30 manages the acquired transaction ID as a transaction ID for the new ownership right certificate.

Note that a first ownership right certificate that designates a transferor as an owner of an item and includes biometric information of the transferor and an object fingerprint of an art work has already been written on the electronic bulletin board. The user terminal 30 of the transferor requests the server apparatus 10 to register a transfer of the ownership right of the art work when the ownership right of the art work is transferred from the transferor to the transferee. The server apparatus 10 generates a second ownership right certificate that includes at least biometric information of the transferee and the object fingerprint of the art work when the transferor and the transferee agree on the transfer of the ownership right. The server apparatus 10 writes on the electronic bulletin board the transaction including the generated second ownership right certificate and notifies the user terminal 30 of the transferee of a transaction ID corresponding to the transaction.

Next, details of the individual apparatuses included in the art work management system according to the third example embodiment will be described.

[User Terminal]

Figure 25:
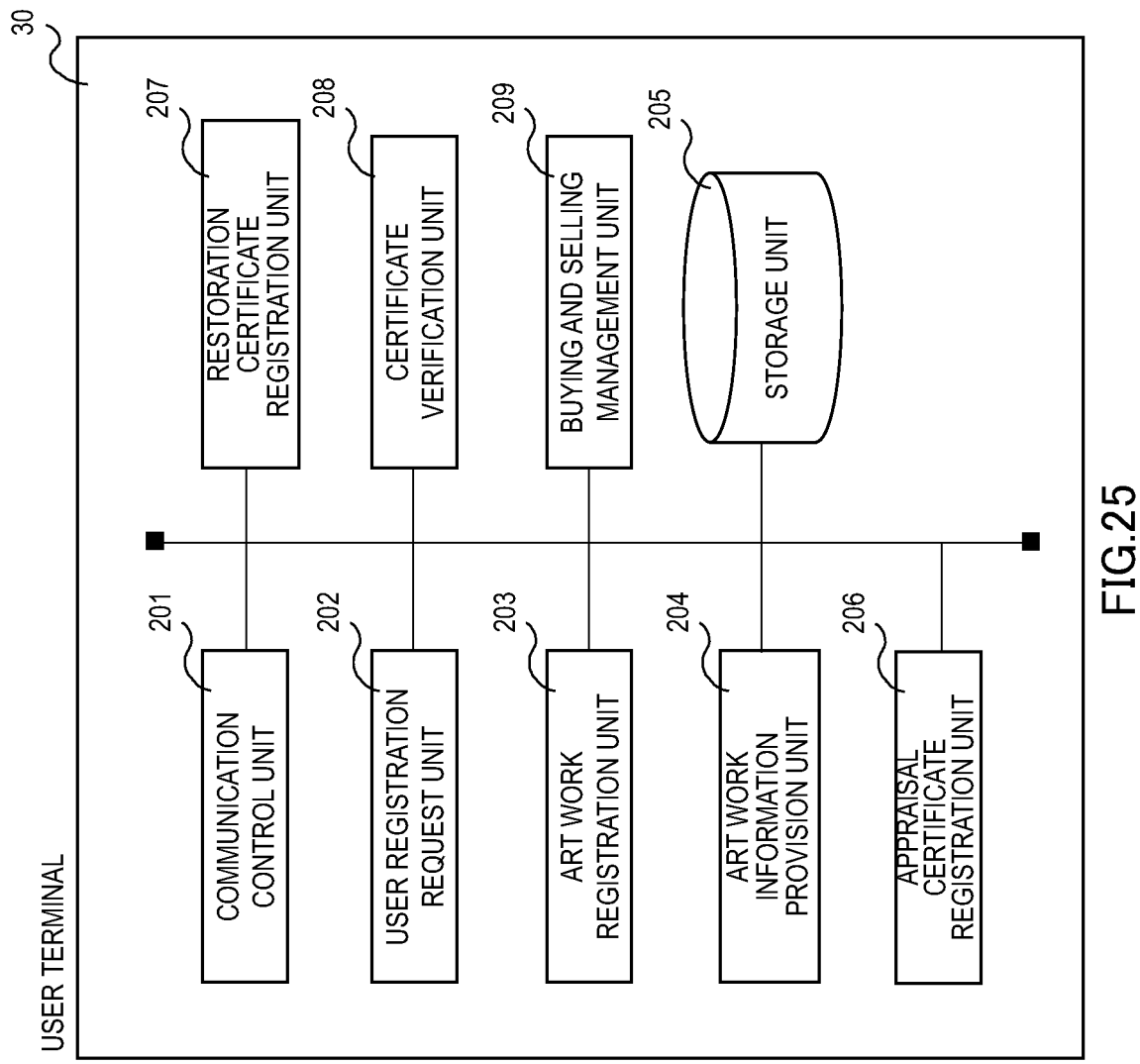
FIG. 25 is a diagram illustrating an example of a processing configuration of a user terminal according to the third example embodiment.

FIG. 25 is a diagram illustrating an example of a processing configuration (processing modules) of the user terminal 30 according to the third example embodiment. Referring to FIG. 25, a certificate verification unit 208 and a buying and selling management unit 209 are added to the configuration of the user terminal 30 according to the second example embodiment. As described above, an operation of the certificate verification unit 208 can be the same as an operation of the certificate verification unit 402 described in the first example embodiment, so a description is omitted.

The buying and selling management unit 209 is means for managing the buying and selling of an art work. For example, when a "selling art work" button shown in FIG. 3 is pressed, the buying and selling management unit 209 displays a GUI for acquiring necessary information to generate a purchase and sales contract (a purchase and sales contract regarding buying and selling between the transferor and the transferee).

For example, the buying and selling management unit 209 generates a GUI as shown in FIG. 26 to acquire at least information about the art work to be sold (a name of the art work in FIG. 26), a user ID of the transferee (the buyer) and an amount of the sale. Note that the transferor acquires the user ID of the transferee during the negotiation process with the transferee. In addition, the buying and selling management unit 209 may acquire a transaction ID corresponding to an ownership right certificate of the art work instead of the name of the art work to be bought and sold.

The buying and selling management unit 209 searches the art work management database and reads an object fingerprint and the transaction ID corresponding to the ownership right certificate regarding the art work to be sold from the database. After that, the buying and selling management unit 209 generates a purchase and sales contract that includes the object fingerprint of the art work, the user ID and biometric information of the transferor (the seller), the user ID of the transferee (the buyer), and the amount of the sale. For example, the buying and selling management unit 209 generates the purchase and selling contract that includes the details as shown in FIG. 27.

The buying and selling management unit 209 assigns an electronic signature of the transferor to the generated purchase and sales contract. The buying and selling management unit 209 transmits to the server apparatus 10 an ownership right transfer registration request including the purchase and sales contract assigned the electronic signature and the transaction ID corresponding to the ownership right certificate of the art work to be sold.

Note that the operation of the buying and selling management unit 209 described above is an operation on a side of the transferor (the operation of the user terminal 30 used by the transferor). An operation of the buying and selling management unit 209 of the user terminal 30 used by the transferee side is described after description of an operation concerning the server apparatus 10.

Moreover, when generating the purchase and selling contract, the buying and selling management unit 209 may acquire biometric information of the transferor. Similarly, when generating the purchase and selling contract, the buying and selling management unit 209 may acquire an object fingerprint by photographing a predetermined area of the art work with a camera for acquiring object fingerprints. Alternatively, the buying and selling management unit 209 may describe biometric information or an object fingerprint acquired in the past in the purchase and sales contract.

[Server Apparatus]

Figure 28:
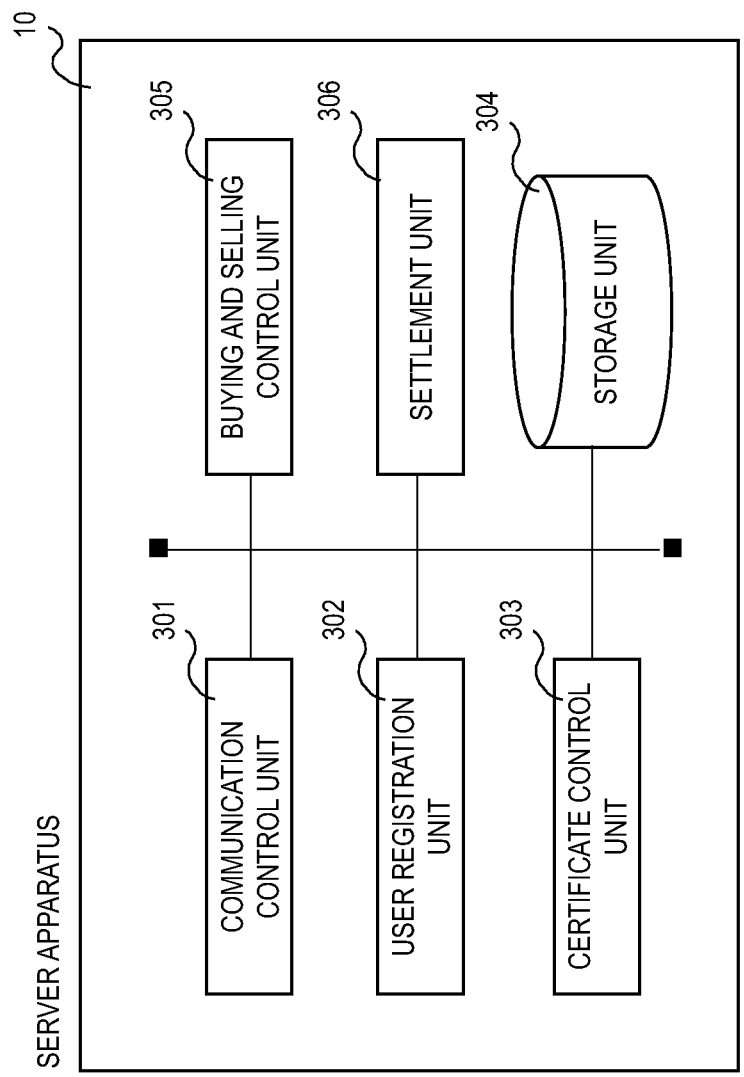
FIG. 28 is a diagram illustrating an example of a processing configuration of a server apparatus according to the third example embodiment.

FIG. 28 is a diagram for illustrating an example of a processing configuration (processing modules) of the server apparatus 10 according to the third example embodiment. Referring to FIG. 28, a buying and selling control unit 305 and a settlement unit 306 are added to the configuration of the server apparatus 10 according to the first example embodiment.

Figure 29:
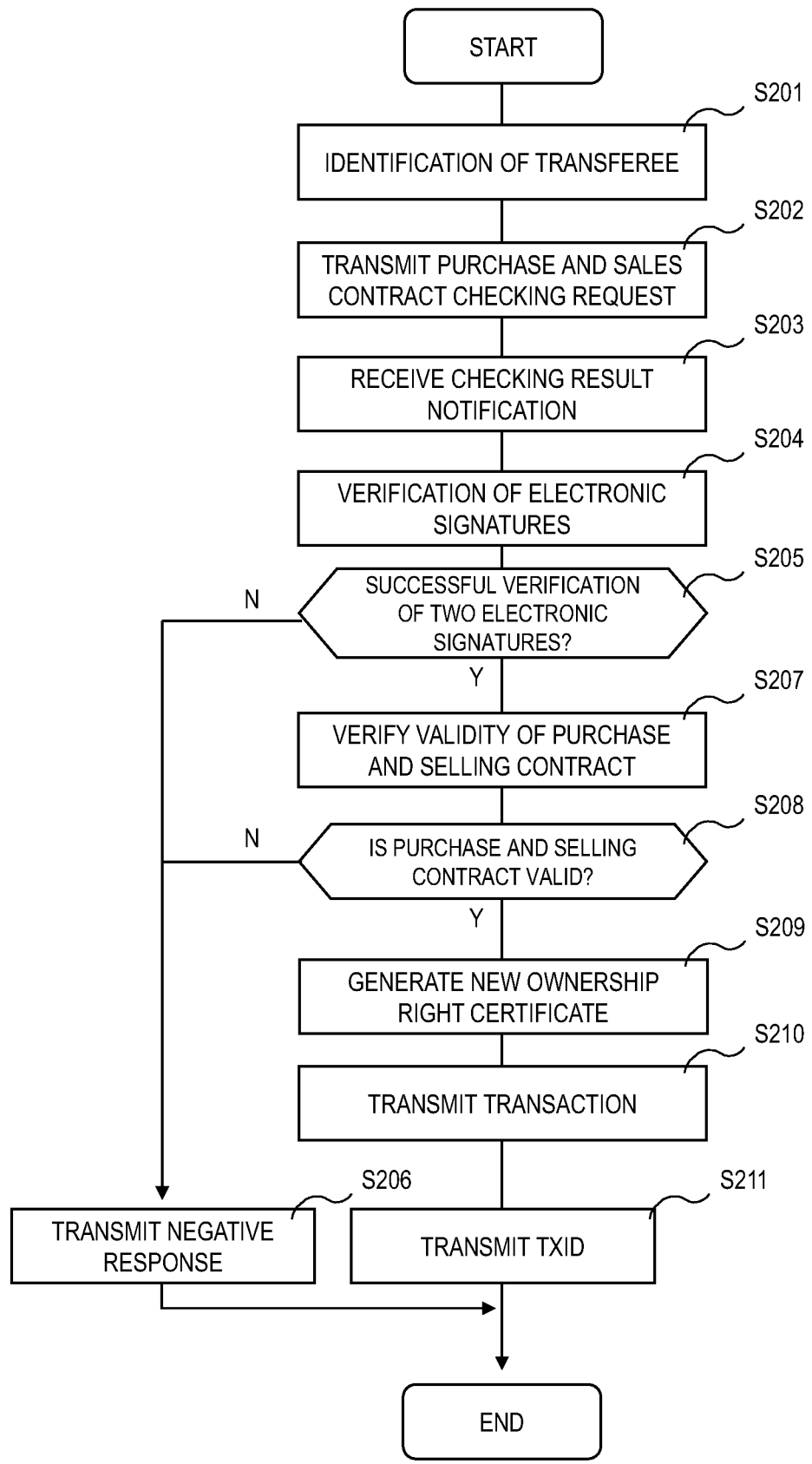
FIG. 29 is a flowchart illustrating an example of an operation of a buying and selling control unit according to the third example embodiment.

The buying and selling control unit 305 is means for controlling buying and selling of art works between users. Referring to FIG. 29, an operation of the buying and selling control unit 305 is described. FIG. 29 is a flowchart illustrating an example of the operation of the buying and selling control unit 305 according to the third example embodiment.

The buying and selling control unit 305 searches the user information database using the user ID of the transferee included in a purchase and sales contract of the received ownership right transfer registration request as a key, and identifies a corresponding user (an entry) (identification of transferee; step S201).

The buying and selling control unit 305 requests that the identified user checks regarding the purchase and selling contract of the art work. Specifically, the buying and selling control unit 305 transmits a "purchase and selling contract checking request" including the purchase and selling contract (the purchase and selling contract assigned the electronic signature of the transferor) acquired from the transferor to the email address of the user identified above (step S202).

The buying and selling control unit 305 receives a checking result (a checking result notification) for the request from the user terminal 30 of the transferee (step S203). The checking result notification includes the purchase and selling contract assigned with an electronic signature of the transferee and biometric information of the transferee.

The buying and selling control unit 305 verifies the two electronic signatures (the electronic signatures of the transferor and the transferee, respectively) assigned to the purchase and sales contract (step S204).

When the verification of at least one of the two electronic signatures fails (step S205, No branch), the buying and selling control unit 305 determines that the buying and selling of the art work is not completed. In this case, the buying and selling control unit 305 rejects the ownership right transfer registration request from the transferor. The buying and selling control unit 305 transmits a negative response to the user terminal 30 (step S206).

When the verification of the two signatures is successful (step S205, Yes branch), the buying and selling control unit 305 determines that the buying and selling of the art work has been concluded.

In this way, the user terminal 30 of a transferor transmits a ownership right transfer registration request that includes a purchase and sales contract assigned a signature of the transferor to the server apparatus 10. The user terminal 30 of a transferee transmits to the server apparatus 10 a checking result notification that includes the purchase and selling contract assigned with a signature of the transferee. When the verifications of the signature of the transferor and the signature of the transferee are successful, the server apparatus 10 determines that the purchase and selling contract has been concluded and generates (starts to generate) a new ownership right certificate.

The buying and selling control unit 305 verifies a validity of the purchase and selling contract (step S207). The buying and selling control unit 305 transmits a transaction ID corresponding to the ownership right certificate to the electronic bulletin board and acquires the ownership right certificate. The buying and selling control unit 305 determines that the purchase and selling contract is valid when biometric information and object fingerprints described in the purchase and selling contract and the ownership right certificate, respectively, match. The buying and selling control unit 305 determines that the purchase and selling contract is invalid when either the biometric information or the object fingerprints do not match.

When the purchase and sales contract is invalid (step S208, No branch), the buying and selling control unit 305 rejects the ownership transfer registration request from the transferor (step S206).

When the purchase and selling contract is valid (step S208, Yes branch), the buying and selling control unit 305 generates a new ownership right certificate to be registered on the electronic bulletin board (step S209). The server apparatus 10 generates a new ownership right certificate (a second ownership right certificate) using the biometric information of the transferee.

In this way, the user terminal 30 of a transferor generates a purchase and sales contract that includes biometric information of the transferor and an object fingerprint of an art work. The server apparatus 10 generates a new ownership right certificate when the biometric information on the purchase and sales contract matches biometric information on the existing ownership right certificate (a first ownership right certificate) and when the object fingerprint on the purchase and sales contract matches an object fingerprint on the existing ownership right certificate.

For example, the buying and selling control unit 305 rewrites the ownership right certificate shown in FIG. 30A to the ownership right certificate shown in FIG. 30B. In FIGS. 30A and 30B, the biometric information of an old owner is rewritten to the biometric information (a feature value generated from a face image that is included in the checking result notification) of a new owner. The buying and selling control unit 305 generates the feature value from the biometric information (the face image) of the transferee that is included in the checking result notification, and describes the feature value as the biometric information of the new owner in the ownership right certificate.

The buying and selling control unit 305 generates a transaction including the generated ownership right certificate and transmits the transaction to the electronic bulletin board (step S210 in FIG. 29).

The buying and selling control unit 305 transmits a transaction ID corresponding to the generated ownership right certificate to the user terminals 30 of the transferor and transferee, respectively (step S211). The buying and selling control unit 305 transmits a positive response including the transaction ID to the user terminals 30.

The user terminal 30 of the user (in particular, the transferee) manages the acquired transaction ID as the transaction ID corresponding to the ownership right certificate.

Next, the operation of the buying and selling management unit 209 in the user terminal 30 on the side of the transferee will be described.

When a purchase and sales contract checking request is received from the server apparatus 10, the buying and selling management unit 209 displays the details of the contract and asks the user (assignee) to check the contract. For example, the buying and selling management unit 209 presents the details of the purchase and selling contract to the user by means of a GUI, as shown in FIG. 31.

As shown in FIG. 31, the buying and selling management unit 209 acquires the biometric information (a face image) of the transferee. In addition, the buying and selling management unit 209 acquires a transaction ID (a transaction ID corresponding to the ownership right certificate notified by the counterparty) that verifies a legitimacy of the art work and a counterparty before negotiating with the counterparty. The buying and selling management unit 209 identifies the ownership right certificate that verified the above legitimacy based on the transaction ID.

The buying and selling management unit 209 verifies consistency between a previously verified ownership right certificate and the purchase and selling contract. Specifically, the buying and selling management unit 209 checks that biometric information and an object fingerprint of the ownership right certificate match (substantially match) biometric information and an object fingerprint described in the purchase and sales contract.

When either the biometric information or the object fingerprint does not match, the buying and selling management unit 209 determines that information on the art work or the counterparty is described in the purchase and selling contract that is different from the previously verified art work and the counterparty, and suspends the transaction. When the buying and selling management unit 209 fails to verify the consistency of the ownership right certificate and sales contract, the buying and selling management unit 209 may notify the user (the transferee) that the previously verified ownership right certificate and the purchase and sales contract are not the same.

When the verification of the consistency of the ownership right certificate and the purchase and sales contract is successful and when the biometric information is acquired for inclusion in the new ownership right certificate, the buying and sale management unit 209 generates a checking result notification. Specifically, the buying and selling management unit 209 assigns an electronic signature of the transferee to the purchase and selling contract received from the server apparatus 10, and generates a checking result notification that includes the purchase and selling contract and biometric information of the transferee.

The buying and selling management unit 209 transmits the generated checking result notification to the server apparatus 10. Note that the purchase and sales contract transmitted from the user terminal 30 on the transferor side is assigned the electronic signatures of the transferor and the transferee, respectively.

When the buying and selling management unit 209 receives a transaction ID (a transaction ID corresponding to a new ownership right certificate) from the server apparatus 10, the buying and selling management unit 209 stores the transaction ID in association with the art work to be bought and sold.

Next, variations in the art work management system according to the third example embodiment will be described.

<Variation 1>

An owner of an art work may also transfer part of his or her ownership right to another person. Specifically, the owner may sell a portion of his or her ownership right and jointly own the art work with another owner.

At that time, a transferor operates the user terminal 30 to input a ratio of the ownership right to be sold (a ratio of a sale that is agreed upon with a transferee), along with a user ID of the counterparty and so on. For example, the buying and selling management unit 209 acquires the ratio of the sale using a GUI as shown in FIG. 32.

The user terminal 30 transmits to the server apparatus 10 an ownership right transfer registration request that includes a purchase and sales contract in which the ratio of the sale is described.

The server apparatus 10 transmits the purchase and sales contract to the user terminal 30 of the transferee.

The user terminal 30 of the transferee displays details of the purchase and selling contract and acquires a checking result of the transferee. When the transferee agrees to the details of the purchase and selling contract, the user terminal 30 assigns an electronic signature to the purchase and selling contract and transmits the purchase and selling contract to the server apparatus 10.

The buying and selling control unit 305 of the server apparatus 10 determines that the buying and selling has been completed when the two signatures are successfully verified. In addition, the buying and selling control unit 305 generates a new ownership right certificate regarding the art work to be bought and sold after verifying a validity of the purchase and sales contract.

When the buying and selling control unit 305 recognizes that a single art work is jointly owned by a plurality of users as a result of the buying and selling, the buying and selling control unit 305 generates an ownership right certificate that clarifies biometric information and a ratio of the ownership right for each of the plurality of owners.

The buying and selling control unit 305 displays each owner's share by using "token". For example, when 30% of the ownership right is sold, as in the above example, the buying and selling control unit 305 sets the token owned by the transferor to "70" and the token owned by the transferee to "30".

The buying and selling control unit 305 generates a new ownership right certificate by rewriting the ownership right certificate as shown in FIG. 33A to the ownership right certificate as shown in FIG. 33B. The buying and selling control unit 305 generates a transaction that includes the new ownership right certificate and writes the transaction on the electronic bulletin board.

The buying and selling control unit 305 transmits a transaction ID corresponding to the new ownership right certificate to each owner. The user terminal 30 of each owner stores the ownership right certificate and the transaction ID in correspondence.

In this way, the user terminal 30 of a transferor transmits to the server apparatus 10 an ownership right transfer registration request that includes a purchase and sales contract under which a portion of an ownership right of the transferor is to be sold to a transferee. When the server apparatus 10 receives a checking result notification regarding the purchase and selling contract from the user terminal 30 of the transferee, the server apparatus 10 generates a new ownership right certificate that includes biometric information of both the transferor and the transferee, while setting both the transferor and the transferee as owners of the artwork.

<Variation 2>

A transferee may jointly purchase (jointly own) an art work together with other users. Specifically, the transferee may purchase a portion of an ownership right and jointly own the art work with another owner.

Here, it is described that a transferor sells all of his or her ownership right. However, the transferor may also sell a portion of the ownership right to a plurality of transferees, as described in the variation 1.

The transferor operates the user terminal 30 and inputs user IDs (two or more user IDs) and a ratio of the ownership right for each transferee. For example, the buying and selling management unit 209 uses a GUI as shown in FIG. 34 and acquires the user IDs and the ratio of the ownership right for each transferee.

The user terminal 30 transmits an ownership right transfer registration request that includes a purchase and selling contract that describes the ratio of the ownership right to the server apparatus 10.

The server apparatus 10 transmits the purchase and sales contract to the user terminal 30 of each transferee. In the example of FIG. 34, the server apparatus 10 transmits a purchase and selling contract checking request that includes the purchase and selling contract to the user terminal 30 of user ID "uID21" and the user terminal 30 of user ID "uID31", respectively.

The user terminal 30 of each transferee displays details of the purchase and selling contract and acquires a checking result of the transferee. For example, the user terminal 30 (the buying and selling management unit 209) of the user ID "uID21" acquires the details of the purchase and selling contract and the checking result by the transferee through a GUI as shown in FIG. 35.

Note that the server apparatus 10 may transmit user IDs and names corresponding to the user ID of each transferee to the user terminal 30 of the transferee. In this case, the user terminal 30 may display the name of the sharer in place of the user ID of another sharer in FIG. 35. In addition, the user terminal 30 may display an amount to be paid by each transferee by multiplying an amount of the sale included in the purchase and selling contract by the ratio of the ownership right of each user.

When checking of the transferee is completed, the user terminal 30 assigns an electronic signature to the purchase and selling contract and transmits a checking result notification including the purchase and selling contract with the electronic signature and the biometric information of the transferee to the server apparatus 10.

The buying and selling control unit 305 of the server apparatus 10 determines that the buying and selling has been completed when the electronic signature of the transferor side and the electronic signature of the transferee side, respectively, assigned to the purchase and sales contract are successfully verified. In the above example, the buying and selling control unit 305 determines that the buying and selling has been completed when the electronic signature of the transferor and the electronic signatures of the two transferees, a total of three electronic signatures, are successfully verified. After that, the buying and selling control unit 305 generates a new ownership right certificate for the art work to be bought and sold after verifying validity of the purchase and sales contract.

The buying and selling control unit 305 generates an ownership right certificate describing biometric information and a ratio of the ownership right of each of a plurality of transferees. For example, the buying and selling control unit 305 generates a new ownership right certificate by rewriting the ownership right certificate as shown in FIG. 36A to the ownership right certificate shown in FIG. 36B. The buying and selling control unit 305 generates a transaction that includes the new ownership right certificate and writes the transaction on the electronic bulletin board.

The buying and selling control unit 305 transmits a transaction ID corresponding to the new ownership right certificate to each owner (each transferee). The user terminal 30 of each owner manages the received transaction ID as a transaction ID of the ownership right certificate.

In this way, the user terminal 30 of a transferor transmits to the server apparatus 10 an ownership right transfer registration request that includes a purchase and sales contract under which all or a portion of an ownership right of an art work is to be sold to a plurality of transferees. When the server apparatus 10 receives checking result notifications regarding the purchase and selling contract from each of the user terminals 30 of the plurality of transferees, the server apparatus 10 generates a new ownership right certificate that includes biometric information of each of the plurality of transferees.

In addition, as shown in FIG. 33B and FIG. 36B, when the art work is jointly owned by a plurality of owners, the server apparatus 10 generates a new ownership right certificate in which each owner's biometric information and a ratio of the ownership right are described. More specifically, the server apparatus 10 generates the new ownership right certificate in which the owner's ratio of the ownership right of the art work is indicated by a token.

Note that the owned token and the total amount of token (the total value of owned token) shown in FIG. 33B and FIG. 36B are examples and are not intended to limit the owned token and so on. The owned token and the total of the owned token can be any value as long as the value can represent each ratio of the ownership right. For example, in FIG. 36B, the owned tokens of owner 1 may be "7" and the owned tokens of owner 2 may be "3", or the owned tokens of the owner 1 may be "700" and the owned tokens of the owner 2 may be "300".

<Variation 3>

The server apparatus 10 may automatically make a settlement of a buying and selling of an art work when the buying and selling is completed and an ownership right is transferred. The settlement unit 306 of the server apparatus 10 takes charge of the settlement (the automatic settlement) of the buying and selling.

When the settlement unit 306 successfully verifies two electronic signatures assigned to a purchase and sales contract and a validity of the purchase and sales contract, the settlement unit 306 executes a settlement process that transfers an amount of the sale described in the purchase and sales contract from the account of the transferee to the account of the transferor.

The settlement unit 306 searches the user information database and acquires crypto-assets accounts corresponding to the user ID of the transferor and the user ID of the transferee described in the purchase and selling contract. The settlement unit 306 generates a transfer slip with the crypto-assets account of the transferee as a transfer source, the crypto-assets account of the transferor as a transferee destination, and the amount of the sale as a transfer amount. Note that when the settlement unit 306 generates the transfer slip, the settlement unit 306 converts a currency agreed upon for the buying and selling into the crypto-assets (the virtual currency), if necessary. However, it is not intended to limit the means of settlement to crypto-assets, and buying and selling may be settled in legal currencies such as yen or dollars. Note that the settlement regarding the buying and selling of an art work by the server apparatus 10 is an option, and the settlement may be made by a bank transfer or a cash payment between the parties concerned.

The settlement unit 306 automatically performs the settlement according to the generated transfer slip. Alternatively, the settlement unit 306 may transmit the generated transfer slip to a blockchain that realizes crypto-assets (for example, bitcoin) to request the settlement. Note that the settlement using the crypto-assets can be realized by so-called "smart contracts," so a detailed description is omitted.

When an art work is jointly owned by a plurality of the transferees, the settlement unit 306 may calculate an amount to be paid by each transferee by multiplying each transferee's ratio of the ownership right by the amount of the sale. Alternatively, the settlement unit 306 may calculate the amount to be paid to each transferee according to the owned token described in the ownership right certificate of the art work. Specifically, the settlement unit 306 calculates the total amount of the token owned by each owner and calculates each transferee's share of the amount by dividing the tokens owned by each transferee by the total value of the token (the total amount of the token). The settlement unit 306 may calculate the amount to be paid by each transferee by multiplying each transferee's share of the amount by the amount of the sale.

In this way, the server apparatus 10 automatically performs a settlement for a sale of an art work described in a purchase and sales contract. At that time, when an art work which has a plurality of owners described in the ownership right certificate is sold, the server apparatus 10 may distribute an amount of the sale regarding the art work to each owner based on each owner's token described in the ownership right certificate.

As described above, the art work management system of the third example embodiment discloses an ownership right certificate including biometric information of an owner of an art work after a transfer when the ownership right of the art work is transferred by buying and selling, and so on. In addition, when a plurality of owners are registered for a single art work, the server apparatus 10 generates and discloses ownership right certificate that include the biometric information of the plurality of owners. Furthermore, when the art work jointly owned by a plurality of owners is sold, the server apparatus 10 can automatically distribute an amount of the sale to each of the plurality of owners. In addition, the server apparatus 10 can also securitize an art work by representing the value of the art work by means of a token. In other words, each owner's ratio of the ownership right in an art work is represented by a token. The owner of the art work can earn a benefit (for example, a profit on the sale) according to a percentage of the owned token. In this way, in the third example embodiment, tokens are introduced to distribute the benefit from the art work among a plurality of people, and the tokens are divided according to each owner's share of the art work (the art work is securitized).

Fourth Example Embodiment

Next, a fourth example embodiment will be described in detail with reference to drawings.

In the fourth example embodiment, it is described a case where a resale royalty right is established for an art work. The resale royalty right is a right that enables an author (or his or her heir) of a copyrighted work that is an art work, and so on to receive a certain percentage of a resale price of the copyrighted work when the work is resold after the transfer of the work by the author. In other words, the resale royalty right is a right that allows the author to benefit when the art work is resold after the author sold the art work.

The following description will be made with a focus on the difference from the first example embodiment to the fourth example embodiment.

An author of an art work uses the user terminal 30. When the author established the resale royalty right on the art work, the user terminal 30 writes on the electronic bulletin board, directly or indirectly, an ownership right certificate that includes an object fingerprint of the art work and biometric information of the author who is a resale royalty right holder.

An art work registration unit 203 according to the fourth example embodiment can establish the resale royalty right when the art work is registered in the art work management system. The art work registration unit 203 displays an "establish resale royalty right" button in a GUI (GUI as shown in FIG. 10) for registering the art work.

The art work registration unit 203 displays a GUI as shown in FIG. 37 when the button for establishing the resale royalty right is pressed. The art work registration unit 203 acquires a return rate (a collection rate) to be set for the art work to be registered using the GUI as shown in FIG. 37.

The art work registration unit 203 transmits to the server apparatus 10 an art work registration request that includes the return rate of the resale royalty right established for the art work. The art work registration unit 203 transmits the "art work registration request" to the server apparatus 10 that includes biometric information of the author, an object fingerprint of the art work, and the return rate of the resale royalty right.

A certificate control unit 303 of the server apparatus 10 according to the fourth example embodiment uses information included in the art work registration request and generates an ownership right certificate for an art work for which the resale royalty right has been established. More specifically, when the server apparatus 10 receives the art work registration request, the server apparatus 10 sets the author as the holder of the art work and the resale royalty right holder and generates an ownership right certificate that biometric information of the author is set as the biometric information of the holder and the holder of the resale royalty right.

When registering the ownership right certificate for the art work for which the resale royalty right is established, the certificate control unit 303 determines that a total amount of token (token total amount) to be allocated to the art work. For example, the certificate control unit 303 determines the total amount of tokens to be "100" or "1000". Note that although the total amount of token can be any value, it is preferable to use a number that enables an easy calculation of each right holder's share.

After that, the certificate control unit 303 determines the amount of token for the owner and the amount of token that the resale royalty right holder can obtain according to the return rate of the resale royalty right (determination of resale royalty token). In the above example, the certificate control unit 303 determines the owned tokens of the owner to be "98" and the resale royalty tokens to be "2".

The certificate control unit 303 generates an ownership right certificate that includes the above total amount of token, the resale royalty right holder and the resale royalty token. For example, the certificate control unit 303 generates the ownership right certificate shown in FIG. 38. As shown in FIG. 38, the certificate control unit 303 generates the ownership right certificate that includes an object fingerprint of the art work, a total amount of token, information about the owner (biometric information and owned token), and information about the resale royalty right holder (biometric information and resale royalty token).

Note that when the art work is initially registered, same biometric information is set because the owner of the art work and the resale royalty right holder are the same person.

The certificate control unit 303 generates a transaction that includes the generated ownership right certificate. The certificate control unit 303 writes the generated transaction on the electronic bulletin board. The certificate control unit 303 transmits a transaction ID of the generated transaction to the user terminal 30.

In this way, the user terminal 30 acquires a return rate to be set for a resale royalty right from an author, and transmits an art work registration request that includes the return rate to the server apparatus 10. The server apparatus 10 generates an ownership right certificate that describes biometric information of the resale royalty right holder and the information about the return rate (the resale royalty token). The server apparatus 10 determines a total amount of token to be allocated to the art work and an amount of the resale royalty token to be allocated to the resale royalty right holder based on the return rate. The server apparatus 10 generates the ownership right certificate in which the total amount of token is described and the biometric information of the resale royalty right holder and the amount of resale royalty token are associated with each other.

Next, an operation of the art work management system when an art work for which a resale royalty right is established is sold will be described. The basic operation of the art work management system in this case is the same as the operation of the art work management system described in the third example embodiment.

Note that an ownership right and a resale royalty right of an art work are different and distinct rights, and an author may sell all or part of his or her ownership right. When all or part of the ownership right of the author is sold, the server apparatus 10 generates an ownership right certificate that includes biometric information of a new owner, as described in the third example embodiment.

When the buying and selling control unit 305 of the server apparatus 10 generates a new ownership right certificate from the ownership right certificate in which the resale royalty right is set, the buying and selling control unit 305 may rewrite information of an old owner with information of a new owner.

Similarly, the author of the art work can also sell all or part of the resale royalty right. When the resale royalty right is sold, the server apparatus 10 may generate an ownership right certificate that includes biometric information of a new resale royalty right holder.

In addition, when the server apparatus 10 makes a settlement related to buying and selling (reselling) an art work for which a resale royalty right is established, the server apparatus 10 pays the resale royalty right holder (the creator of the art work) an amount corresponding to an amount of resale royalty token of the resale royalty right holder. For example, when an art work with an ownership right certificate shown in FIG. 38 is resold, the settlement unit 306 pays 2% of an amount of the sale (a percentage of a resale royalty right to a total amount of tokens) to a resale royalty right holder. Note that the settlement unit 306 can obtain a crypto-assets account of the resale royalty right holder by accessing the user information database and identifying a user corresponding to the biometric information of the resale royalty right holder.

In this way, when an art work for which a resale royalty right has been established is resold, the server apparatus 10 calculates an amount to be paid to a resale royalty right holder according to a total amount of tokens allocated to the art work and an amount of the resale royalty token, and makes a settlement to transfer the calculated amount to the resale royalty right holder.

Note that when a single art work is a copyrighted work by a plurality of authors, each author may establish his or her own resale royalty right. When a plurality of resale royalty rights are established for an art work, the server apparatus 10 may generate an ownership right certificate that describe biometric information and resale royalty tokens for each of the plurality of resale royalty rights holders.

As described above, in the art work management system for the fourth example embodiment, an author of an art work can establish a resale royalty right for a copyrighted work. Note that the author does not have to establish the resale royalty right to the copyrighted work. The author may or may not establish the resale royalty right. In other words, the author can choose to register the art work either with a right to obtain a certain percentage of return when the art work is resold (the resale royalty right; a pension-like right), or with a normal ownership right without the resale royalty right. Through the configuration and operation of such the art work management system, the author can earn a benefit each time the art work is distributed (resold), or can earn a capital gain by selling an ownership right (a token) of the art work that has increased in value. In other words, the art work management system provides a user with a new system of right management of an art work.

In addition, an author (an artist) can earn a benefit (a return) according to a return rate when a copyrighted work is resold by establishing a resale royalty right for the copyrighted work, however, the conventional system makes it difficult for the author to earn a benefit at arbitrary timing he or she wishes. However, the art work management system disclosed in the present application handles an ownership right and a resale royalty right of an art work separately, so that a sale of only the ownership right, a sale of only the resale royalty right, and so on can be realized. In other words, the author of the art work may sell all or part of his or her ownership right or resale royalty right at arbitrary timing and make a benefit from the art work. For example, when 90% of the tokens allocated to the art work are allocated to the ownership right and the remaining 10% to the resale royalty right, the author may sell all (90%) of the ownership right. In addition, the author may sell 40% of the resale royalty right (4% of the total). In addition, when the art work is resold, the author can obtain a capital gain of 60% of the resale royalty right (6% of the total).

Fifth Example Embodiment

Next, a fifth example embodiment will be described in detail with reference to drawings.

The fifth example embodiment describes a loan (lending) of an art work. Famous art works are sometimes loaned to museums and the like. In the fifth example embodiment, it is described that the loan of the art work is publicly announced.

The following description will be made with a focus on the difference from the first example embodiment to the fifth example embodiment.

Figure 39:
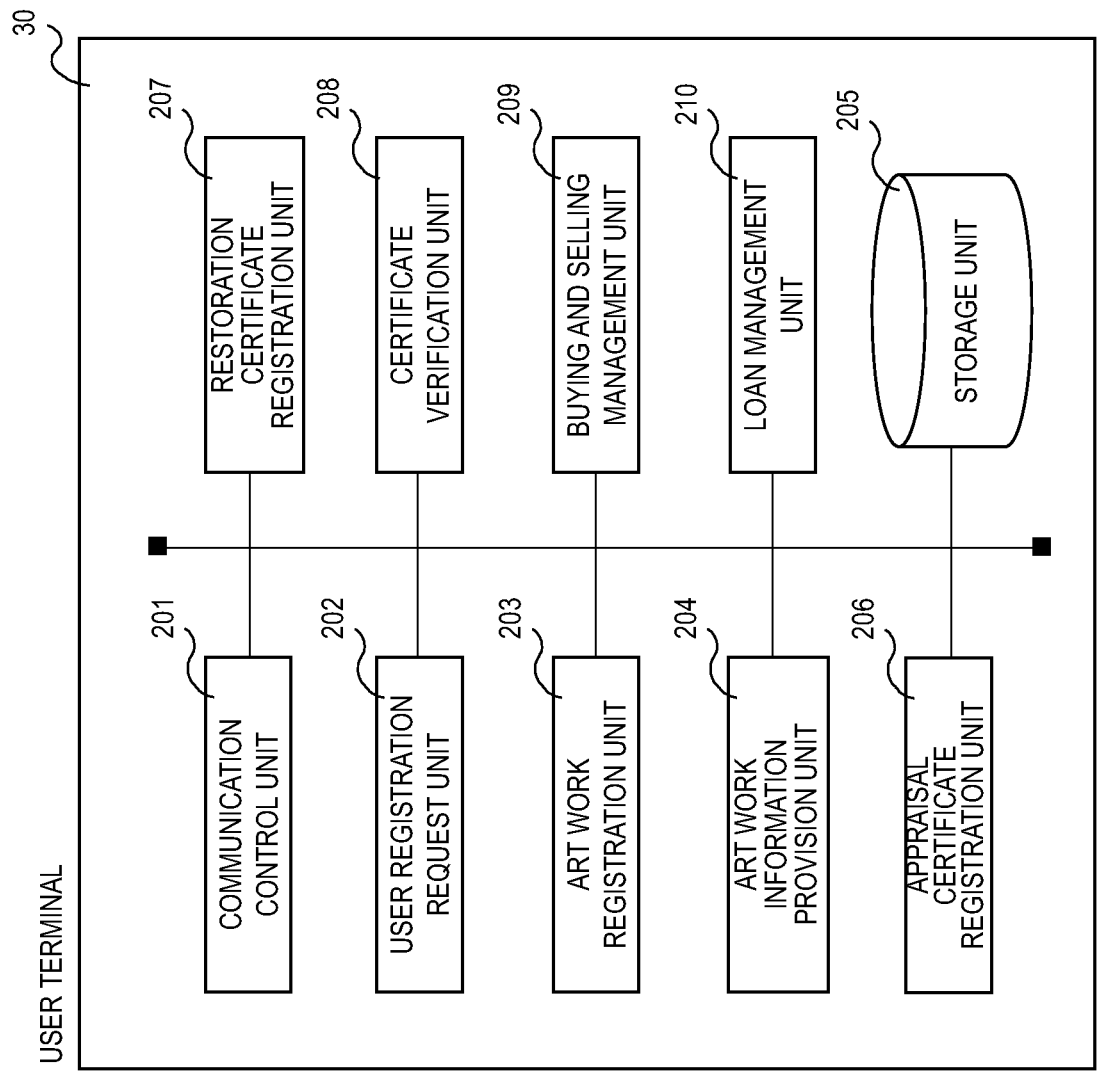
FIG. 39 is a diagram illustrating an example of a processing configuration of a user terminal according to a fifth example embodiment.

FIG. 39 is a diagram illustrating an example of a processing configuration (processing modules) of the user terminal 30 according to the fifth example embodiment. Referring to FIG. 39, a loan management unit 210 is added to the user terminal 30 according to the third example embodiment. The loan management unit 210 is means for managing a loan of an art work.

An owner of an art work and a museum (a museum staff member) discuss a loan of the art work. After the discussion on the loan is completed and the terms and conditions (loan period, loan fee, and so on) are determined, the owner will generate a loan agreement. After that, the owner requests a registration regarding the loan of the art work to the server apparatus 10.

For example, when an "art work loan" button shown in FIG. 3 is pressed, the loan management unit 210 displays a GUI for acquiring information necessary to generate the loan agreement.

For example, the loan management unit 210 generates a GUI as shown in FIG. 40 to acquire information regarding the art work to be loaned (in FIG. 40, the name of the art work), information on a borrower, a loan period, and a loan fee and so on.

The loan management unit 210 searches the art work management database and reads an object fingerprint and a transaction ID corresponding to an ownership right certificate regarding the art work to be loaned from the database. After that, the loan management unit 210 generates the loan agreement that includes the object fingerprint of the art work and the terms and conditions of the loan (for example, the lending destination, the loan period, the loan fee, and so on). For example, the loan management unit 210 generates the loan agreement that includes details as shown in FIG. 41.

The loan management unit 210 assigns an electronic signature of an owner to the loan agreement. In addition, the loan management unit 210 transmits a loan document registration request that includes the transaction ID, the transaction ID being corresponding to the art work ownership right certificate, and the loan agreement to the server apparatus 10 (step S61 in FIG. 42).

A certificate control unit 303 of the server apparatus 10 that receives the loan document registration request identifies contact information (for example, an e-mail address that can be received by a staff member terminal 34) of the lending destination (museum E in examples shown in FIGS. 40 and 41) included in the loan document registration request. At that time, the certificate control unit 303 may acquire the contact information by referring to table information that stores the lending destination and the contact information in association with each other. Note that a staff member terminal 34 is a terminal used by the staff member of the lending destination of the art work.

The certificate control unit 303 requests to the staff member terminal 34 to check the loan agreement for the art work. Specifically, the certificate control unit 303 transmits to the staff member terminal 34 a "loan agreement checking request" that includes the loan agreement acquired from the owner (the loan agreement assigned an electronic signature of the owner) and the transaction ID corresponding to the ownership right certificate (step S62).

The staff member receives the art work that arrives at the museum. The staff member operates the staff member terminal 34 to transmit the transaction ID corresponding to the ownership right certificate for the art work to the electronic bulletin board and acquire the ownership right certificate.

Figure 43:
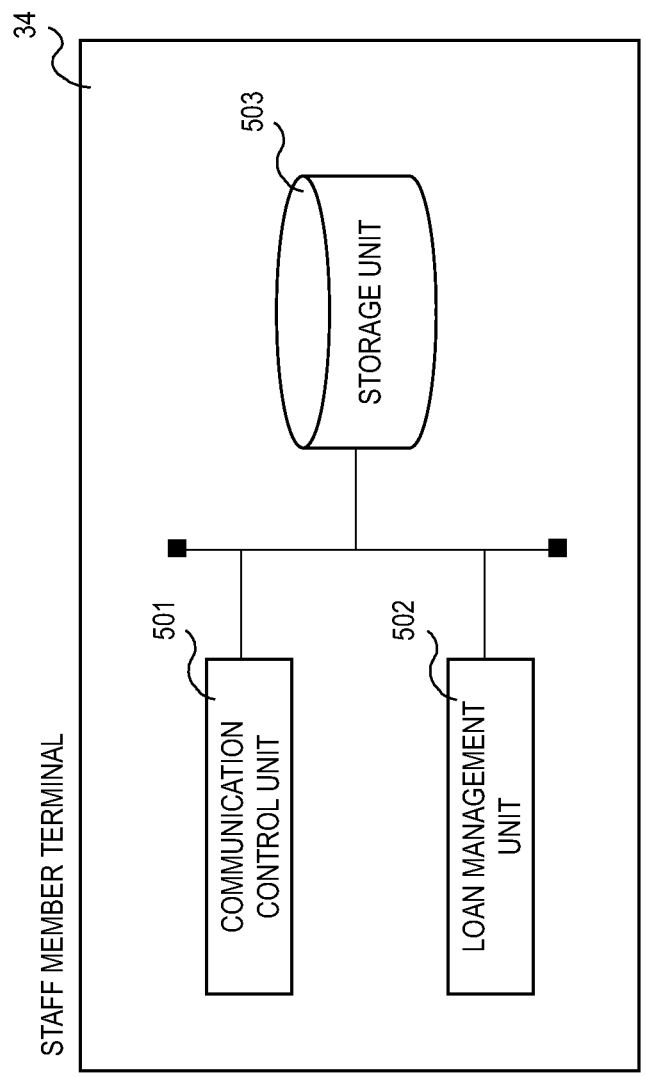
FIG. 43 is a diagram illustrating an example of a display of a staff member terminal according to the fifth example embodiment.

FIG. 43 is a diagram illustrating an example of a processing configuration (processing modules) of the staff member terminal 34 according to the fifth example embodiment. As shown in FIG. 43, the staff member terminal 34 includes a communication control unit 501, a loan management unit 502, and a storage unit 503. The operations and the like of the communication control unit 501 and the storage unit 503 can be the same as the operations and the like of the corresponding modules of other units already described, so the description thereof will be omitted. The loan management unit 502 operates as a pair with the loan management unit 210 of the user terminal 30.

The loan management unit 502 performs an object authentication using an object fingerprint of an art work that has arrived and an object fingerprint described in an ownership right certificate according to an operation by the staff member.

When the object authentication is successful, the loan management unit 502 determines that a legitimate art work agreed upon with the owner has arrived at the museum and notifies the staff of this fact. The staff member accepts the art work in response to the notice. In contrast, when the object authentication fails, the staff determines that an unauthorized art work has arrived at the museum and refuses to accept the art work.

In addition, the staff member operates the staff member terminal 34 and checks the details of the loan agreement received from the server apparatus 10. When the details of the loan agreement do not differ from the predetermined terms and conditions, the staff member notifies the server apparatus 10 of a checking result of the loan agreement. Specifically, the loan management unit 502 assigns an electronic signature of the museum to the loan agreement and transmits a checking result notification including the loan agreement with the electronic signature to the server apparatus 10 (step S63 in FIG. 42).

In this way, the staff member terminal 34 reads an ownership right certificate from the electronic bulletin board using the transaction ID on the ownership right certificate and performs an object authentication using an object fingerprint acquired from the loaned item and an object fingerprint described on the ownership right certificate. The staff member terminal 34 transmits a checking result notification regarding the loan agreement to the server apparatus 10 when the object authentication is successful.

The certificate control unit 303 of the server apparatus 10 verifies the two electronic signatures assigned to the loan agreement included in the checking result notification. When the two electronic signatures are successfully verified, the certificate verification unit 303 determines that the loan agreement has been concluded and the art work has been moved to the museum.

In addition, the certificate control unit 303 uses a transaction ID included in the loan agreement registration request and acquires an ownership right certificate regarding the art work to be loaned. The certificate control unit 303 determines a validity of the loan agreement using the object fingerprint of the ownership right certificate and the object fingerprint described in the loan agreement.

Specifically, when the object fingerprints on the two documents match, the certificate control unit 303 determines that the loan agreement is for an existing art work and determines that the loan agreement is valid. The certificate control unit 303 determines that the loan agreement is invalid when the object fingerprints described on the two documents do not match.

When the loan agreement is valid, the certificate control unit 303 generates a loan document to be disclosed (a public loan document) based on the loan agreement. For example, the certificate control unit 303 generates the public loan document as shown in FIG. 44. As shown in FIG. 44, the public loan document includes the object fingerprint of the art work, the biometric information of the owner, the lending destination of the art work, and the loan period, and the like. Note that since the registered loan document is a publicly disclosed document, the loan fee need not be included in the registered loan document.

Figure 42:
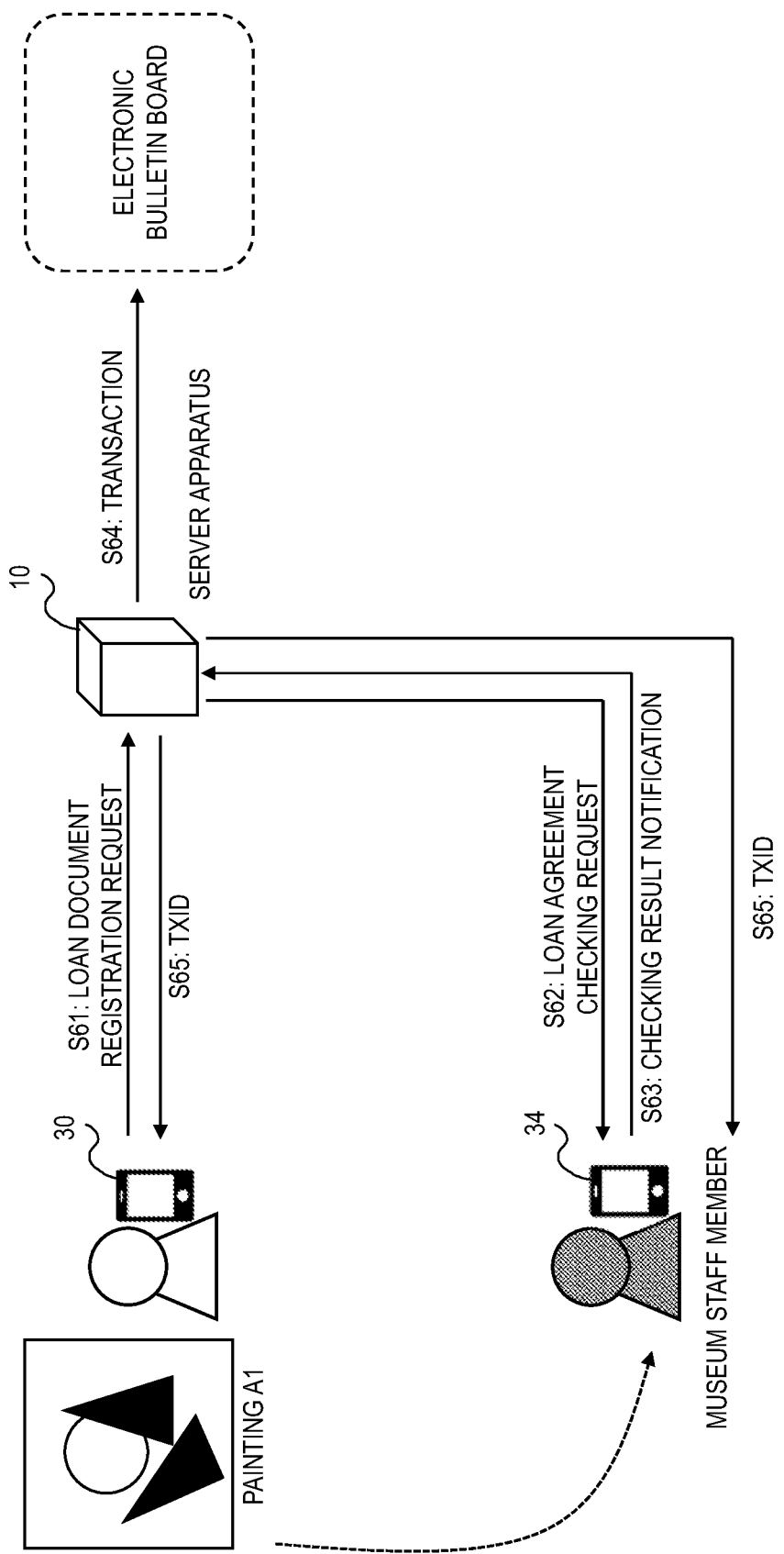
FIG. 42 is a diagram illustrating the operation of an art work management system according to the fifth example embodiment.

The certificate control unit 303 generates a transaction that includes the generated public loan document and appends the transaction on the electronic bulletin board (step S64 in FIG. 42).

The certificate control unit 303 transmits a transaction ID corresponding to the public loan document to the owner (the user terminal 30) and the museum (the staff member terminal 34) (step S65).

The user terminal 30 and the staff member terminal 34 manage the received transaction ID as a transaction ID of the loan document.

The owner who has loaned the art work can prove the fact that the art work was loaned to the museum by presenting the transaction ID on the public loan document to the counterparty when negotiating the buying and selling of the art work or the like. The fact that an art work was loaned to a famous museum can be an advantage in negotiations for the sale.

In this way, the user terminal 30 generates a loan agreement regarding a loan of an art work and transmits a loan document registration request that includes the generated loan agreement to the server apparatus 10. The server apparatus 10 receives a checking result notification regarding the loan agreement from the staff member terminal 34 according to transmitting a loan agreement checking request including the loan agreement to the staff member terminal 34 (the server apparatus 10 receives the checking result notification from the staff member terminal 34). After that, server apparatus 10 generates a public loan document to disclose the loan of the art work based on the loan agreement, and writes a transaction that includes the generated public loan document on the electronic bulletin board.

The server apparatus 10 transmits a transaction ID corresponding to the transaction of the public loan document to the user terminal 30 and the staff member terminal 34.

Next, a return of an art work that has been loaned out will be explained.

At the end of a loan period, a museum returns an art work to an owner of the art work. At that time, a museum staff member requests to the server apparatus 10 a registration regarding the return of the art work.

The staff member generates a return document regarding the art work to be returned. For example, the loan management unit 502 of the staff member terminal 34 generates the return document that includes a name of a borrowed art work, an object fingerprint, a user ID of an owner to whom the art work is to be returned, a date of return, and a loan fee and so on according to an operation of the staff member (see FIG. 45).

Figure 46:
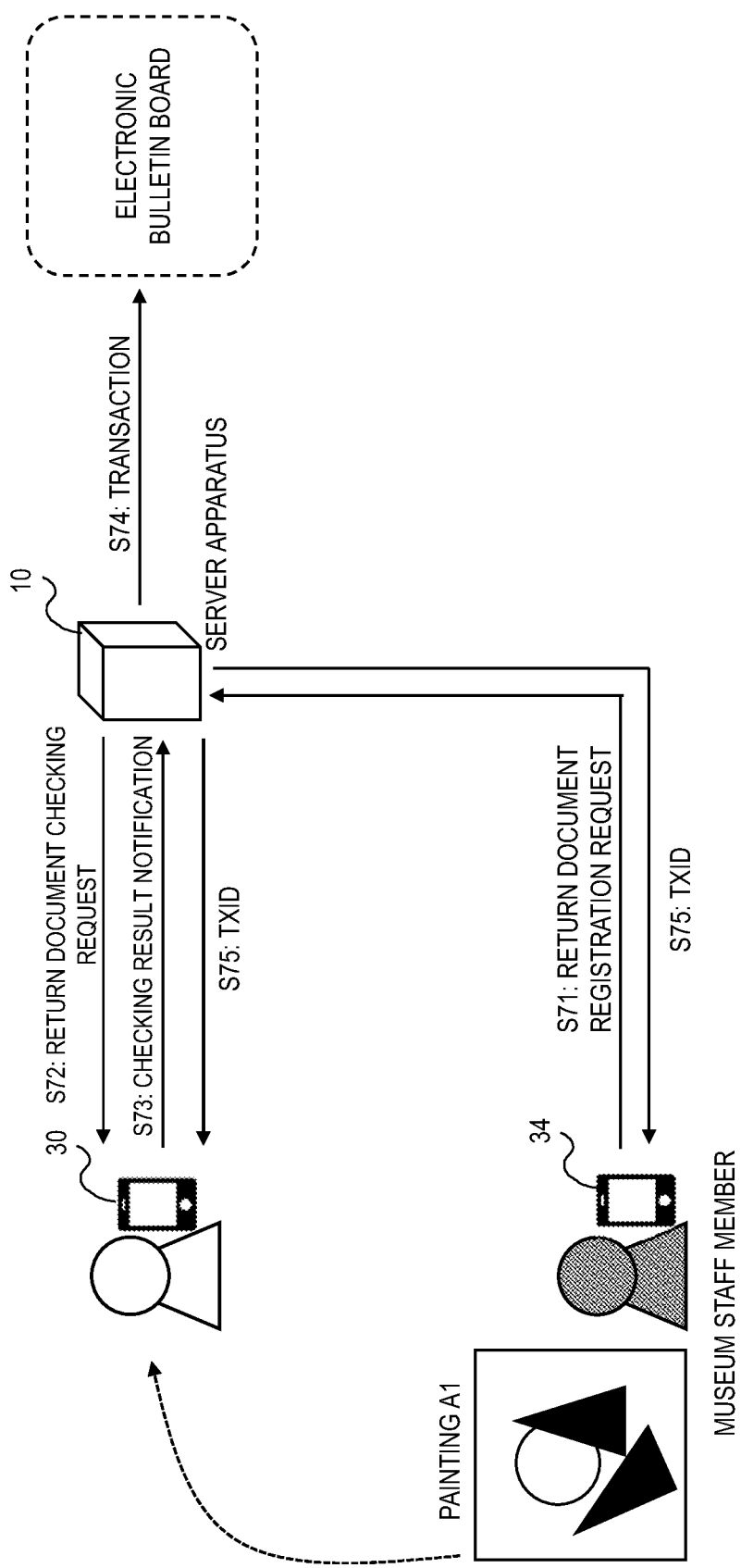
FIG. 46 is a diagram illustrating an operation of the art work management system according to the fifth example embodiment.

After that, the staff member terminal 34 transmits a return document registration request that includes the return document with an electronic signature of the museum and a transaction ID for an ownership right certificate to the server apparatus 10 (step S71 in FIG. 46).

The certificate control unit 303 of the server apparatus 10 which has received the return document registration request requests a check regarding the loan agreement for the art work to the user terminal 30. Specifically, the certificate control unit 303 transmits to the user terminal 30 a "return document checking request" that includes the return document acquired from the museum staff member (the return document to which the electronic signature of the museum is assigned) (step S72).

The owner accepts the art work that arrives at him or her. The owner operates the user terminal 30 and acquires an object fingerprint of the art work. The loan management unit 210 of the user terminal 30 performs an object authentication using the object fingerprint acquired when the art work is loaned and the object fingerprint of the returned art work.

When the object authentication is successful, the loan management unit 210 determines that the loaned art work is returned and notifies the owner to that effect. In response to the notice, the owner accepts the art work. On the other hand, when the object authentication fails, the owner determines that a different art work from the loaned art work is returned and refuses to accept the art work.

In addition, the loan management unit 210 displays details of the return document received from the server apparatus 10. When there is no doubt about the details of the return document, the owner notifies the server apparatus 10 of a checking result notification of the return document. Specifically, the loan management unit 210 assigns an electronic signature of the owner to the return document and transmits to the server apparatus 10 the checking result notification that includes the return document with the electronic signature (step S73).

In this way, the user terminal 30 performs an object authentication using an object fingerprint acquired from a returned art work and an object fingerprint described in an ownership right certificate corresponding to the loaned art work. When the object authentication is successful, the user terminal 30 transmits a checking result notification regarding a return document (a checking result of the return document by the owner) to the server apparatus 10.

The certificate control unit 303 of the server apparatus 10 verifies two electronic signatures assigned to the return document included in the checking result notification, and when the verifications of the two electronic signatures are successful, the certificate control unit 303 determines that return of the art work is complete. At that time, the certificate control unit 303 may verify a validity of the return document using the ownership right certificate of the returned art work.

The certificate control unit 303 generates a return document to be disclosed (a public return document) based on the acquired return document. For example, the certificate control unit 303 generates a public return document that includes an object fingerprint of the art work, biometric information of the owner, a destination for a return of the art work (biometric information of the owner), and a date of return, and so on. The certificate control unit 303 generates a transaction that includes the generated public return document and appends the transaction on the electronic bulletin board (step S74). Note that the certificate control unit 303 searches the user information data base using the user ID (the destination for the return of the art work) described on the return document and acquires the corresponding biometric information.

The server apparatus 10 transmits a transaction ID corresponding to a registration return document to the owner (the user terminal 30) and the museum (the staff member terminal 34) (step S75).

The user terminal 30 and the staff member terminal 34 manage the received transaction ID as a transaction ID of the return document (the registration return document).

In this way, the server apparatus 10 receives a checking result notification regarding a return document from the user terminal 30 in response to transmitting a return document checking request that includes a return document to the user terminal 30. The server apparatus 10 generates a public return document to disclose a return of the art work based on the return document, and writes a transaction that includes the generated public return document on the electronic bulletin board.

The server apparatus 10 transmits the transaction ID corresponding to the transaction of the public return document to the user terminal 30 and the staff member terminal 34.

The server apparatus 10 may make a settlement regarding the loan of the art work at the time when the loan document or the return document is described on the electronic bulletin board. For example, the server apparatus 10 may automatically make a settlement regarding an exhibition fee for the art work.

The settlement unit 306 refers to a latest ownership right certificate corresponding to the loan document or the return document. When a single owner is listed on the ownership right certificate, the settlement unit 306 generates a transfer slip with details of a payment from the lending destination (the museum) to the owner and makes a settlement (makes a settlement by a smart contract) of the loan fee (the exhibition fee) described on the loan document and so on.

When a plurality of owners are described in the ownership right certificate, the settlement unit 306 refers to the ownership right certificate and acquires a total amount of token issued to the art work and the owned token allocated to each owner. The settlement unit 306 calculates a ratio of the ownership right of each owner using the total amount of token and the owned token of each owner. The settlement unit 306 generates a transfer slip in which the loan destination distributes the loan fee according to the ratio of the ownership right of each owner, and performs a settlement. Note that the settlement unit 306 may perform a settlement of the exhibition fee using crypto-assets. In other words, the settlement unit 306 may pay the exhibition fee using cryptoassets owned by the museum. In this way, the art work management system of the present application can even complete the settlement of the exhibition fee and so on through a mechanism using a blockchain.

In this way, the server apparatus 10 can distribute an exhibition fee of a loaned art work (an income derived from the art work) evenly among each owner of the art work.

Note that it is explained a case when the art work is loaned to the museum in the fifth example embodiment. The above description can also be applied when a user loans other item to others in place of the art work. In other words, when a valuable collectible or an antique is loaned out, a museum, an archive, an exhibition, an exhibition hall, a bonded warehouse, an auction house, or the like becomes a lending destination for the above-mentioned antiques.

As described above, the art work management system of the fifth example embodiment writes a loan document on the electronic bulletin board when an art work is loaned out to a museum and so on, and discloses the fact of the loan. Similarly, when the art work is returned, a return document is written on the electronic bulletin board and disclosed to the public. The whereabouts of the art work is made clear by such a loan document and a return document. In addition, the value of the art work is widely recognized when the loan document is disclosed to the public.

Sixth Example Embodiment

Next, a sixth example embodiment will be described in detail with reference to drawings.

In the sixth example embodiment, it is described that utilizing of a certificate and so on related to an art work described on the electronic bulletin board.

[Division of Object Fingerprint]

It is described that a case in which one object fingerprint is collected from a single art work and the object fingerprint is registered on the electronic bulletin board in the above example embodiments. However, a plurality of object fingerprints may be collected from a single art work and registered on the electronic bulletin board.

For example, when registering the art work, the user terminal 30 may transmit an art work registration request that includes a plurality of object fingerprints (for example, object fingerprints acquired from the four corners of a painting) to the server apparatus 10. In this case, the server apparatus 10 (the certificate control unit 303) may generate an ownership right certificate in which the plurality of object fingerprints are described, and register the ownership right certificate on the electronic bulletin board.

Alternatively, the number of object fingerprints may change as the number of owners of the art work changes. More specifically, it may be that the same number of object fingerprints may be listed on the ownership right certificate as the number of owners. In this case, a user who becomes a new owner after buying and selling an art work may acquire a dedicated object fingerprint and transmit the dedicated object fingerprint to the server apparatus 10. Specifically, the user terminal 30 acquires the object fingerprint and transmits the object fingerprint to the server apparatus 10 at the timing of checking a purchase and selling contract as shown in FIG. 35.

The server apparatus 10 (a buying and selling control unit 305) generates an ownership right certificate in association with the acquired object fingerprint and the biometric information of the owner, and registers the ownership right certificate on the electronic bulletin board. For example, the server apparatus 10 generates the ownership right certificate as shown in FIG. 47. In other words, when an item is jointly owned by a plurality of owners, the server apparatus 10 generates the ownership right certificate in which the biometric information and object fingerprints of each owner are described in association with each other.

Alternatively, an object fingerprint may be given a value. For example, the value of the object fingerprint may be determined according to a location of the object fingerprint in an art work. For example, the object fingerprint collected from a location (a site) of a famous art work that symbolizes the art work may be assigned a high value (a premium). It is possible to utilize the object fingerprint as a token by assigning a value to the object fingerprint. For example, in buying and selling art work, a price of the object fingerprint may be determined according to the location where each object fingerprint is collected, and the determined price may be described on an ownership right certificate as a value of an image token. In this case, the ownership right certificate is generated as shown in FIG. 48. The example in FIG. 48 shows the fact that the ownership right of owner 1 is X3 yen and the ownership right of owner 2 was bought and sold at X4 yen.

When the art work is owned jointly by a plurality of owners, the art work cannot be divided and owned by each owner, but each owner is able to own the object fingerprint, which allows each owner to satisfy his or her own desire to own the art work. In addition, since each owner is able to select the object fingerprint (the image token) that has a high value according to an amount and so on paid by each owner, it is possible to increase a satisfaction of the owner who has a large financial burden.

Note that when a plurality of object fingerprints are assigned to a single art work, it may be determined that an object authentication of the art work is successful when an object authentication of each of the plurality of object fingerprints is successful, or it may be determined that an object authentication of the art work is successful by an authentication of a part of the object fingerprints.

[Export of Art Work]

For example, an art work designated as a national treasure may be prohibited from being exported out of the country. Therefore, it is necessary for customs or a logistics provider entrusted by customs to check whether or not the art work to be exported fall under the above-mentioned art work that is prohibited from being exported.

In this case, the customs officer operates a customs terminal (not shown) and collects an object fingerprint from the art work to be inspected. The customs terminal refers to table information, and so on, that includes the object fingerprints of the art work whose export is prohibited, and determines whether or not the collected object fingerprint is described in the table. In other words, the customs terminal notifies the customs officer that when the object fingerprint of the art work to be inspected is on the list (a black list), it is not possible to export the art work. In this way, the customs officer or a person in charge of the logistics provider can determine whether or not the art work to be inspected is an item that is prohibited for export by using the object fingerprint.

Alternatively, when the customs officer needs to know details of an art work (a name of the work, a price, and so on), the customs officer can acquire the name of the work, the price, and so on by transmitting a transaction ID of an ownership right certificate of the art work or an appraisal certificate of the art work to the electronic bulletin board.

Note that the customs terminal may request an external server and so on for a determination by using the above blacklist. In other words, the customs terminal may transmit an object fingerprint of an item to be exported to an external server and acquire an approval or disapproval of the export from the external server.

[Refer to History]

A user is able to acquire history information on an art work by inputting a transaction ID to the electronic bulletin board.

For example, the user inputs an object fingerprint of the art work that the user wishes to refer to the history information to the electronic bulletin board by using the user terminal 30 and so on. The electronic bulletin board (the data management system 20) searches a ledger (a distributed ledger) using the object fingerprint and extracts corresponding transaction. The electronic bulletin board transmits the extracted transaction to the user terminal 30, and so on.

The user terminal 30, and so on, provides the user with information on a transfer of right of the art work, or the like, by displaying the details of the acquired transaction. For example, the user terminal 30 is able to provide the user with a history of transition of owners regarding a certain art work.

Figure 49:
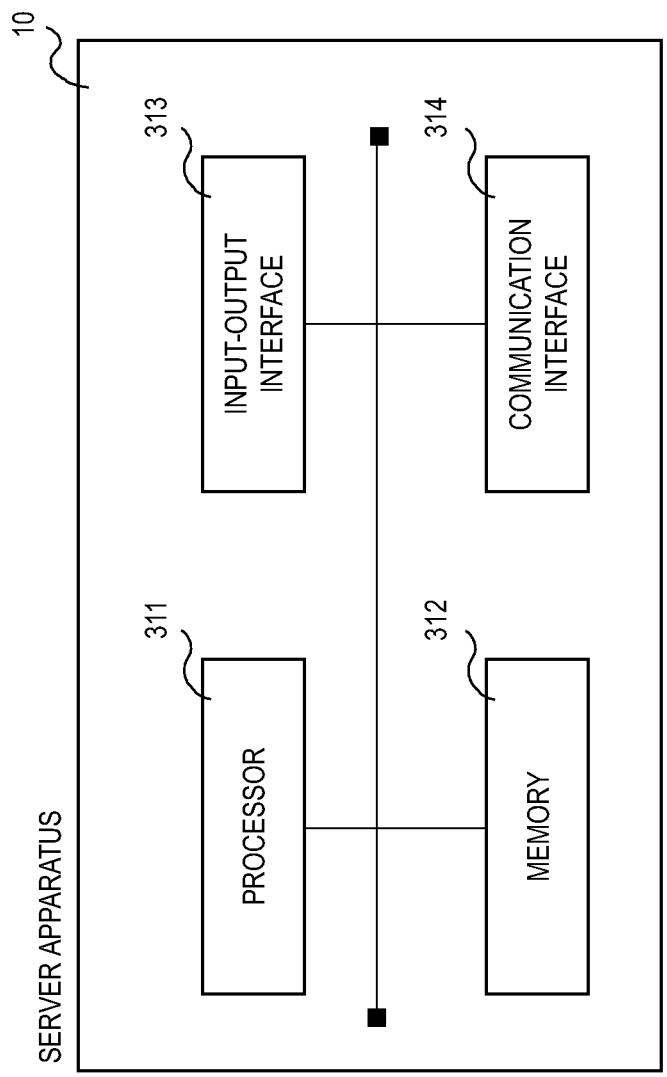
FIG. 49 is a diagram illustrating an example of a hardware configuration of a server apparatus according to the present application.

Next, a hardware configuration of an individual apparatus that constitutes the art work management system will be described. FIG. 49 is a diagram illustrating an example of a hardware configuration of the server apparatus 10.

The server apparatus 10 can be configured by an information processing apparatus (a so-called computer) and includes a configuration illustrated as an example in FIG. 49. For example, the server apparatus 10 includes a processor 311, a memory 312, an input-output interface 313, a communication interface 314, and so on. The components such as the above processor 311 are connected to an internal bus, and so on. so that the components can mutually communicate with each other.

The hardware configuration of the server apparatus 10 is not limited to the configuration illustrated in FIG. 49. The server apparatus 10 may include hardware not illustrated or may be configured without the input-output interface 313 if desired. In addition, the number of components, such as the number of processors 311, included in the server apparatus 10 is not limited to the example illustrated in FIG. 49. For example, a plurality of processors 311 may be included in the server apparatus 10.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display device and an input device not illustrated. For example, the display device is a liquid crystal display or the like. For example, the input device is a device, such as a keyboard or a mouse, which receives user operations.

The communication interface 314 is a circuit, a module, or the like for performing communication with other apparatuses. For example, the communication interface 314 includes a NIC (Network Interface Card) or the like.

The functions of the server apparatus 10 are realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

Note that the hardware configurations of various terminals such as the user terminal 30 and so on can be the same as the hardware configuration of the server apparatus 10 and is obvious to those skilled in the art, so the description will be omitted.

The server apparatus 10, which is an information processing apparatus, includes a computer and can realize its functions by causing the computer to execute a program. The user terminal 30 and so on includes a computer and can realize its functions by causing the computer to execute a program.

[Variation]

The configurations, operations, or the like of the art work management systems according to the above example embodiments are examples and do not limit the present system configuration, and so on.

In the above example embodiments, it is described that the electronic bulletin board is used to disclose relationships of the right of the art work. However, an object that clarifies relationships of a right is not limited to the art work. In the present application, for example, relationships of rights to tangible objects for which object fingerprints can be acquired, such as jewelry, luxury used cars, collectibles, antiques (vintage items) and premier types of luxury whiskey, wine, or the like can be disclosed. In other words, the present application can at least cover all items that are few in number, remain premier for a long time, and are transacted at a relatively high price. Therefore, in the present application, "an item" as described above may be read as "an item". For example, the user terminal 30 may transmit an "item registration request" to the server apparatus 10, and request an initial registration of the item to the server apparatus 10.

In the above example embodiments, it is described that the location where the object fingerprint is collected from the art work is predetermined. However, the location where the object fingerprint is collected may be described on the ownership right certificate. In this case, the user terminal 30 transmits an art work registration request that includes the location where the object fingerprint is collected (for example, information such as a lower left, an upper left, a bottom, and so on) to the server apparatus 10. The server apparatus 10 generates the ownership right certificate that includes the location where the object fingerprint is collected and writes the ownership right certificate on the electronic bulletin board. Alternatively, an entity that collects the object fingerprint (for example, a transferee or an appraiser) may inquire the owner about the location where the object fingerprint is collected.

In the above example embodiments, it is described that the ownership right certificate and so on is written on the electronic bulletin board via the server apparatus 10. However, the user terminal 30 used by the owner of the art work, or the like may directly write the ownership right certificate, or the like on the electronic bulletin board. Specifically, the user terminal 30 may generate the ownership right certificate as shown in FIG. 14 and write a transaction that includes the generated ownership right certificate on the electronic bulletin board. However, in this case, since a user who has not completed an identity verification by the server apparatus 10 can also write the ownership right certificate, or the like, on the electronic bulletin board, a user who views the ownership right certificate is required to carefully verify a counterparty and a legitimacy. For example, the user needs to ask the counterparty to present an identity verification document, such as a passport, and to conduct the transaction with the counterparty whose identity has been verified.

Alternatively, the server apparatus 10 may be configured to distinguish between the ownership right certificate generated by the server apparatus 10 and written on the electronic bulletin board, and the ownership right certificate generated by the user and written directly on the electronic bulletin board. In this case, the user (the user terminal 30) who uses the ownership right certificate may select a method of verifying the ownership right certificate according to the type of the ownership right certificate.

In the above example embodiments, it is described that a transaction that includes biometric information (a feature value) of the user is written on the electronic bulletin board. However, in practice, it is sufficient when information that is substantially equivalent to the biometric information is written on the electronic bulletin board. Specifically, the server apparatus 10 or an external server different from the server apparatus 10 may convert the biometric information of the user into a unique ID (a biometric information ID) determined from the biometric information of the user, and an ownership right certificate and so on that includes the converted ID may be written on the electronic bulletin board. In other words, the server apparatus 10 may replace the biometric information such as ownership right certificate described above with a "biometric information ID" and write the biometric information on the electronic bulletin board. Also in this case, when the ownership right certificate is verified at the viewer terminal 31 and so on, the viewer terminal 31 may transmit the biometric information ID acquired from the ownership right certificate and so on to the server apparatus 10 or the external server, and acquire a corresponding biometric information. The viewer terminal 31 may perform a biometric authentication using the biometric information acquired from the server apparatus 10, and so on and the biometric information acquired from the owner in front of the person. These measures prevent sensitive personal biometric information from being disclosed directly to the public via the electronic bulletin board.

In the first example embodiment, it is described that the user performs the user registration before registering the ownership right of the art work. However, the user registration may not be performed. For example, when a user whose identity has been confirmed in advance, such as an employee of a company or a resident of a municipality, is a system user, the above user registration is not required.

In the first example embodiment, it is described that the authentication of the user (an applicant for the registration of the ownership right) is performed when the ownership right of the art work is registered. However, the authentication may not be performed. For example, the above authentication may be performed at the time of verifying the legitimacy of the owner during the transaction of the art work. For example, the transferee of the art work may transmit the biometric information of the transferor to the server apparatus 10, and after a successful authentication using the biometric information, the verification using the ownership right certificate (the verification regarding the legitimacy of the transferor) may be performed.

In the second example embodiment, it is described that the owner of the art work writes the appraisal certificate or the restoration certificate on the electronic bulletin board via the server apparatus 10. However, the appraiser or restorer may generate a public appraisal certificate or public restoration certificate and write these documents on the electronic bulletin board.

In the second example embodiment, it is described that the server apparatus 10 performs the verification of the existence of the ownership right certificate of the art work to be appraised at the time of registration of the public appraisal certificate and so on. However, the verification may not be performed. The verification may be performed by an entity (for example, the transferee) that refers to the appraisal certificate and so on. For example, the transferee (the user terminal 30) may initiate a transaction when the object fingerprint acquired from the art work in front of him or her, the object fingerprint described in the ownership right certificate, and the object fingerprint described in the appraisal certificate match.

In the second example embodiment, it is described that the object fingerprint of the art work is included in the public appraisal certificate or the public restoration certificate. However, when the object fingerprint is described in the result of the appraisal of the public appraisal certificate or in the details of the restoration of the public restoration certificate, the object fingerprint may not be described in the above-mentioned public appraisal certificate and so on.

In the second example embodiment, it is described that an electronic signature is given to the appraisal certificate using a private key corresponding to an electronic certificate issued by the organization concerned for a qualification recognized by the appraisal association, and so on (an appraiser qualification, and so on), and the appraisal certificate is registered when the verification of the signature is successful. In other words, it is described that the appraisal certificate is registered after the credentials of the appraiser or the like is verified by the electronic signature of an association-authorized card and the like. However, in the art work management system of the present application, the public key for verifying the electronic signature assigned to the appraisal certificate may be described on the electronic bulletin board, so that anyone can determine the authenticity of the appraisal certificate itself. In other words, the art work management system may guarantee the authenticity of the appraisal certificate itself with the public key disclosed on the electronic bulletin board, while guaranteeing the credentials of the appraiser or the like by the biometric authentication.

In the third example embodiment, it is described that the server apparatus 10 verifies the validity of the purchase and sales contract when buying and selling the art work. However, the verification of the validity of the purchase and selling contract need not be performed. For example, the above verification need not be performed for buying and selling related to a low-priced art work.

In the third example embodiment, it is described the case where the ownership right of the art work is transferred by buying and selling. However, the ownership right of the art work may also be transferred by a inheritance or a gift. For example, when the art work is to be donated, a donor and a beneficiary may jointly generate a gift contract and transmit the gift contract to the server apparatus 10, in the same manner as when buying and selling the art work. The server apparatus 10 may generate the ownership right certificate from the gift contract and write the ownership right certificate on the electronic bulletin board. In a case of a inheritance of the art work, a decedent transmits to the server apparatus 10 documents that indicate that the inheritance was legitimately carried out (for example, an estate division agreement), the biometric information of the decedent, and the object fingerprint of the art work. After verifying the estate division agreement and so on, the server apparatus 10 generates an ownership right certificate that includes the biometric information of the decedent, and writes the ownership right certificate on the electronic bulletin board.

In the fourth example embodiment, it is described that the server apparatus 10 generates the ownership right certificate that includes the total amount of the token. However, the total amount of the token need not be described in the ownership right certificate. In other words, the total amount of the token can be calculated by adding up the owned token and the resale royalty token described in the ownership right certificate. However, when the total amount of the token is predetermined, it is possible to easily calculate the ratio of ownership and so on of each owner or the like, when the number of the owner or the resale royalty right holder is large, for example. Note that although it is described in the fifth example embodiment the case where the ownership right certificate that does not include the total amount of the token is generated, the ownership right certificate that includes the total amount of the token may be generated for the same reason as described above.

In the above fifth example embodiment, it is described the loan of the art work. The fact that the art work was loaned to the famous museum (especially the fact that the art work was loaned for a long period of time) has an effect of increasing the value of the art work. Therefore, the owner of the art work discloses the fact of the loan using the electronic bulletin board (the blockchain). At that time, the museum (the museum staff member) may provide the owner with information about the art work (meta-information; for example, an ID of a research paper produced by the museum). The owner (the user terminal 30) may generate the loan document that includes the meta-information and write the loan document on the electronic bulletin board via the server apparatus 10. Such meta-information also contributes to increasing the value of the art work.

In the above example embodiments, it is described that the benefit is distributed based on the owned token of each owner of the art work. The owned tokens may be used to determine a share of a cost of the art work. For example, the user terminal 30 of the owner who made an advanced payment transmits the cost spent on the art work to the server apparatus 10, along with the transaction ID of the ownership right certificate. The settlement unit 306 of the server apparatus 10 calculates the cost to be borne by each owner according to the ratio of the ownership of each owner described in the ownership right certificate. After that, the settlement unit 306 generates a transfer slip that allows other owner to transfer the cost according to his/her share to the owner who made the advanced payment, and settles the cost.

The token described above may be treated as a voting right to the art work. For example, when deciding whether or not to loan the art work to the museum and so on, the decision may be made according to the owned token allocated to each owner. In this case, each owner of the art work (each of the user terminals 30) transmits the loan document registration request regarding the object to be loaned to the server apparatus 10. The server apparatus 10 (the certificate control unit 303) treats the owner who transmitted the loan document registration request as agreeing to the loan of the art work, and calculates the total number of owned tokens of the owner who agreed to the loan. When the total number of calculated owned tokens exceeds a majority, the server apparatus 10 determines that the loan of the art work has been voted on and performs a subsequent process (such as checking the contract with the museum).

Alternatively, multiple types of tokens may be described in the ownership right certificate according to a purpose of use. For example, a token such as a decision token regarding making a decision or a benefit token for distributing the benefit (the cost) may be included in the ownership right certificate. In this case, the user (the user terminal 30) may describe in the purchase and selling contract the type of the above tokens (for example, a decision token, a benefit token, and so on) and his or her share (his or her allocation). The certificate control unit 303 of the server apparatus 10 generates the ownership right certificate in accordance with the purchase and selling contract. In addition, each processing module of the server apparatus 10 may determine the burden of the cost, and so on, according to the type of token described in the ownership right certificate and the allocation of the token. In this way, in the art work management system of the present application, it is possible to set the token for distributing the benefit from the art work and the token for making a decision regarding a handling of the art work.

In the above example embodiments, it is described that the face image is transmitted from the user terminal 30 and so on to the server apparatus 10, however, the feature value generated from the face image may also be transmitted from the user terminal 30 to the server apparatus 10.

While the data exchange between each apparatus (the server apparatus 10 and the user terminal 30) is not limited to any particular mode, data exchanged between these apparatuses may be encrypted. It is desirable that the biometric information and so on are transmitted and received between these apparatuses and encrypted data is transmitted and received in order to properly protect this information.

For example, while the above example embodiments have been described based on a case in which the user information database is established in the server apparatus 10, the user information database may be established in an externally installed database server. In addition, some of the functions of the server apparatus 10 may be implemented in another server and so on. More specifically, the "certificate control unit (certificate control means)", "buying and selling control unit (buying and selling control means)," and so on described above may be implemented in any of the apparatuses included in the system.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed above and not to mean that all the configurations described above are needed. In addition, if a plurality of example embodiments have been described, each of the example embodiments may be used individually or a plurality of example embodiments may be used in combination.

For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable to art work management systems for art works related to paintings and jewelry and so on.

A part or the entirety of the example embodiments described above may be described as in the following supplementary notes, but is not limited to the followings.

[Supplementary Note 1]
A system, including:
  a user terminal that acquires an object fingerprint of an item and biometric information of an owner of the item; and
  a plurality of ledger nodes that provides an electronic bulletin board,
  wherein the user terminal writes an ownership right certificate including the object fingerprint of the item and the biometric information of the owner on the electronic bulletin board.

[Supplementary Note 2]
The system according to supplementary note 1, further including a server apparatus,
  wherein the user terminal transmits an item registration request including at least the object fingerprint of the item and the biometric information of the owner to the server apparatus, and
  wherein the server apparatus generates the ownership right certificate based on information included in the item registration request, writes on the electronic bulletin board a first transaction including the generated ownership right certificate and transmits a first transaction ID corresponding to the first transaction to the user terminal.

[Supplementary Note 3]
The system according to supplementary note 2, further including a viewer terminal that reads the ownership right certificate corresponding to the first transaction ID from the electronic bulletin board,
  wherein the viewer terminal performs an object authentication using an object fingerprint acquired from an item to be verified and an object fingerprint described in the ownership right certificate, performs a biometric authentication using biometric information acquired from a person to be verified and biometric information described in the ownership right certificate, and determines that the item and the person to be verified are legitimate when the object authentication and the biometric authentication are successful.

[Supplementary Note 4]
The system according to supplementary note 2 or 3, wherein the server apparatus includes a database that stores biometric information of each of a plurality of users whose identity verification is completed, and generates the ownership right certificate when an authentication using biometric information included in the item registration request and biometric information stored in the user information database is successful.

[Supplementary Note 5]
The system according to any one of supplementary notes 2 to 4, wherein the user terminal displays information about the item and the first transaction ID that corresponds to the ownership right certificate.

[Supplementary Note 6]
The system according to any one of supplementary notes 2 to 5, further including a staff member terminal that is used by a staff member of a lending destination of the item,
  wherein the user terminal generates a loan agreement regarding a loan of the item and transmits a loan document registration request including the generated loan agreement to the server apparatus, and
  wherein the server apparatus receives a checking result notification regarding the loan agreement according to transmitting a loan agreement checking request including the loan agreement to the staff member terminal, generates a public loan document to disclose the loan of the item based on the loan agreement, and writes a second transaction including the generated public loan document on the electronic bulletin board.

[Supplementary Note 7]
The system according to supplementary note 6, wherein the server apparatus transmits a second transaction ID corresponding to the second transaction to the user terminal.

[Supplementary Note 8]
The system according to supplementary note 6 or 7, wherein the user terminal transmits the loan document registration request including the loan agreement and the first transaction ID to the server apparatus,
  wherein the server apparatus transmits the loan agreement checking request including the loan agreement and the first transaction ID to the staff member terminal, and
  wherein the staff member terminal reads the ownership right certificate corresponding to the first transaction ID from the electronic bulletin board and transmits a checking result notification regarding the loan agreement to the server apparatus when an object authentication using an object fingerprint acquired from the loaned item and an object fingerprint described in the ownership right certificate is successful.

[Supplementary Note 9]
The system according to any one of supplementary notes 6 to 8, wherein the staff member terminal generates a return document regarding the item to be returned and transmits a return document registration request including the generated return document to the server apparatus,
  wherein the server apparatus receives a checking result notification regarding the return document from the user terminal according to transmitting a return document checking request including the return document to the user terminal, generates a public return document to disclose a return of the item based on the return document, and writes a third transaction including the generated public return document on the electronic bulletin board.

[Supplementary Note 10]
The system according to supplementary note 9, wherein the server apparatus transmits a third transaction ID corresponding to the third transaction to the user terminal and the staff member terminal.

[Supplementary Note 11]
The system according to supplementary note 9 or 10, wherein the user terminal transmits a checking result notification regarding the return document to the server apparatus when an object authentication using an object fingerprint acquired from a returned item and an object fingerprint described in an ownership right certificate corresponding to the loaned item is successful.

[Supplementary Note 12]

The system according to any one of supplementary notes 1 to 11, wherein the plurality of ledger nodes provides the electronic bulletin board that allows any entity to both append information and read information that is written, and that does not erase or tamper with information once the information is written.

[Supplementary Note 13]

A control method of a user terminal, the control method including:
  acquiring an object fingerprint of an item and biometric information of an owner of the item; and
  writing an ownership right certificate including the object fingerprint of the item and the biometric information of the owner on the electronic bulletin board.

[Supplementary Note 14]

A program causing a computer mounted on a user terminal to perform processing for:
  acquiring an object fingerprint of an item and biometric information of an owner of the item; and
  writing an ownership right certificate including the object fingerprint of the item and the biometric information of the owner on the electronic bulletin board.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10 server apparatus
20 data management system
21 ledger node
30 user terminal
31 viewer terminal
32 appraiser terminal
33 restorer terminal
34 staff member terminal
101 user terminal
102 ledger node
201 communication control unit
202 user registration request unit
203 art work registration unit
204 art work information provision unit
205 storage unit
206 appraisal certificate registration unit
207 restoration certificate registration unit
208 certificate verification unit
209 buying and selling management unit
210 loan management unit
301 communication control unit
302 user registration unit
303 certificate control unit
304 storage unit
305 buying and selling control unit
306 settlement unit
311 processor
312 memory
313 input-output interface
314 communication interface
401 communication control unit
402 certificate verification unit
403 storage unit
501 communication control unit
502 loan management unit
503 storage unit

What is claimed is:

1. A system, comprising:
  a user terminal, comprising at least one hardware processor, that acquires an object fingerprint of an item and biometric information of an owner of the item; and
  a plurality of ledger nodes that provides an electronic bulletin board,
  wherein the user terminal writes an ownership right certificate including the object fingerprint of the item and the biometric information of the owner on the electronic bulletin board;
  wherein the system further comprises a viewer terminal that reads the ownership right certificate corresponding to a first transaction ID from the electronic bulletin board,
  wherein the viewer terminal performs an object authentication using an object fingerprint acquired from an item to be verified and an object fingerprint described in the ownership right certificate, performs a biometric authentication using biometric information acquired from a person to be verified and biometric information described in the ownership right certificate, and determines that the item and the person to be verified are legitimate when the object authentication and the biometric authentication are successful.

2. The system according to claim 1, further comprising a server apparatus,
  wherein the user terminal transmits an item registration request including at least the object fingerprint of the item and the biometric information of the owner to the server apparatus, and
  wherein the server apparatus generates the ownership right certificate based on information included in the item registration request, writes on the electronic bulletin board a first transaction including the generated ownership right certificate and transmits the first transaction ID corresponding to the first transaction to the user terminal.

3. The system according to claim 2, wherein the server apparatus includes a database that stores biometric information of each of a plurality of users whose identity verification is completed, and generates the ownership right certificate when an authentication using biometric information included in the item registration request and biometric information stored in the user information database is successful.

4. The system according to claim 2, wherein the user terminal displays information about the item and the first transaction ID that corresponds to the ownership right certificate.

5. The system according to claim 2, further comprising a staff member terminal that is used by a staff member of a lending destination of the item,
  wherein the user terminal generates a loan agreement regarding a loan of the item and transmits a loan document registration request including the generated loan agreement to the server apparatus, and wherein the server apparatus receives a checking result notification regarding the loan agreement according to transmitting a loan agreement checking request including the loan agreement to the staff member terminal, generates a public loan document to dis close the loan of the item based on the loan agreement, and writes a second transaction including the generated public loan document on the electronic bulletin board.

6. The system according to claim 5, wherein the server apparatus transmits a second transaction ID corresponding to the second transaction to the user terminal.

7. The system according to claim 5, wherein the user terminal transmits the loan document registration request including the loan agreement and the first transaction ID to the server apparatus, wherein the server apparatus transmits the loan agreement checking request including the loan agreement and the first transaction ID to the staff member terminal, and wherein the staff member terminal reads the ownership right certificate corresponding to the first transaction ID from the electronic bulletin board and transmits a checking result notification regarding the loan agreement to the server apparatus when an object authentication using an object fingerprint acquired from the loaned item and an object fingerprint described in the ownership right certificate is successful.

8. The system according to claim 5, wherein the staff member terminal generates a return document regarding the item to be returned and transmits a return document registration request including the generated return document to the server apparatus, wherein the server apparatus receives a checking result notification regarding the return document from the user terminal according to transmitting a return document checking request including the return document to the user terminal, generates a public return document to disclose a return of the item based on the return document, and writes a third transaction including the generated public return document on the electronic bulletin board.

9. The system according to claim 8, wherein the server apparatus transmits a third transaction ID corresponding to the third transaction to the user terminal and the staff member terminal.

10. The system according to claim 8, wherein the user terminal transmits a checking result notification regarding the return document to the server apparatus when an object authentication using an object fingerprint acquired from a returned item and an object fingerprint described in an ownership right certificate corresponding to the loaned item is successful.

11. The system according to claim 1, wherein the plurality of ledger nodes provides the electronic bulletin board that allows any entity to both append information and read information that is written, and that does not erase or tamper with information once the information is written.

12. A control method implemented using at least one hardware processor, the control method comprising:

acquiring an object fingerprint of an item and biometric information of an owner of the item;

writing an ownership right certificate including the object fingerprint of the item and the biometric information of the owner on an electronic bulletin board;

reading the ownership right certificate corresponding to a first transaction ID from the electronic bulletin board;

performing an object authentication using an object fingerprint acquired from an item to be verified and an object fingerprint described in the ownership right certificate;

performing a biometric authentication using biometric information acquired from a person to be verified and biometric information described in the ownership right certificate; and determining that the item and the person to be verified are legitimate when the object authentication and the biometric authentication are successful.

13. A non-transitory computer-readable storage medium storing a program causing a computer to perform processing for:

acquiring an object fingerprint of an item and biometric information of an owner of the item;

writing an ownership right certificate including the object fingerprint of the item and the biometric information of the owner on an electronic bulletin board;

reading the ownership right certificate corresponding to a first transaction ID from the electronic bulletin board;

performing an object authentication using an object fingerprint acquired from an item to be verified and an object fingerprint described in the ownership right certificate;

performing a biometric authentication using biometric information acquired from a person to be verified and biometric information described in the ownership right certificate; and determining that the item and the person to be verified are legitimate when the object authentication and the biometric authentication are successful.

* * * * *